US012659110B2

(12) United States Patent
Jacobsson et al.

(10) Patent No.: US 12,659,110 B2
(45) Date of Patent: Jun. 16, 2026

(54) PROHIBITION, ALLOWANCE, OR ADAPTATION OF SOUNDING REFERENCE SIGNAL CONFIGURATION HAVING NON-SUPPORTED SOUNDING REFERENCE SIGNAL SEQUENCE LENGTH

(71) Applicant: Telefonaktiebolaget LM Ericsson (publ), Stockholm (SE)

(72) Inventors: Sven Jacobsson, Västra Frölunda (SE); Andreas Nilsson, Gothenburg (SE); Sven Petersson, Sävedalen (SE); Mattias Frenne, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 301 days.

(21) Appl. No.: 18/285,831

(22) PCT Filed: Apr. 5, 2022

(86) PCT No.: PCT/EP2022/059021
§ 371 (c)(1),
(2) Date: Oct. 5, 2023

(87) PCT Pub. No.: WO2022/214492
PCT Pub. Date: Oct. 13, 2022

(65) Prior Publication Data
US 2024/0372667 A1 Nov. 7, 2024

Related U.S. Application Data

(60) Provisional application No. 63/171,419, filed on Apr. 6, 2021.

(51) Int. Cl.
*H04L 5/00* (2006.01)

(52) U.S. Cl.
CPC .......... *H04L 5/0051* (2013.01); *H04L 5/0094* (2013.01)

(58) Field of Classification Search
CPC ................. H04L 5/0051; H04L 5/0094; H04L 5/0007; H04L 5/0091; H04L 5/0048
(Continued)

(56) References Cited

U.S. PATENT DOCUMENTS

2009/0181687 A1* 7/2009 Tiirola .................. H04L 5/0048
455/507
2013/0039202 A1* 2/2013 Feuersanger ......... H04L 5/0048
370/252

(Continued)

OTHER PUBLICATIONS

3rd Generation Partnership Project, "3rd Generation Partnership Project; Technical Specification Group Radio Access Network; NR; Radio Resource Control (RRC) protocol specification (Release 16)", Technical Specification, 3GPP TS 38.331 V16.4.1, Mar. 2021, pp. 1-949, 3GPP.
(Continued)

*Primary Examiner* — Candal Elpenord
(74) *Attorney, Agent, or Firm* — COATS & BENNETT, PLLC

(57) ABSTRACT

Provided are communication methods and related devices and nodes for prohibition, allowance, or adaption of a sounding reference signal (SRS) configuration having a non-supported SRS sequence length. A method performed by a communication device comprises at least one of (i) receiving a SRS configuration from a network node having an SRS sequence length that is non-supported by the communication device, the SRS configuration involving at least one of a bandwidth configuration, a transmission comb configuration, and a partial sounding factor configuration, and (ii) not receiving the SRS configuration based on a determination by the network node that the SRS configura-
(Continued)

tion has an SRS sequence length that is not supported by the communication device. The method also comprises prohibiting or allowing the SRS configuration.

11 Claims, 23 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 2013/0189930 A1 | 7/2013 | Kinnunen et al. | |
| 2017/0150499 A1 | 5/2017 | Kim et al. | |
| 2018/0278450 A1 | 9/2018 | Zarifi et al. | |
| 2019/0386764 A1 | 12/2019 | Choi et al. | |
| 2020/0083997 A1 | 3/2020 | Takata et al. | |
| 2021/0036825 A1* | 2/2021 | Choi ..................... | H04L 5/0048 |
| 2021/0250943 A1* | 8/2021 | Rico Alvarino ........ | H04L 5/001 |
| 2023/0388075 A1* | 11/2023 | Tian ...................... | H04L 5/0007 |

OTHER PUBLICATIONS

3rd Generation Partnership Project, "3rd Generation Partnership Project; Technical Specification Group Radio Access Network; NR; Radio Resource Control (RRC) protocol specification (Release 16)", Technical Specification, 3GPP TS 38.331, V16.1.0, Jul. 2020, pp. 1-62, 3GPP.

3rd Generation Partnership Project, "3rd Generation Partnership Project; Technical Specification Group Radio Access Network; NR; Physical layer procedures for control (Release 16)", Technical Specification, 3GPP TS 38.213 V16.5.0, Mar. 2021, pp. 1-184, 3GPP.

3rd Generation Partnership Project, "3rd Generation Partnership Project; Technical Specification Group Radio Access Network; NR; Physical channels and modulation (Release 16)", Technical Specification, 3GPP TS 38.211 V16.5.0, Mar. 2021, pp. 1-134, 3GPP.

3rd Generation Partnership Project, "3rd Generation Partnership Project; Technical Specification Group Radio Access Network; NR; Physical layer procedures for data (Release 16)", Technical Specification, 3GPP TS 38.214 V16.5.0, Mar. 2021, pp. 1-171, 3GPP.

3rd Generation Partnership Project, "3rd Generation Partnership Project; Technical Specification Group Radio Access Network; NR; User Equipment (UE) radio access capabilities (Release 16)", Technical Specification, Bgpp Ts 38.306 V16.4.0, Mar. 2021, pp. 1-151, 3GPP.

Samsung, "New WID: Further enhancements on MIMO for NR", TSG RAN Meeting #86, Sitges, Spain, Dec. 9-12, 2019, pp. 1-5, RP-193133, 3GPP.

Ericsson, "SRS Performance and Potential Enhancements", TSG-RAN WG1 Meeting #104-e, e-Meeting, Jan. 25-Feb. 5, 2021, pp. 1-26, Tdoc R1-210519, 3GPP.

* cited by examiner

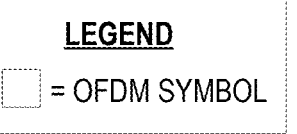
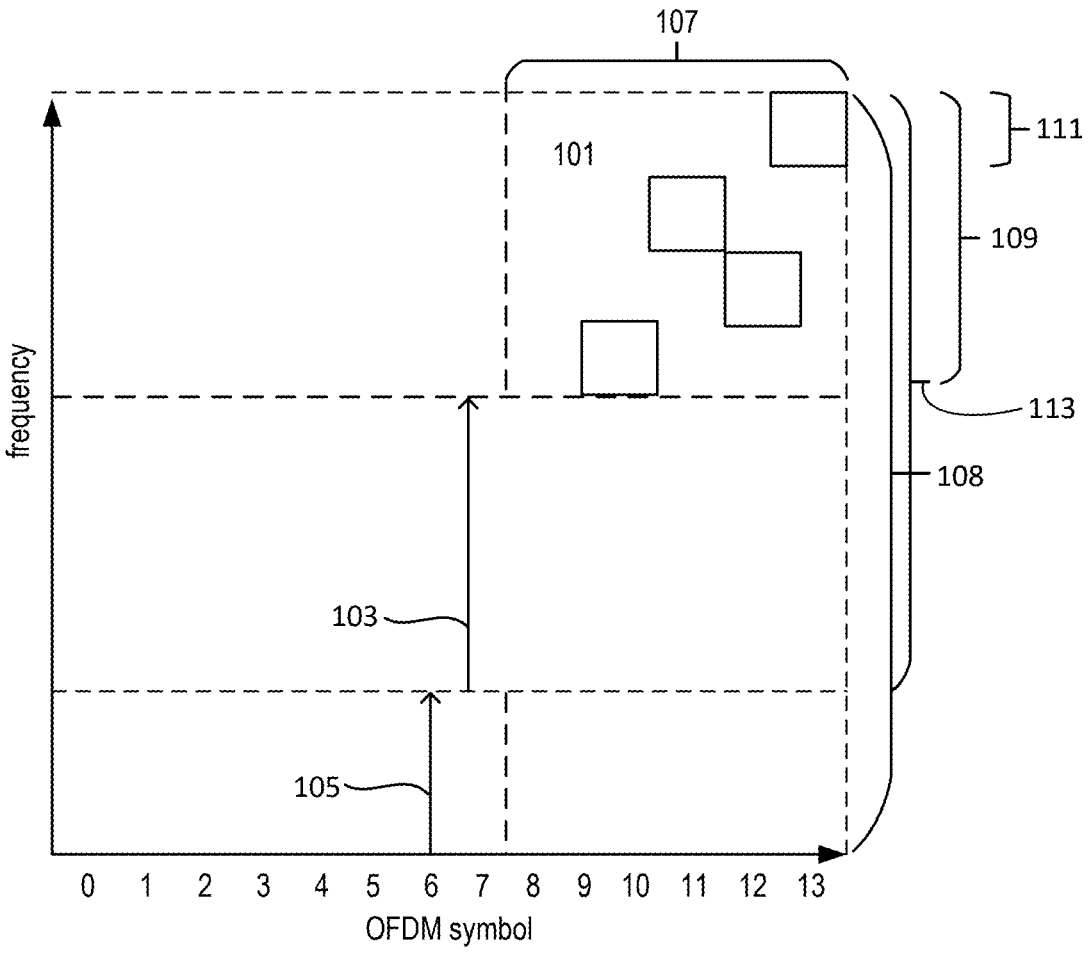
FIG. 1A

LEGEND $B_{SRS}$, $C_{SRS}$ = SRS Bandwidth Configuration Indices $m_{SRS}$ = defines a number of Resource Blocks (RBs) allocated to the SRS for the SRS Bandwith Configuration Indices $B_{SRS}$ and $C_{SRS}$ N = number of unique SRS subbands Release 16            89            3GPP TS 38.211 V16.3.0 (2021-10)

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |

| supportedSRS-TxPortSwitch | supportedSRS-TxPortSwitchv1610 |
|---|---|
| t1r2 | t1r1-t1r2 |
| t1r4 | t1r1-t1r2-t1r4 |
| t2r4 | t1r1-t1r2-t2r2-t2r4 |
| t2r2 | t1r1-t2r2 |
| t14r4 | t1r1-t2r2-t4r4 |
| t1r4-t2r4 | t1r1-t1r2-t2R2-t1r4-t2r4 |

FIG. 9

| comb ($K_{TC}$) / PRBs ($m_{B_{SRS}}$) | 2 | 4 | 8 |
|---|---|---|---|
| 4 | 1, 2, 4 | 1, 2 | 1 |
| 8 | 1, 2, 4, 8 | 1, 2, 4 | 1, 2 |
| 12 | 1, 2, 3, 4, 6 | 1, 2, 3, 6 | 1, 3 |

Option 1

Available slot

DCI triggering SRS set
(reference slot)

SRS set transmitted in available slot t+1=3 t=1   t=2   t=3        t=4   t=5   t=6 t=2 indicated in DCI or RRC (Rel-17)

Option 2

Available slot

DCI triggering SRS set

SRS set transmitted in available slot t+1=2 t=1   t=2        t=3   t=4   t=5 k=3 indicated in
DCI (legacy offset)
(reference slot)

t=1 indicated in
DCI or RRC (Rel-17)

| UE antenna configuration | 1 SRS resource set | 2 SRS resource sets | 3 SRS resource sets | 4 SRS resource sets |
|---|---|---|---|---|
| 1T6R | [6] | [5 1], [4 2] or [3 3] | [4 1 1], [3 2 1], [2 2 2] | [3 1 1] or [2 2 1 1] |
| 1T8R | [8] (only w.o. guard period) | [7 1], [6 2], [5 3], or [4 4] | [6 1 1], [5 2 1], [4 3 1], [4 2 2] or [3 3 2] | [5 1 1 1], [4 2 1 1], [3 3 1 1], [3 2 2 1] or [2 2 2 2] |
| 2T6R | [3] | [2 1] | [1 1 1] | Not applicable |
| 2T8R | [4] | [3 1] or [2 2] | [2 1 1] | [1 1 1 1] |
| 4T8R | [3] | [1, 1] | Not applicable | Not applicable |

FIG. 25

| System-level simulation parameters | |
|---|---|
| Metric | DL mean and cell-edge user throughput |
| Traffic model | FTP Model 1 |
| Number of sites | 19 |
| Number of UEs | 2000 |
| UE distribution | 80% indoor and 20% outdoor |
| Handover margin | 3 dB |
| Carrier frequency | 3.5 GHz |
| Bandwidth | 40 MHz |
| Subcarrier spacing | 30 kHz |
| Channel model | 38.901 |
| Scenario | UMa dense urban (UMa with 200 m ISD) |
| Packet size | 500 kB |
| BS antenna configuration | $(M, N, P, M_g, N_g, M_p, N_p)$ = (8, 8 ,2, 1, 1, 4, 8) with $(d_H, d_v)$ = (0.5, 0.8)$\lambda$ |
| UE antenna configuration | $(M, N, P)$ = (1, {1, 2, 3, 4}, 2), 0.5$\lambda$ element spacing, omni-directional elements |
| MIMO scheme | SU-MIMO and MU-MIMO |
| Precoder | Reciprocity-based SVD and SLNR for SU-MIMO and MU-MIMO, respectively |
| BS antenna height | 10 m and 25 m for UMi and UMa, respectively |
| BS transmit power | 47 dBm for 40 MHz bandwidth |
| BS noise figure | 5 dB |
| UE antenna height | According to 36.873 |
| UE transmit power | At most 23 dBm (set through power-control loop) |
| UE noise figure | 9 dB |
| Modulation | Up to 256 QAM |
| SRS error model | 36.897 |
| SRS: number of (used) cyclic shifts | 8 |
| SRS: number of frequency hops (baseline) | 1 |
| SRS: processing gain | 9 dB |
| SRS: repetition factor (baseline) | 1 |
| SRS: transmission comb | 2 |
| SRS periodicity | 5 slots |
| SRS antenna switching scheme | 2T4R |

FIG. 27

PROHIBITION, ALLOWANCE, OR ADAPTATION OF SOUNDING REFERENCE SIGNAL CONFIGURATION HAVING NON-SUPPORTED SOUNDING REFERENCE SIGNAL SEQUENCE LENGTH

TECHNICAL FIELD

The present disclosure relates generally to communications, and more particularly to communication methods and related devices and nodes for prohibition, allowance, or adaption of a sounding reference signal (SRS) configuration having a non-supported SRS sequence length.

BACKGROUND

The SRS is used in third generation partnership project (3GPP) systems Long Term Evolution (LTE) and New Radio (NR) to provide channel state information (CSI) in the uplink (UL). The application for the SRS is mainly to provide a reference signal to evaluate the channel quality at the gNodeB (gNB) in order to, e.g., derive the appropriate transmission/reception beams or to perform link adaption (i.e., setting the rank, the modulation and coding scheme (MCS), and the multiple-input multiple-output (MIMO) precoder) for, e.g., physical uplink shared channel (PUSCH) transmission. The signal is, in terms of functionality, similar to the downlink (DL) CSI reference signal (CSI-RS), which provides similar beam management and link adaption functions in the DL. It is noted that SRS can also be used instead of (or in combination with) CSI-RS to acquire DL CSI (by means of reciprocity) for, e.g., enabling physical downlink shared channel (PDSCH) link adaption.

In LTE and NR, the SRS may be configured via radio resource control (RRC) and some parts of the configuration may be updated for, e.g., reduced latency through medium access control (MAC) control element (CE) signaling. The configuration includes, for example, the SRS resource allocation, i.e. the physical mapping and sequence to use, as well as the time behavior, i.e. aperiodic, semi-persistent, or periodic. For aperiodic SRS transmission, the RRC configuration does not activate an SRS transmission from the user equipment (UE, also referred to herein as "communication device"), but instead a dynamic activation trigger may be transmitted from the gNB in the DL, via the downlink control information (DCI) in the physical downlink control channel (PDCCH), which may instruct the UE to transmit the SRS once, at a predetermined time.

In some approaches, e.g., in 3GPP new radio (NR) Rel. 17, partial sounding and transmission comb may be supported. As a consequence, for some combinations of a SRS configuration, the SRS configuration involving, for example, at least one of a SRS bandwidth, a transmission comb, and a partial sounding, a resulting sequence length for an SRS resource may not be among those sequence lengths supported in NR Rel. 16. Since no new SRS sequence lengths are introduced in NR Rel. 17, there may be a problem regarding how a communication device (e.g., a UE) behaves when such an SRS configuration is signalled (or not) from a network node to the communication device.

There may be an additional problem in that some SRS configurations may be undefined. Thus, there may be a need for mechanisms or communication device behavior to handle such SRS configurations.

SUMMARY

It may be an object of the invention to provide a framework for how to handle SRS configurations where partial frequency sounding is configured to the communication device and/or a particular transmission comb is configured to the communication device, where the SRS configuration results in non-supported SRS sequence lengths. It may also be an object to provide a framework where a network node does not signal an SRS configuration based on a determination by the network node that the SRS configuration has a SRS sequence length that is not supported by the communication device. It may furthermore be an object to provide mechanisms or communication device behaviors to handle such SRS configurations.

According to an aspect, a method performed by a communication device in a telecommunications network may comprise at least one of (i) receiving a sounding reference signal (SRS) configuration from a network node having an SRS sequence length that is non-supported by the communication device, the SRS configuration involving at least one of a bandwidth configuration, a transmission comb configuration, and a partial sounding factor configuration, and (ii) not receiving the SRS configuration based on a determination by the network node that the SRS configuration has an SRS sequence length that is not supported by the communication device. The method may further comprise prohibiting or allowing the SRS configuration.

According to another aspect, a communication device may comprise processing circuitry, and a memory coupled with the processing circuitry. The memory may include instructions that when executed by the processing circuitry causes the communication device to perform operations. The operations may comprise at least one of (i) receive a sounding reference signal, SRS, configuration from a network node having an SRS sequence length that is non-supported by the communication device, the SRS configuration involving at least one of a bandwidth configuration, a transmission comb configuration, and a partial sounding factor configuration, and (ii) not receive the SRS configuration based on a determination by the network node that the SRS configuration has an SRS sequence length that is not supported by the communication device. The operations may also comprise prohibit or allow the SRS configuration.

According to another aspect, a communication device may be adapted to at least one of (i) receive a sounding reference signal, SRS, configuration from a network node having an SRS sequence length that is non-supported by the communication device, the SRS configuration involving at least one of a bandwidth configuration, a transmission comb configuration, and a partial sounding factor configuration, and (ii) not receive the SRS configuration based on a determination by the network node that the SRS configuration has an SRS sequence length that is not supported by the communication device. The communication device may be also adapted to prohibit or allow the SRS configuration.

According to another aspect, a computer program may comprise program code to be executed by processing circuitry of a communication device, whereby execution of the program code causes the communication device to perform operations. The operations may comprise at least one of (i) receive a sounding reference signal, SRS, configuration from a network node having an SRS sequence length that is non-supported by the communication device, the SRS configuration involving at least one of a bandwidth configuration, a transmission comb configuration, and a partial sounding factor configuration, and (ii) not receive the SRS configuration based on a determination by the network node that the SRS configuration has an SRS sequence length that is not supported by the communication device. The operation may also comprise prohibit or allow the SRS configuration.

According to another aspect, a computer program product may comprise a non-transitory storage medium including program code to be executed by processing circuitry of a communication device, whereby execution of the program code causes the communication device to perform operations. The operations may comprise at least one of (i) receive a sounding reference signal, SRS, configuration from a network node having an SRS sequence length that is non-supported by the communication device, the SRS configuration involving at least one of a bandwidth configuration, a transmission comb configuration, and a partial sounding factor configuration, and (ii) not receive the SRS configuration based on a determination by the network node that the SRS configuration has an SRS sequence length that is not supported by the communication device. The operations may also comprise prohibit or allow the SRS configuration.

According to another aspect, a method performed by a network node in a telecommunications network may comprise at least one of (i) signalling, to a communication device, a sounding reference signal, SRS, configuration having an SRS sequence length that is non-supported by the communication device, the SRS configuration involving at least one of a bandwidth configuration, a transmission comb configuration, and a partial sounding factor configuration, and (ii) not signalling the SRS configuration based on a determination by the network node that the SRS configuration has a SRS sequence length that is not supported by the communication device. The method may also comprise, responsive to the at least one of the signalling and the not signalling, at least one of (i) not receiving from the communication device a SRS according to the signalled SRS configuration, and (ii) allowing the SRS configuration.

According to another aspect, a network node may comprise processing circuitry, and memory coupled with the processing circuitry. The memory may include instructions that when executed by the processing circuitry causes the network node to perform operations. The operations may comprise at least one of (i) signal, to a communication device, a sounding reference signal, SRS, configuration having an SRS sequence length that is non-supported by the communication device, the SRS configuration involving at least one of a bandwidth configuration, a transmission comb configuration, and a partial sounding factor configuration, and (ii) not signal the SRS configuration based on a determination by the network node that the SRS configuration has a SRS sequence length that is not supported by the communication device. The operations may also comprise, responsive to the at least one of the signalling and the not signalling, at least one of (i) not receive from the communication device a SRS according to the signalled SRS configuration, and (ii) allow the SRS configuration.

According to another aspect, a network node may be adapted to at least one of (i) signal, to a communication device, a sounding reference signal, SRS, configuration having an SRS sequence length that is non-supported by the communication device, the SRS configuration involving at least one of a bandwidth configuration, a transmission comb configuration, and a partial sounding factor configuration, and (ii) not signal the SRS configuration based on a determination by the network node that the SRS configuration has a SRS sequence length that is not supported by the communication device. The network node may be also adapted to, responsive to the at least one of the signalling and the not signalling, at least one of (i) not receive from the communication device an SRS according to the signalled SRS configuration, and (ii) allow the SRS configuration.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1A is a schematic illustrating how an SRS resource is allocated in time and frequency, within a slot if resourceMapping-r16 is not signaled.

FIG. 1B is an excerpt of table 6.4.1.4.3-1 of 3GPP TS-38.211, version 16.2.0, Rel. 16.

FIG. 9 illustrates a table which describes SRS antenna-switching capabilities supported by the UE.

FIG. 10 is a table of supported partial-sounding factors $P_f$ (where "1" means no partial sounding) for a minimum SRS sequence length of 6, in accordance with some embodiments of the present disclosure.

FIG. 25 illustrates a table showing proposed number of supported SRS resource sets for each antenna switching configuration and how the corresponding SRS resources can be divided between the supported number of SRS resource sets.

FIG. 27 illustrates a table showing system-level simulation parameters.

DETAILED DESCRIPTION

Figure 2:
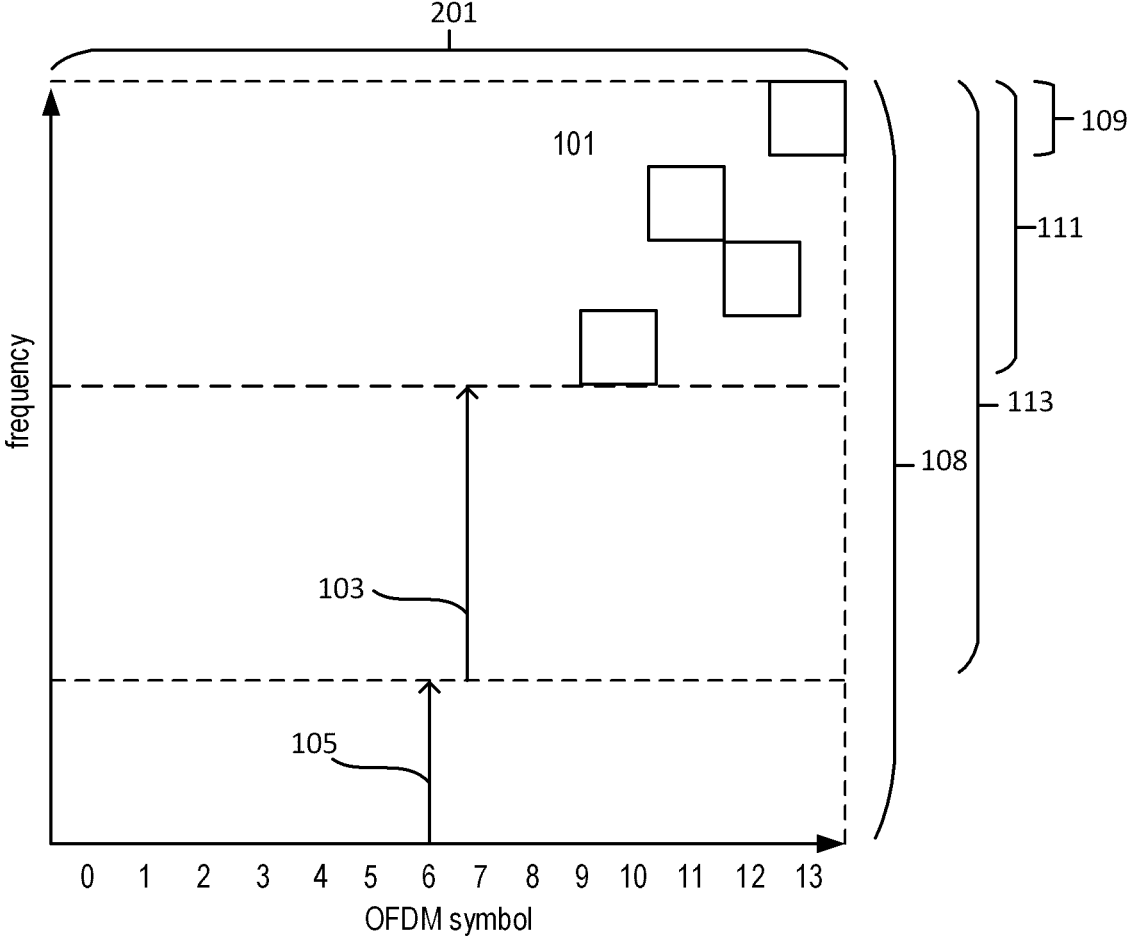
FIG. 2 is a schematic illustrating how an SRS resource is allocated in time and frequency within a slot if resourceMapping-r16 is signaled.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The following explanation of potential problems with some approaches is a present realization as part of the present disclosure and is not to be construed as previously known by others.

As mentioned above, in some approaches, e.g., in 3GPP NR Rel. 17, partial sounding and transmission comb may be supported. As a consequence, for some combinations of an SRS configuration (e.g., involving at least one of a SRS bandwidth, a transmission comb, and a partial sounding), a resulting sequence length for an SRS resource may not be among those supported in NR Rel. 16. Since no new SRS sequence lengths may be introduced in NR Rel. 17, there may be a problem regarding how a communication device (e.g., a US) behaves when such an SRS configuration is signalled (or not) from a network node to the communication device.

There may be an additional problem in that some SRS configurations may be undefined. Thus, there may be a need for mechanisms or communication device behavior to handle such SRS configurations.

Various embodiments of the present disclosure may provide solutions to these and other potential problems. In various embodiments of the present disclosure, a framework is provided for how to handle SRS configurations where partial frequency sounding is configured to the communication device and/or a particular transmission comb is configured to the communication device, where the SRS configuration results in non-supported SRS sequence lengths; or where a network node does not signal an SRS configuration based on a determination by the network node that the SRS configuration has a SRS sequence length that is not supported by the communication device, Potential advantages provided by various embodiments of the present disclosure may include increased SRS capacity gains and more flexible SRS frequency allocations using partial frequency soundings or transmission comb without misconfigurations that may otherwise result in non-supported SRS sequences. Another potential advantage may include, when a network node does not send an SRS configuration based on a determination by the network node that the SRS configuration is prohibited (e.g., non-supported), behavior of the communication may be provided (e.g., the communication device expects not to receive the SRS configuration).

In LTE and NR, the SRS may be configured via radio resource control (RRC) and some parts of the configuration can be updated (for reduced latency) through medium access control (MAC) control element (CE) signaling. The configuration includes, for example, the SRS resource allocation (the physical mapping and sequence to use) as well as the time behavior (aperiodic/semi-persistent/periodic). For aperiodic SRS transmission, the RRC configuration does not activate an SRS transmission from the user equipment (UE, also referred to herein as "communication device"), but instead a dynamic activation trigger may be transmitted from the gNB in the DL, via the downlink control information (DCI) in the physical downlink control channel (PDCCH), which may instruct the UE to transmit the SRS once, at a predetermined time. Below, some aspects of SRS are described in more detail.

SRS Resource Configuration

SRS resource configuration will now be discussed below.

The SRS configuration may allow generating an SRS transmission pattern based on SRS resource configurations grouped into SRS resource sets. Each SRS resource may be configured with the following abstract syntax notation (ASN) code in RRC (see 3GPP TS 38.331 version 16.1.0):

```
SRS-Resource ::=                  Sequence {
  srs-ResourceId                    SRS-ResourceId,
  nrofSRS-Ports                     ENUMERATED {port1, ports2, ports4},
  ptrs-PortIndex                    ENUMERATED {n0, n1 }        OPTIONAL,    -- Need R
  transmissionComb                  CHOICE {
    n2                                SEQUENCE {
      combOffset-n2                     INTEGER (0..1),
      cyclicShift-n2                    INTEGER (0..7)
    },
    n4                                SEQUENCE {
      combOffset-n4                     INTEGER (0..3),
      cyclicShift-n4                  INTEGER (0..11)
    }
  },
  resourceMapping                   SEQUENCE {
    startPosition                     INTEGER (0..5),
    nrofSymbols                       ENUMERATED {n1, n2, n4},
    repetitionFactor                  ENUMERATED {n1, n2, n4}
  },
  freqDomainPosition                INTEGER (0..67),
  freqDomainShift                   INTEGER (0..268),
  freqHopping                       SEQUENCE {
    c-SRS                             INTEGER (0..63),
    b-SRS                             INTEGER (0..3),
    b-hop                             INTEGER (0..3)
  },
  groupOrSequenceHopping            ENUMERATED { neither, groupHopping, sequenceHopping },
  resourceType                      CHOICE {
    aperiodic                         SEQUENCE {
      ...
    },
    semi-persistent                   SEQUENCE {
      periodicityAndOffset-sp           SRS-PeriodicityAndOffset,
      ...
    },
    periodic                          SEQUENCE {
      periodicityAndOffset-p            SRS-PeriodicityAndOffset,
      ...
    }
  },
  sequenceId              INTEGER (0..1023),
  spatialRelationInfo     SRS-SpatialRelationInfo             OPTIONAL,    -- Need R
  ...,
  [[
  resourceMapping-r16     SEQUENCE {
    startPosition-r16         INTEGER (0..13),
    nrofSymbols-r16           ENUMERATED {n1, n2, n4},
    repetitionFactor-r16      ENUMERATED {n1, n2, n4}
  }                                                OPTIONAL   -- Need R
  ]]
}
```

To create the SRS resource on the time-frequency grid with the current RRC configuration, each SRS resource may thus be configurable with respect to:

The transmission comb (i.e., mapping to every nth sub-carrier, where n=2 or n=4), configured by the RRC parameter transmissionComb. Transmission comb 2 (or in short comb 2) may indicate that n=2 and transmission comb 4 (or in short comb 4) may indicate that n=4. The transmission comb may include:

A comb offset, configured by the RRC parameter combOffset. The comb offset may specify which of the n combs should be used.

A cyclic shift, configured by the RRC parameter cyclicShift, that maps the SRS sequence to the assigned comb. The cyclic shift may increase the number of SRS resources that can be mapped to a comb. However, there is a limit on how many cyclic shifts can be used (that depends on the transmission comb being used, e.g., 8 for comb 2 and 12 for comb 4). In other words, the cyclic shift may be limited to 8 for comb 2 and the cyclic shift may be limited to 12 for comb 4.

The time-domain position within a given slot may be configured with the RRC parameter resourceMapping, which includes:

A time-domain start position, which may be limited to be one of the last 6 symbols in a slot, the time-domain start position being configured by the RRC parameter startPosition.

A number of orthogonal frequency-division multiplexing (OFDM) symbols for the SRS resource (that can be set to 1, 2 or 4) which may be configured by the RRC parameter nrofSymbols.

A repetition factor (that can be set to 1, 2 or 4) configured by the RRC parameter repetitionFactor. When this parameter is larger than 1, the same frequency resources are used multiple times across OFDM symbols. Thus, the coverage is improved as more energy is collected by the receiver. It can also be used for beam-management functionality, where the gNB can probe different receive beams for each repetition.

The frequency-domain sounding bandwidth and position of an SRS resource in a given OFDM symbol (i.e., which part of the system bandwidth is occupied by the SRS resource) which may be configured with the RRC parameters freqDomainPosition, freqDomainShift and the freqHopping parameters; and the parameters c-SRS, b-SRS and b-hop. The smallest possible sounding bandwidth in a given OFDM symbol may be 4 resource blocks (RBs). The c-SRS, b-SRS, and b-hop parameters may be used to determine the frequency hopping pattern and are defined in more detail in clause 6.4.1.4.3 of specification 3GPP TS 38.211, see, for example, version 16.2.0 of Rel-16. More details are provided with regard to FIGS. 1A and 1B below.

FIG. 1A is a schematic diagram illustrating how an SRS resource may be allocated in time and frequency, within a slot if resourceMapping-r16 is not signaled. Note that semi-persistent/periodic SRS resources typically span several slots. As shown with reference sign 107 in FIG. 1A, an SRS resource can be located in up to 4 out of 6 OFDM symbols in a slot configured by the parameters startPosition and nrofSymbols.

In short, the SRS bandwidth and frequency hopping pattern may be configured using c-SRS, b-hop, and b-SRS. Note that c-SRS controls the maximum sounding bandwidth 113, which can be smaller than the maximum transmission bandwidth 108 that the UE supports, see FIG. 1A. Thus, the maximum sounding bandwidth 113 may be configured using the c-SRS. For example, according to table 6.4.1.4.3-1 of 3GPP TS-38.211, the maximum sounding bandwidth 113 may be equal to 32 RB when c-SRS=9. This is also shown in FIG. 1B which shows an excerpt of table 6.4.1.4.3-1 of 3GPP TS-38.211. As shown in FIG. 1B, c-SRS sets the row of the table that should be considered. For example, the UE may have the capability to transmit over 40 MHz bandwidth, i.e. the maximum transmission bandwidth 108 may be 40 MHz, but c-SRS may be set to a smaller value corresponding to 5 MHz, thereby focusing the available transmit power to a narrowband transmission which improves the SRS coverage and enables multiplexing of SRS resources (and, hence, UEs) over the 40 MHz.

FIG. 1A furthermore shows the actual sounding bandwidth 111 over all frequency hops. The actual sounding bandwidth 111 may be called the hopping bandwidth and may be configured by c-SRS and b-hop. The hopping bandwidth may be 16 RBs, e.g. half the maximum sounding bandwidth 113, when c-SRS=9 and b-hop=1, see FIG. 1B, column $B_{SRS}=1$ and row $C_{SRS}=9$.

In addition, the actual sounding bandwidth 109 per frequency hop may be configured by c-SRS, b-hop, and b-SRS, see FIG. 1A. The actual sounding bandwidth 109 may be 4 RBs, e.g. one fourth of the actual sounding bandwidth 111 over all frequency hops when c-SRS=9, b-hop=1, and b-SRS=3, see FIG. 1B, column $B_{SRS}=1$ and row $C_{SRS}=9$.

The start of the maximum sounding bandwidth 113 may be configured by freqDomainShift 105, see FIG. 1A. In other words, the freqDomainShift 105 may indicate the starting point of the maximum sounding bandwidth 113 within the maximum transmission bandwidth 108 supported by the UE.

The start of the actual sounding bandwidth 111 (measured from the start of the maximum sounding bandwidth 113) may be configured by freqDomainPosition 103, see FIG. 1A. In other words, within the maximum sounding bandwidth 108, the freqDomainPosition 103 may indicate the starting point of the actual sounding bandwidth 111.

If b-SRS>b-hop, frequency hopping may be configured. The start position of the actual sounding bandwidth 109 per frequency hop within the actual sounding bandwidth 111 over all frequency hops may vary over symbols and slots according to a predefined pattern, see pattern 101 in FIG. 1A. The pattern illustrated in FIG. 1A is consistent with the pattern defined in 3GPP TS-38.211 for the case when the number of SRS symbols per slot is 4. However, this is not limiting, and any other pattern can be used for frequency hopping.

It is noted that other combinations of c-SRS, b-hop, and b-SRS can be used which may yield other configurations of SRS bandwidth and frequency hopping.

In NR release 16, an additional (and optional) RRC parameter called resourceMapping-r16 is introduced. If resourceMapping-r16 is signaled, the UE shall ignore the RRC parameter resourceMapping. The difference between resourceMapping-r16 and resourceMapping is that the SRS resource (for which the number of OFDM symbols and the repetition factor is still limited to 4) can start in any of the 14 OFDM symbols (as illustrated in FIG. 2) within a slot, configured by the RRC parameter startPosition-r16.

FIG. 2 is a schematic diagram illustrating how an SRS resource is allocated in time and frequency within a slot if resourceMapping-r16 is signaled. As shown with reference sign 201 in FIG. 2, an SRS resource can be located in up to 4 out of all 14 OFDM symbols in a slot configured by the parameters startPosition-r16 and nrofSymbols-16. The reference signs 101, 103, 105, 108, 109, 111, 113 of FIG. 2 describe the bandwidths and parameters with the corresponding reference signs in FIG. 1A. For conciseness reasons, a detailed description of these bandwidths and parameters is omitted and it is referred to the description given with regard to FIG. 1A.

The RRC parameter resourceType may determine whether the SRS resource is transmitted as periodic, aperiodic (single transmission triggered by DCI), or semi persistent (same as periodic except for the start and stop of the periodic transmission being controlled through MAC CE signaling instead of RRC signaling). The RRC parameter sequenceId may specify how the SRS sequence is initialized and the RRC parameter spatialRelationInfo may configure the spatial relation for the SRS beam with respect to another reference signal (RS), which could be another SRS, a synchronization signal block (SSB), or a CSI-RS. If an SRS resource has a spatial relation to another SRS resource, this SRS resource should be transmitted with the same beam (i.e., spatial transmit filter) as the indicated SRS resource.

SRS Resource-Set Configuration

The SRS resource-set configuration will now be discussed in detail below.

The SRS resource may be transmitted as part of an SRS resource set. Note that all resources in a resource set must share the same resource type. Within an SRS resource set, the following parameters (common to all SRS resources in the set) may be configured in RRC:

The associated CSI-RS resource (this configuration is only applicable for non-codebook-based UL transmission) for each of the possible resource types. The possible resource types may be aperiodic, periodic, and semi persistent.

For an aperiodic SRS, the associated CSI-RS resource may be set by the RRC parameter csi-RS.

For semi-persistent/periodic SRS, the associated CSI-RS resource may be set by the RRC parameter associatedCSI-RS.

For aperiodic SRS, the slot offset may be configured by the RRC parameter slotOffset and may set the delay from the PDCCH trigger reception to the start of the SRS transmission (measured in slots).

The resource usage, which may be configured by the RRC parameter usage sets constraints and assumptions on the resource properties (see below and 3GPP TS 38.214 for further details).

The power-control RRC parameters alpha, p0, pathloss-ReferenceRS (indicating the DL RS that is used for path-loss estimation), srs-PowerControlAdjustment-States, and pathlossReferenceRSList-r16 (for NR release 16), which may be used for determining the SRS transmit power (see 3GPP TS 38.213 for further details).

Each SRS resource set may be configured with the following ASN code in RRC (see 3GPP TS 38.331, version 16.1.0):

SRS resources in an SRS resource set that may be configured with usage 'beamManagement' may be mainly applicable for frequency bands above 6 GHz (i.e., for frequency range 2 (FR2)). The purpose is to allow for the UE to evaluate different UE transmit beams for wideband (e.g., analog) beamforming arrays. The UE may then transmit one SRS resource per wideband beam, and the gNB may perform reference signal received power (RSRP) measurement on each of the transmitted SRS resources and, in this way, determine a suitable UE transmit beam. The gNB may then report to the UE which transmit beam to use by updating the spatial relation for different UL RSs. It is expected that the

```
SRS-ResourceSet ::=                        SEQUENCE {
  srs-ResourceSetId                          SRS-ResourceSetId,
  srs-ResourceIdList                         SEQUENCE (SIZE(1..maxNrofSRS-ResourcesPerSet)) OF
SRS-ResourceId                             OPTIONAL, -- Cond Setup
  resourceType                               CHOICE {
    aperiodic                                  SEQUENCE {
      aperiodicSRS-ResourceTrigger               INTEGER (1..maxNrofSRS-TriggerStates-1),
      csi-RS                                     NZP-CSI-RS-ResourceId
OPTIONAL, -- Cond NonCodebook
      slotOffset                                 INTEGER (1..32)
OPTIONAL, -- Need S ...,
      [[
      aperiodicSRS-ResourceTriggerList             SEQUENCE (SIZE(1..maxNrofSRS-TriggerStates-2))
                                                     OF INTEGER (1..maxNrofSRS-TriggerStates-
1) OPTIONAL -- Need M
      ]]
    },
    semi-persistent                            SEQUENCE {
      associatedCSI-RS                           NZP-CSI-RS-ResourceId
OPTIONAL, -- Cond NonCodebook
      ...
    },
    periodic                                   SEQUENCE {
      associatedCSI-RS                           NZP-CSI-RS-ResourceId
OPTIONAL, -- Cond NonCodebook
      ...
    }
  },
  usage                                      ENUMERATED {beamManagement, codebook, nonCodebook,
antennaSwitching},
  alpha                                      Alpha
OPTIONAL, -- Need S
  p0                                         INTEGER (-202..24)
OPTIONAL, -- Cond Setup
  pathlossReferenceRS                        PathlossReferenceRS-Config
OPTIONAL, -- Need M
  srs-PowerControlAdjustmentStates           ENUMERATED { sameAsFci2, separateClosedLoop}
OPTIONAL, -- Need S
  ...,
  [[
  pathlossReferenceRSList-r16                SetupRelease { PathlossReferenceRSList-r16}
OPTIONAL -- Need M
  ]]
}
```

To summarize, the SRS resource-set configuration may determine, e.g., usage, power control, aperiodic transmission timing, and CSI-RS resource association. The SRS resource configuration, on the other hand, may determine the time-and-frequency allocation, the periodicity and offset of each resource, the sequence ID for each resource, and the spatial-relation information.

Usages and mapping to antenna ports Usages and mapping to antenna ports will now be discussed below.

SRS resource sets can be configured with one of four different usages: 'beamManagement', 'codebook', 'non-Codebook' and 'antennaSwitching'.

gNB configures one SRS resource set with usage 'beam-Management' for each analog array (i.e., panel) that the UE has.

SRS resources in an SRS resource set that may be configured with usage 'codebook' may be used to sound the different UE antennas and help the gNB to determine a suitable UL precoder, transmission rank, and MCS for PUSCH transmission. How each SRS port is mapped to each UE antenna may be, however, up to UE implementation and not known at the gNB side.

SRS resources in an SRS resource set that may be configured with usage 'nonCodebook' may be used to sound different potential UL precoders that may be determined by the UE (and not known at the gNB side). Specifically, the UE may determine a set of precoder candidates (e.g., based on reciprocity) and transmit one SRS resource per candidate UL precoder. The gNB can then, by indicating a subset of these SRS resources, indicate which UL precoder(s) that the UE should apply for PUSCH transmission. One UL layer may be transmitted per indicated SRS. Note that how the UE maps SRS resources to antenna ports may be up to UE implementation.

SRS resources in an SRS resource set that may be configured with usage 'antennaSwitching' may be used to sound the channel in the UL so that the gNB can use reciprocity to determine suitable DL precoders. The UE may be expected to transmit one SRS port per UE antenna. The mapping from SRS ports to antenna ports may be, however, up to the UE to decide and may be transparent to the gNB. SRS antenna switching is covered in greater detail below.

SRS Coverage

SRS coverage will now be discussed in detail below.

Figures 3, 4:
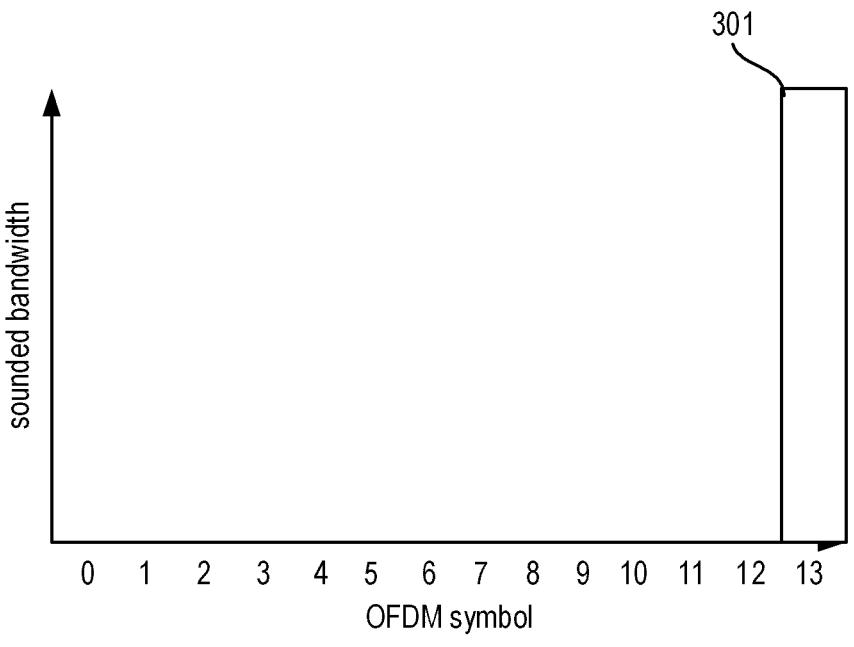
FIG. 3 is a schematic diagram illustrating an example of SRS transmission without frequency hopping and/or repetition.
FIG. 4 is a schematic diagram illustrating a frequency-hopping pattern set according to Section 6.4 of 3GPP TS 38.211.

UL coverage for SRS has been identified as a bottleneck for NR and a limiting factor for DL reciprocity-based operation. Therefore, some approaches to improve the coverage of SRS have been adopted in NR: repetition of an SRS resource and/or frequency hopping. Before explaining these two approaches, FIG. 3 illustrates, for reference, an example of SRS transmission 301 without frequency hopping and/or repetition. The SRS transmission 301 may be used as baseline for the subsequent FIGS. 4 to 6. Referring to FIG. 3, the entire bandwidth (which is configured by the RRC parameters c-SRS and b-hop) is sounded in a single OFDM symbol.

An example of frequency hopping is illustrated in FIG. 4, where the illustrated frequency-hopping pattern is set according to Section 6.4 of 3GPP TS 38.211. However, the frequency-hopping pattern is not limited to the frequency-hopping pattern illustrated in FIG. 4 and can be any other frequency-hopping pattern. Referring to FIG. 4, the SRS transmission 401 uses frequency hopping and different parts of the frequency band are sounded in each of four different OFDM symbols. This means that the SRS energy may improve, for example by a factor four compared to the baseline case in FIG. 3, at the cost of more symbols being used for SRS and a shorter SRS sequence length per OFDM symbol.

Figures 5, 6:
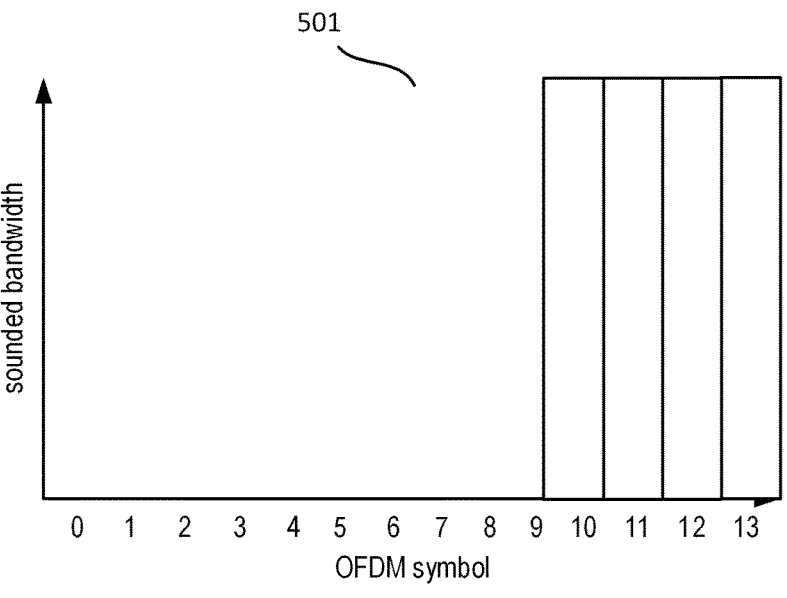
FIG. 5 is a schematic diagram illustrating an example of repetition, where one SRS resource is transmitted in four consecutive OFDM symbols.
FIG. 6 is a schematic diagram illustrating a periodic SRS resource (with periodicity one) over two slots.

FIG. 5 is a schematic diagram illustrating an example of repetition, where the SRS transmission 501 uses repetition and one SRS resource may be transmitted in four consecutive OFDM symbols. This may be done by setting the number of SRS symbols per slot and the repetition factor to four. Setting the number of SRS symbols per slot and the repetition factor to four is just an example and it is possible setting the number of SRS symbols per slot and the repetition factor to any other number than four. Again, by doing so, the energy for SRS is increased, for example by a factor four compared to the baseline shown in FIG. 3, at the cost of more symbols being used for SRS and decreased SRS (multiplexing) capacity.

It is noted that frequency hopping and repetition can be used together and that, for semi-persistent and periodic SRS, the frequency-hopping pattern may continue beyond the slot boundary. For aperiodic SRS, on the other hand, all parts of the configured bandwidth must be sounded within a slot. To illustrate these two points, FIG. 6 is a schematic diagram illustrating a periodic SRS resource (with periodicity one) over two slots. Referring to FIG. 6, the SRS transmission 601 uses both frequency hopping and repetition over two slots. The frequency-hopping configuration is the same as in FIG. 4, the repetition factor is two, and the number of SRS symbols per slot is four. Note that in this example (and in all the previous examples) all hops (the hops being illustrated as boxes in FIGS. 4, 5 and/or 6) belong to the same SRS resource.

SRS Capacity

SRS capacity will now be discussed in detail below.

SRS capacity, i.e. the number of SRS ports that can be multiplexed onto a limited set of time-and-frequency resources, has also been identified as a bottleneck for NR. Therefore, approaches to improve the capacity of SRS have been adopted in NR, which include using transmission comb 2 or 4 (i.e., sounding only every 2nd or 4th subcarrier within the configured bandwidth), and multiplexing several SRS ports onto the same transmission comb by using different cyclic shifts.

Figure 7A:
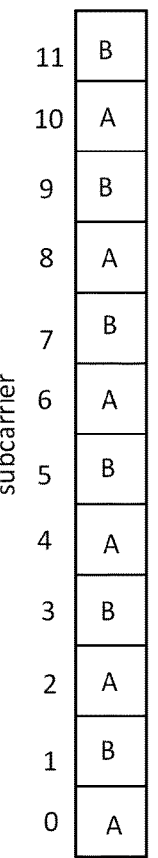
FIGS. 7A and 7B are schematic diagrams illustrating how 2 or 4 single-port SRS resources can be multiplexed onto the same configured SRS bandwidth by using transmission comb 2 and 4, respectively.
Figure 7B:
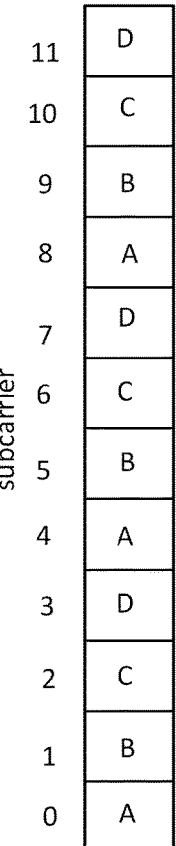

FIGS. 7A and 7B are schematic diagrams illustrating how 2 or 4 single-port SRS resources can be multiplexed onto the same configured SRS bandwidth by using transmission comb 2 and 4, respectively. Referring to FIGS. 7A and 7B, the different SRS resources have been configured with a different comb offset (i.e., RRC-configured with different values of the parameter combOffset, see the discussion above). FIG. 7A illustrates how 2 single-port SRS resources A and B can be multiplexed onto the same configured SRS bandwidth by using transmission comb 2. FIG. 7B illustrates how 4 single-port SRS resources A, B, C, and D can be multiplexed onto the same configured SRS bandwidth by using transmission comb 4.

The SRS base sequences, which are used in NR, are such that they may be pairwise orthogonal under cyclic shifts. Utilizing this property, it is possible to multiplex several SRS ports onto the same transmission comb by using different cyclic shifts (and the same base sequence) per SRS port. In NR Rel-16, the maximum number of cyclic shifts may be 8 and 12 for transmission comb 2 and 4, respectively. For multi-port SRS resources, the different SRS ports belonging to the same SRS resource may be configured with a port-specific cyclic shift per SRS port. Furthermore, for four-port SRS resources, it is possible to use up to two different transmission combs (with two SRS ports and, hence, two cyclic shifts per comb). Further details can be found in 3GPP TS 38.211.

Figure 8:
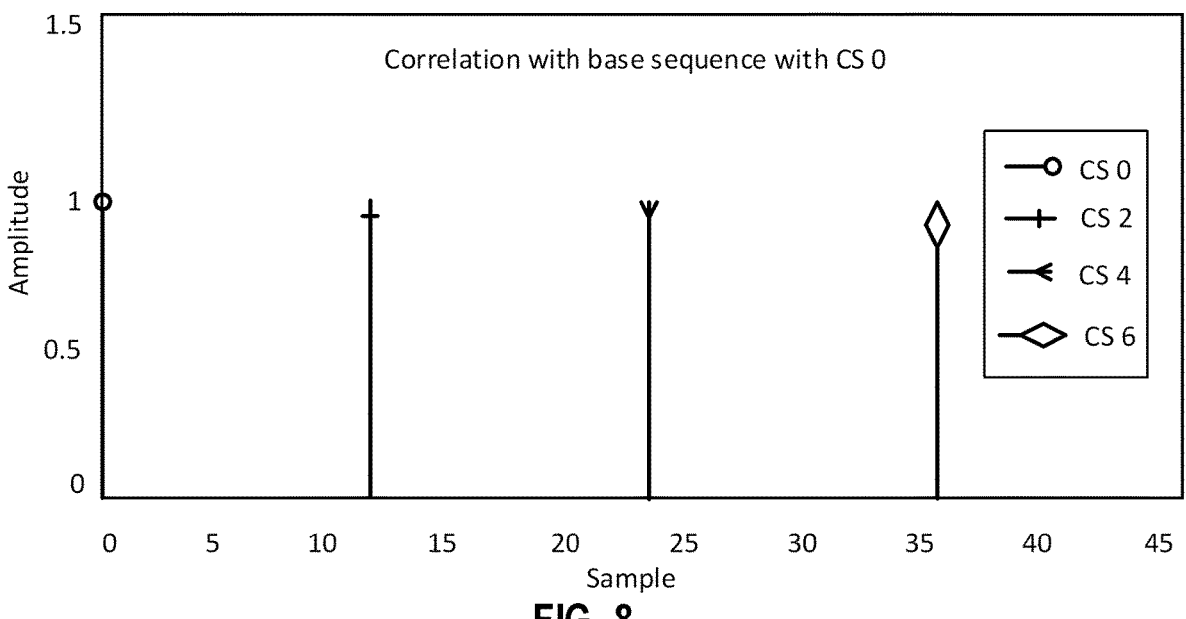
FIG. 8 is a schematic diagram illustrating, in the discrete-time domain, the (amplitude value of the) correlation between a cyclically shifted base sequence and the corresponding non-shifted base sequence.

FIG. 8 is a schematic diagram illustrating, in the discrete-time domain, the (amplitude value of the) correlation between a cyclically shifted base sequence and the corresponding non-shifted base sequence. Referring to FIG. 8, the transmission comb is 2 (such that the maximum number of cyclic shifts is 8) and the sequence length is 48 (which corresponds to an SRS transmission spanning 8 RBs). As shown in FIG. 8, the sequences are orthogonal and, hence, can be separated by means of simple signal processing (e.g., through time-domain windowing). CS in FIG. 8 stands for cyclic shift.

An additional measure to increase the SRS capacity is to not sound the entire transmission bandwidth using SRS. As discussed above, in NR Rel-16, the minimum configurable SRS bandwidth per OFDM symbol may be 4 RBs.

SRS Power Control

SRS power control will now be discussed in detail below.

SRS has its own UL power control (PC) scheme in NR, which can be found in Section 7.3 of 3GPP TS 38.213 and that specifies how the UE should split the available output power between two or more SRS ports during one SRS transmit occasion. An SRS transmit occasion is a time window within a slot where SRS transmission is performed.

SRS Antenna Switching

SRS antenna switching will now be discussed in detail below.

Since it is desirable for the gNB to sound all UE antennas (where sounding an antenna means transmitting an SRS from that antenna, which, in turn, enables the gNB to estimate the channel between said UE antenna and the gNB antennas) but costly to equip the UE with many transmit ports, SRS antenna switching is introduced in NR release 15 for UEs equipped with more receive chains than transmit chains. If a UE supports antenna switching, it may report so by means of UE-capability signaling.

FIG. 9 illustrates a table which describes SRS antenna-switching capabilities supported by the UE.

Referring to the table shown in FIG. 9, the left column (copied from 3GPP TS 38.306) lists SRS antenna-switching capabilities that can be reported by a UE in NR release 15. For example, if a UE reports t1r2 it means that it has two receive antennas (i.e., it has two receive chains) but that it only has the possibility of transmitting from one of those antennas at a time (i.e., it has one transmit chain) with support for antenna switching. In this case, two single-port SRS resources can be configured for the UE such that it can sound both receive ports using a single transmit port with an antenna switch in between.

Still referring to the table shown in FIG. 9, additional UE capabilities are introduced in NR Release 16, as shown in the right column of the table. The right column of the table indicates support for the UE to be configured with SRS resource set(s) with usage 'antennaSwitching' but where only a subset of all UE antennas is sounded. For example, the UE capability t1r1-t1r2 indicates that the gNB can configure one single-port SRS resource (no antenna switching) or two single-port SRS resources (same as for the capability "t1r2" described above) with usage 'antennaSwitching' per SRS resource set. In this case, if the UE is configured with a single SRS resource (no antenna switching), it will only sound one of its two antennas. This may save UE power consumption at the cost of reduced channel knowledge at the gNB since the gNB can only estimate the channel between itself and the UE based on one of the two UE antennas.

3GPP Rel-17 RAN #104-e Meeting

3GPP Rel-17 RAN #104-e meeting will now be discussed in detail below.

In the RAN1 #104-e meeting, the following was agreed with regard to SRS capacity-and-coverage enhancements:

For Rel-17 SRS capacity and coverage enhancement, the following is supported:

Increase the maximum number of repetition symbols in one slot and one SRS resource to S Support at least one S value from {8, 10, 12, 14}. FFS other candidate values.

Support to transmit SRS only in $m_{SRS,b_{SRS}}/P_f$ contiguous RBs in one OFDM symbol, where $m_{SRS,b_{SRS}}$ indicates the number of RBs configured by $b_{SRS}$ and $C_{SRS}$.

Support at least one $P_f$ value from {2, [3], 4, 8}.

FFS other candidate values, e.g., non-integer values for $P_f$.

Note: SRS sequence shorter than the minimum length supported in the current specification is not pursued.

No new sequence including length is introduced.

FFS it is applicable to frequency hopping and non-frequency hopping.

FFS detailed signaling mechanism to determine $P_f$ and the location of the $m_{SRS,b_{SRS}}/P_f$ RBs.

Support Comb 8

Note: SRS sequence shorter than the minimum length supported in the current specification is not pursued.

FFS whether and if needed, how to use harmonized approach to define the three supported schemes Note: other schemes for SRS capacity and coverage enhancements are not supported in Rel-17.

The following explanation of potential problems with some approaches is a present realization as part of the present disclosure and is not to be construed as previously known by others.

According to the above agreement (RAN #104-e), partial sounding (i.e., transmitting SRS only in in $m_{SRS,b_{SRS}}/P_f$ contiguous resource blocks (RBs) in one orthogonal frequency division multiplexing (OFDM) symbol) and transmission comb 8 is supported in NR Rel-17. Transmission comb 8 has not been described above but works similarly to transmission combs 2 and 4. In this case, 8 single-port SRS resources may be multiplexed onto the same configured SRS bandwidth by using transmission comb 8. This agreement implies that the sequence length for an SRS resource may be $M=12 \cdot m_{B_{SRS}}/(K_{TC} \cdot P_f)$, where 12 relates to 12 subcarriers and $m_{SRS,b_{SRS}}$ denotes the number of resource blocks (RBs) for SRS. As used herein, the term $m_{b_{SRS}}$ may be interchangeable and replaced with the term $m_{SRS,b_{SRS}}$. Furthermore, $K_{TC}$ denotes the transmission comb and $P_f$ is a parameter used for partial frequency sounding as defined in the above agreement (RAN #104-e). $K_{TC}$ may be 2 for transmission comb 2, 4 for transmission comb 4, and 8 for transmission comb 8. However, according to the above agreement, no new SRS sequence lengths are introduced.

In the current NR (Rel-16) specification, possible SRS sequence lengths may be 6, 12, 18, 24, or greater than or equal to 30. Possible SRS sequence lengths may be multiples of 6. The SRS sequence length may be 6 for positioning only. With reference to the above agreement (RAN #104-e), for some combinations of SRS bandwidth, transmission comb, and partial sounding, the resulting sequence length is not among those supported by NR Rel-16. In other words, for some combinations of $m_{b_{SRS}}$, $K_{TC}$, and $P_f$, an SRS resource length M may be obtained which is not supported by NR Rel-16. Hence, since no new SRS sequence lengths are introduced in NR Rel-17 (see above agreement (RAN #104-e)), there may be a problem regarding how the UE will behave when such SRS configuration is signaled from the network, e.g. from the gNB, to the UE.

An additional potential problem is that some SRS configurations are undefined, since it reduces the configuration flexibility. Hence, there is a need for new mechanisms, rules, and/or UE behaviors to handle these SRS configurations which are undefined.

In various embodiments of the present disclosure described below, a method may be provided for how to handle SRS configurations including configurations, to the UE, for partial frequency sounding and/or (transmission) comb 8, wherein such configurations result in non-existing SRS sequence lengths. Non-existing SRS sequence lengths may be SRS sequence lengths which have not been specified in previous 3GPP TS releases.

Potential advantages of the below described various embodiments of the present disclosure may include enablement of more SRS capacity gains and more flexible SRS frequency allocations using partial frequency sounding and/or comb 8 without misconfigurations that would otherwise result in non-supported SRS sequences.

In order to achieve the above described advantages, rules that describe the UE behavior may be included, wherein the rules may be used to prohibit (or alternatively, in some embodiments, allow) certain SRS configurations resulting in non-existing SRS sequence lengths. The rules may be implemented on the UE-side or on the network side.

In order to achieve the above described advantages, processes that describe the UE behavior may be included, wherein the processes may automatically adapt an SRS configuration resulting in a non-existing SRS sequence length to a new SRS configuration fulfilling the requirement of legacy SRS sequence lengths. The processes may be implemented on the UE-side and may be executed by the UE.

In some embodiments, for a given SRS configuration from the network (e.g., a gNodeB) to the UE, involving at least a bandwidth configuration, a transmission-comb configuration, and a partial-sounding configuration, if the resulting SRS sequence length M is not among those lengths supported by a Rel-16 terminal, i.e. a UE supporting Rel-16, then the above stated rules and/or process(es) may be applied.

In some embodiments, if a SRS resource configuration is not supported in a standard (e.g., 3GPP standard) and if the SRS resource configuration is received by the UE from the gNodeB, the UE can ignore the configuration and/or the UE behavior is undefined. It is also possible that the UE is not expected to receive such SRS resource configuration which is not supported in the standard.

In some embodiments, the above stated rule and/or process(es) only apply if partial sounding $P_f$ has been configured for the SRS resource. If the factor $P_f=1$ is signaled or if the factor is absent from the RRC signalling to the UE, then the rule and/or process(es) may not apply.

In some embodiments, if the configured partial-sounding factor $P_f$ is above a specified (e.g., defined) threshold value (i.e., leads to non-supported sequence lengths M), the UE may instead transmit the SRS to the gNodeB by using the largest possible supported partial-sounding factor $P_f$ which leads to a supported SRS sequence length.

In some embodiments, if there are SRS sequence lengths that are shorter than the resulting (non-supported) sequence length, the shortest supported SRS sequence length may be used instead, for example, by the UE. In some embodiments, if the sequence length is shortened, the non-sounded sub-carriers may be the last (or first) within the configured SRS bandwidth. In other words, the last or first part of the original, longer, sequence may be used. In other embodiments, if the sequence length is shortened, the sounded subcarriers may be the most central within the configured SRS bandwidth. In other words, a part of the original, longer, sequence is used where both samples in the beginning and in the end of the original sequence is not used for transmission.

In some embodiments, the SRS sequence length may be 6 (e.g., which may be supported in NR Rel. 17 of 3GPP, including not only for SRS for positioning). In some embodiments, the minimum SRS sequence length may be 6 or 12 (e.g., each, or either of which may be supported in NR Rel. 17 of 3GPP).

The above described example embodiments relating to various aspects, like prohibiting SRS configurations and causing new SRS sequence lengths (e.g., with rules), will be discussed in more detail below. The example embodiments may ensure that a network node, like a gNodeB, is prevented from configuring the UE with SRS sequence lengths which are not supported. Furthermore, the example embodiments may ensure that new UE procedures are defined to handle situations where the network node incorrectly configures SRS, i.e. configures the UE with SRS sequence lengths which are not supported.

Aspect 1

Aspect 1 refers to several embodiments which prohibit certain SRS configurations that would result in non-existing SRS sequence lengths on the UE-side. Thus, it is prevented that incorrect SRS configuration is performed with regard to the UE.

In some embodiments of aspect 1, a rule may be defined, the rule specifying which combinations (if any) of partial sounding factor $P_f$ and comb $K_{TC}$ are supported for a certain per-hop SRS bandwidth $m_{B_{SRS}}$. The rule may be applied by the UE or the network node to determine whether a combination of $m_{B_{SRS}}$, $K_{TC}$, and $P_f$ leads to a supported SRS sequence length. The rule can, for example, be specified as equations as exemplified by Equation (1) and (2) below:

$$12 \cdot m_{B_{SRS}}/(K_{TC}P_f) \geq X \qquad (1)$$

$$12 \cdot m_{B_{SRS}}/(K_{TC}P_f) \in \{[6], 12, 18, 24, 30, 31 \ldots , 1632\} \qquad (2)$$

In some embodiments, X may be either equal to 6 or 12 depending, e.g., on the minimum SRS sequence length supported in NR Rel. 17. $K_{TC}$ may indicate the transmission comb and may be equal to 2, 4, or 8.

UE capability signalling may be used from the UE to the network node, e.g. gNodeB, using RRC to indicate whether or not the UE supports partial frequency signalling. In some embodiments, when a UE does not support partial frequency sounding (e.g., by the use of UE capability signalling from UE to the network using RRC) or if partial sounding is not configured by the network to the UE (e.g., using RRC), then $P_f$ in Equation (1) may be automatically (e.g., by default) set to 1. When the UE supports partial frequency sounding and signals the capability to support partial frequency sounding, the network node may set $P_f$ to a value supported in the 3GPP standard.

When the UE or the network node determines that the rule, for example the two equations (1) and (2), is not fulfilled, the SRS configuration may be prohibited. When the SRS configuration is prohibited, the UE may not transmit any SRS to the network node, since the SRS sequence length resulting from $P_f$, $K_{TC}$, and $m_{B_{SRS}}$ is not supported. When the network node determines that the rule, for example the two equations (1) and (2), is not fulfilled and thus the SRS configuration is prohibited, the network node may not transmit the SRS configuration to the UE or may still transmit the SRS configuration to the UE. When the network node transmits the SRS configuration to the UE even though the SRS configuration is prohibited, the network node may not expect to receive SRS from the UE. The network node may select another SRS configuration until the rule is fulfilled.

When the UE or the network node determines that the rule, i.e. the two equations (1) and (2), is fulfilled, the SRS configuration may be allowed. When the SRS configuration is allowed, the UE may start transmitting SRS to the network node, since the SRS sequence length resulting from $P_f$, $K_{TC}$, and $m_{B_{SRS}}$ is supported. When the network node determines that the rule, for example the two equations (1) and (2), is fulfilled and thus the SRS configuration is allowed, the network node may transmit the SRS configuration to the UE. The network node may expect to receive SRS from the UE according to the transmitted SRS configuration.

When the network node does not receive any SRS within a predefined time period, for example within a time period of several milliseconds or the like, the network node may select new values for $P_f$, $K_{TC}$, and $m_{B_{SRS}}$ and may thus provide new a new SRS configuration. This process of selecting new values for $P_f$, $K_{TC}$, and $m_{B_{SRS}}$ may be repeated as often as necessary until the two equations (1) and (2) are fulfilled and/or the network node receives SRS from the UE.

Thus, it is prevented that the UE is configured with SRS sequence lengths which are not supported.

Aspect 2

Aspect 2 describes further embodiments which also prohibit certain SRS configurations that would result in non-existing SRS sequence lengths on the UE-side.

In some embodiments of aspect 2, a mapping may be used indicating which partial sounding factors $P_f$ are allowed for certain combs $K_{TC}$ and per-hop bandwidths $m_{B_{SRS}}$. In some embodiments, the mapping may be a table as illustrated in FIG. 10. FIG. 10 is a table of supported partial-sounding factors $P_f$ (where "1" means no partial sounding) for a minimum SRS sequence length of 6. The table shown in FIG. 10 indicates the possible partial-sounding factors $P_f$ with regard to specific per-hop bandwidths $m_{B_{SRS}}$ and certain combs $K_{TC}$. For example, if $m_{B_{SRS}}$=4 and $K_{TC}$=2, the supported partial-sounding factors $P_f$ are 1, 2, and 4. $P_f$=1 may imply that the UE does not support partial frequency signalling. This may be signalled using UE capability signalling from the UE to the network node via RRC. Note that, depending on the outcome of standardization work, like the outcome of NR Rel-17 standardization work, other partial sounding factors $P_f$ than the ones listed in the table shown in FIG. 10 (i.e. $P_f$ equal to 1, 2, 3, 6, or 8) may be supported, for example fractional partial sounding factors $P_f$ like 1.5, 2.5 etc.

For example, the UE or the network node is preconfigured to use the mapping, like a table, to determine which partial sounding factors $P_f$ are allowed for certain combs $K_{TC}$ and per-hop bandwidths $m_{B_{SRS}}$. If the UE receives SRS configurations from the network node which are not supported, i.e. combinations of partial sounding factors $P_f$, combs $K_{TC}$, and per-hop bandwidths $m_{B_{SRS}}$ which are not supported, the SRS configuration may be prohibited and the UE may not transmit any SRS to the network node. If the network node determines based on the mapping that the SRS configuration is prohibited, the network node either may still transmit the SRS configuration to the UE but may not expect to receive SRS from the UE, or may not transmit the SRS configuration to the UE. The network node may provide a new SRS configuration until the SRS configuration is allowed.

Similar to aspect 1, when the network node does not receive any SRS within a predefined time period, for example within a time period of several milliseconds or the like, the network node may select new values for $P_f$, $K_{TC}$, and $m_{B_{SRS}}$. This process of selecting new values for $P_f$, $K_{TC}$, and $m_{B_{SRS}}$, using the mapping to determine if the SRS configuration is prohibited or allowed, and transmitting the newly selected values to the UE may be repeated as often as necessary until the UE or network node determines, based on the mapping, that the partial sounding factor $P_f$ is allowed for the comb $K_{TC}$ and per-hop bandwidth $m_{B_{SRS}}$. When the SRS configuration is allowed, the UE may transmit SRS to the network node based on the allowed SRS configuration.

While embodiments discussed herein with regard to aspect 2 are explained in the non-limiting context of a table, the invention is not so limited. Instead, other mappings may be used, including without limitation, the following additional example of a data association. In some embodiments, the minimum SRS sequence length may be set to 12, and some of the entries in the table FIG. 10 may be removed accordingly. In some embodiments, the mapping (e.g., a table) may be included in NR Rel. 17.

In some embodiments, instead of listing the supported configurations, the non-supported configurations may be listed, for example, as a table or as a list of combinations.

In some embodiments, all combinations of partial sounding factors $P_f$, comb $K_{TC}$, and per-hop frequency bandwidths $m_{B_{SRS}}$ that are not explicitly indicated in a table may be supported in the specification.

In some embodiments, the table may include a value of 1 (as shown in FIG. 10), which may always be supported when an SRS sequence length of 6 is supported for SRS.

In aspects 1 and 2 described above, the rule and mapping may always be applied even if partial frequency signalling is not supported by the UE and $P_f$=1. However, it is also possible that the rule(s) and mapping described in the above embodiments are only applied if partial sounding is configured, i.e. the UE supports partial frequency signalling (e.g., which may rely on UE-capability signaling) and $P_f$>1.

Example embodiments related to implicitly adapting SRS frequency allocation will now be discussed with regard to aspects 3 and 4.

Aspect 3

Aspect 3 relates to several embodiments of a method which describes a UE behavior for automatically adapting an SRS configuration resulting in a non-existing/non-supported SRS sequence length to a new SRS configuration fulfilling the requirement of legacy SRS sequence lengths. Thus, the new SRS configuration results in existing/supported SRS sequence lengths.

In some embodiments of aspect 3, a method is introduced which may include automatically adjusting the frequency allocation and a subset of sequence samples used by an SRS resource sequence that violates rules of supported sequence lengths. This example embodiments of aspect 3 may provide robustness towards misconfigurations and may ensure that no RRC reconfiguration is required if the SRS bandwidth is dynamically updated (e.g., dynamic update of SRS bandwidth is currently discussed in 3GPP). This example embodiment of aspect 3 may also allow increased flexibility since there are no "forbidden" sequence lengths when it comes to transmission. This example embodiment may also simplify implementation since legacy sequence lengths are maintained, and only what is actually transmitted is adjusted.

In some embodiments, when a UE is configured with a partial sounding factor $P_f$ that is not supported (e.g., due to non-supported SRS sequence length), the partial sounding factor $P_f$ may be automatically updated to another value that fulfills the requirement of supported SRS sequence lengths. The automatic update may be performed by the UE. The UE may transmit SRS to the network node using the updated partial sounding factor $P_f$.

In some embodiments, when the configured partial sounding factor $P_f$ results in a non-supported SRS sequence length, the partial sounding factor $P_f$ may be updated to the highest number (within the set of supported partial-sounding factors), including 1 (no partial sounding that generates a supported SRS sequence length that is lower than the currently configured partial sounding factor $P_f$). The update of the partial sounding factor $P_f$ may be performed by the UE. The UE may transmit SRS to the network node using the updated partial sounding factor $P_f$.

In an example embodiment, when the set of valid values for $P_f$ is {1, 2, 3, 4} and a UE is configured with per-hop frequency bandwidths $m_{B_{SRS}}$=12, combs $K_{TC}$=8, and partial-sounding factor $P_f$=4 (which results in a non-supported SRS sequence length, e.g., M=4.5), then the UE may automatically use the partial sounding factor $P_f$=3, which results in a supported sequence length for that SRS (M=6, in this example embodiment). In a case where sequence length 6 is not supported, the UE may instead use $P_f$=1 (which results in M=18, in this example embodiment).

Aspect 4

Aspect 4 relates to further embodiments of another method which describes a UE behavior for automatically adapting an SRS configuration resulting in a non-existing/non-supported SRS sequence length to a new SRS configuration fulfilling the requirement of legacy SRS sequence lengths. Thus, the new SRS configuration results in existing/supported SRS sequence lengths.

In some embodiments of aspect 4, the frequency allocation of an SRS resource that violates rules of supported sequence lengths may be automatically adjusted.

In some embodiments, when the UE is configured with a partial sounding factor $P_f$, comb $K_{TC}$, and per-hop frequency bandwidth $m_{B_{SRS}}$ that results in a non-supported SRS sequence length M, one or more sub-carriers may be implicitly added/removed from the SRS frequency allocation until an SRS sequence length that is supported is attained.

In an example embodiment, if M=9 (corresponding, e.g., to the SRS configuration $m_{B_{SRS}}$=12, $K_{TC}$=8, and $P_f$=2), only 6 out of the 9 subcarriers within the configured SRS bandwidth may be sounded.

In some embodiments, when a certain SRS configuration results in a non-supported SRS sequence length X, then sub-carriers in the lower end and/or upper end of the per-hop frequency band may be omitted until the SRS sequence length becomes supported.

In the example embodiment above, given the closest supported SRS sequence length that is smaller, three sub-carriers in the beginning (or the end) of the configured bandwidth may not be sounded.

In some embodiments, a most central subcarrier of the configured bandwidth may be sounded.

To sum it up, aspects 1 and 2 provide methods for prohibiting certain SRS configurations which result in non-existing SRS sequence lengths, wherein the UE only transmits SRS to the network node when the SRS configuration results in existing and/or supported SRS sequence lengths. When the SRS configuration results in non-existing SRS sequence lengths, the UE waits for a new SRS configuration resulting in existing SRS sequence lengths before transmitting the SRS to the network node. On the other hand, aspects 3 and 4 provide methods for automatically adapting, by the UE, an SRS configuration resulting in non-existing SRS sequence lengths to a new SRS configuration resulting in existing and/or supported SRS sequence lengths. In other words, in embodiments 3 and 4, the UE also accepts incorrect SRS configurations resulting in non-existing SRS sequence lengths, wherein the UE transmits SRS using a new SRS configuration obtained by adapting the incorrect SRS configuration.

Communication Device

In the following, a communication device is described in more detail below. The communication device may be the UE described above.

Figure 11:
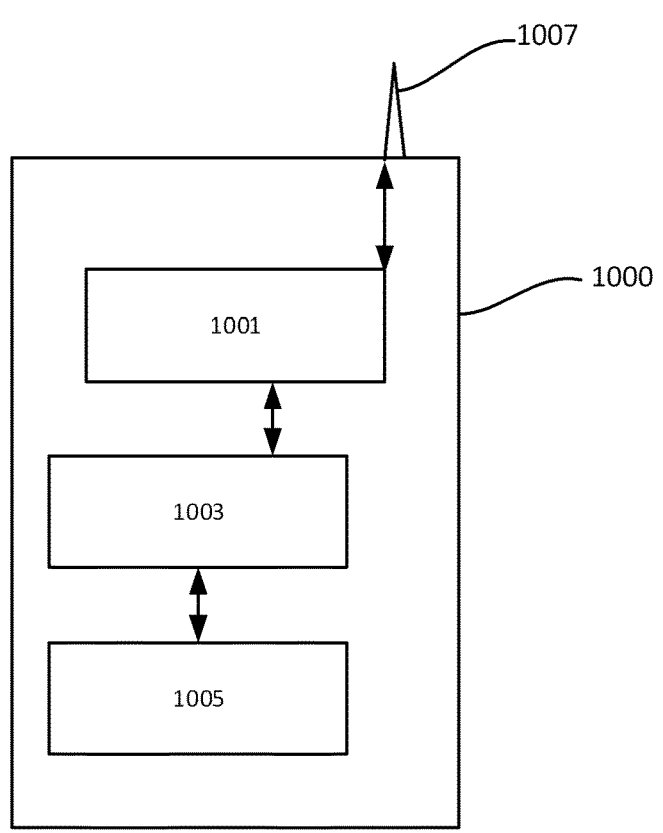
FIG. 11 is a block diagram illustrating a communication device (also referred to as a "UE") according to some embodiments of the present disclosure.

FIG. 11 is a block diagram illustrating elements of a communication device 1000 (also referred to as a user equipment ("UE"), mobile terminal, a mobile communication terminal, a wireless communication device, a wireless terminal, a wireless device, mobile device, a wireless communication terminal, a user equipment node/terminal/device, etc.). The communication device 1000 may be configured to provide wireless communication according to embodiments of the present disclosure. The communication device 1000 may be provided, for example, as discussed below with respect to wireless device 4110 of FIG. 15, UE 4200 of FIG. 16, UEs 4491, 4492 of FIG. 18, and UE 4530 of FIG. 19. As shown, the communication device 1000 may include an antenna 1007 (e.g., corresponding to antenna 4111 of FIG. 15), and a transceiver circuitry 1001 (also referred to as a transceiver, e.g., corresponding to interface 4114 of FIG. 15; interfaces 4205, 4209, 4211, transmitter 4233, and receiver 4235 of FIG. 16; and radio interface 4537 of FIG. 19) including a transmitter and a receiver configured to provide uplink and downlink radio communications with a base station(s) (e.g., corresponding to network node 4160 of FIG. 15, also referred to as a RAN node) of a radio access network. The communication device 1000 may also include a processing circuitry 1003 (also referred to as a processor, e.g., corresponding to processing circuitry 4120 of FIG. 15, processor 4201 of FIG. 16, and processing circuitry 4538 of FIG. 21) coupled to the transceiver circuitry 1001, and a memory circuitry 1005 (also referred to as memory, e.g., corresponding to device readable medium 4130 of FIG. 15) coupled to the processing circuitry 1003. The memory circuitry 1005 may include computer readable program code that when executed by the processing circuitry 1003 causes the processing circuitry to perform operations according to embodiments disclosed herein. According to other embodiments, the processing circuitry 1003 may be defined to include a memory so that a separate memory circuitry 1005 is not required. The communication device 1000 may also include an interface (such as a user interface) coupled with the processing circuitry 1003, and/or the communication device 1000 may be incorporated in a vehicle.

As discussed herein, operations of the communication device 1000 may be performed by processing circuitry 1003 and/or transceiver circuitry 1001. For example, the processing circuitry 1003 may control the transceiver circuitry 1001 to transmit communications through the transceiver circuitry 1001 over a radio interface to a radio access network node (also referred to as a base station) and/or to receive communications through the transceiver circuitry 1001 from a RAN node over a radio interface. Moreover, modules may be stored in the memory circuitry 1005, and these modules may provide instructions so that when instructions of a module are executed by the processing circuitry 1003, the processing circuitry 1003 performs respective operations (e.g., operations discussed herein with respect to example embodiments relating to communication devices).

Network Node

In the following, a network node is described in more detail below. The network node may be the gNodeB described above or any other base station.

Figure 12:
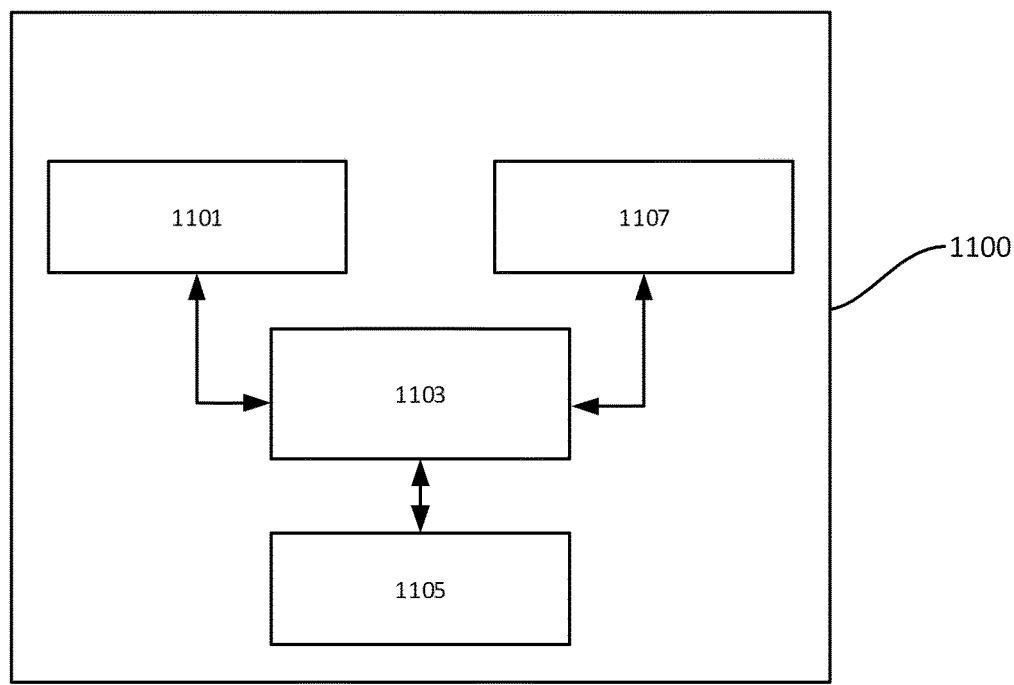
FIG. 12 is a block diagram illustrating a network node according to some embodiments of the present disclosure.

FIG. 12 is a block diagram illustrating elements of a network node 1100 (also referred to as a radio access network (RAN) node, base station, eNodeB/eNB, gNodeB/gNB, etc.) of a Radio Access Network ("RAN"). The network node 1100 may be configured to provide cellular communication according to embodiments of the present disclosure. The network node 1100 may be provided, for example, as discussed below with respect to network node 4160 of FIG. 15, base stations 4412a-c of FIG. 18, and/or base station 4520 of FIG. 19, all of which should be considered interchangeable in the examples and embodiments described herein and be withing the intended scope of this disclosure, unless otherwise noted. As shown, the network node 1100 may include a transceiver circuitry 1101 (also referred to as a transceiver, e.g., corresponding to portions of interface 4190 of FIG. 15 and/or portions of radio interface 4527 of FIG. 19) including a transmitter and a receiver configured to provide uplink and downlink radio communications with mobile terminals, for example with the communication device 1000. The network node 1100 may include a network interface circuitry 1107 (also referred to as a network interface, e.g., corresponding to portions of interface 4190 of FIG. 15 and/or portions of communication interface 4526 of FIG. 19) configured to provide communications with other nodes (e.g., with other base stations) of a RAN and/or core network CN. The network node 1100 may also include a processing circuitry 1103 (also referred to as a processor, e.g., corresponding to processing circuitry 4170 of FIG. 15 and/or processing circuitry 4528 of FIG. 19) coupled to the transceiver circuitry 1101, and a memory circuitry 1105 (also referred to as memory, e.g., corresponding to device readable medium 4180 of FIG. 15) coupled to the processing circuitry 1103. The memory circuitry 1105 may include computer readable program code that when executed by the processing circuitry 1103 causes the processing circuitry 1103 to perform operations according to embodiments disclosed herein. According to other embodiments, the processing circuitry 1103 may be defined to include a memory so that a separate memory circuitry 1105 is not required.

As discussed herein, operations of the network node 1100 may be performed by the processing circuitry 1103, the network interface 1107, and/or the transceiver 1101. For example, the processing circuitry 1103 may control the transceiver 1101 to transmit downlink communications through the transceiver 1101 over a radio interface to one or more mobile terminals or mobile UEs or communication device 1000 and/or to receive uplink communications through transceiver 1101 from one or more mobile terminals or mobile UEs or communication device 1000 over a radio interface. Similarly, the processing circuitry 1103 may control the network interface 1107 to transmit communications through the network interface 1107 to one or more other network nodes and/or to receive communications through network interface from one or more other network nodes. Moreover, modules may be stored in the memory 1105, and these modules may provide instructions so that when instructions of a module are executed by the processing circuitry 1103, the processing circuitry 1103 performs respective operations (e.g., operations discussed herein with respect to example embodiments relating to network nodes).

According to some other embodiments, a network node may be implemented as a core network CN node without a transceiver. In such embodiments, transmission to a communication device may be initiated by the network node so that transmission to the communication device is provided through a network node including a transceiver (e.g., through a base station or RAN node). According to embodiments where the network node is a RAN node including a transceiver, initiating transmission may include transmitting through the transceiver.

The text uses the terminology in the NR specification as main examples and refer to the Rel-17 feature. However, it is important to mention that this feature may also be applicable in the context of 6G research. This may also relevant for other multi-beam transmission schemes, such as in Tera Hertz communications system, which may be the case in some frequencies possibly allocated to 6G and/or 5G enhancements.

Figure 13:
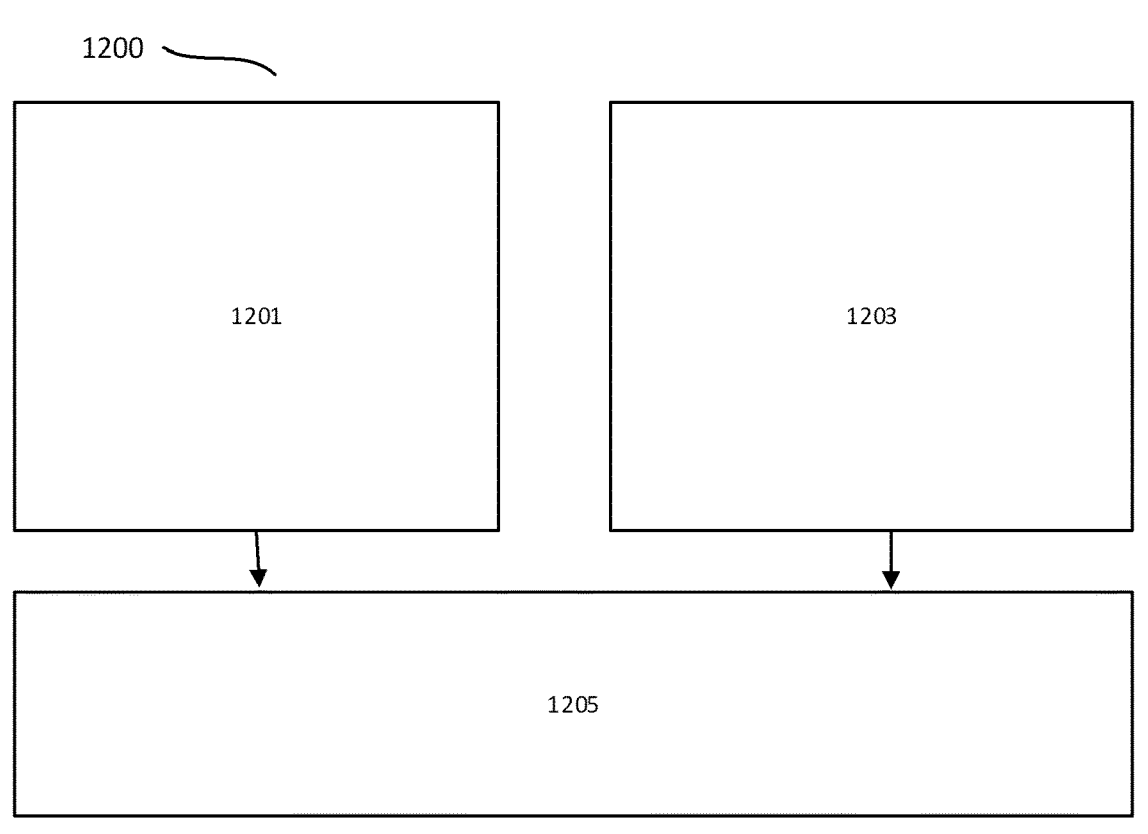
FIG. 13 is a flow chart illustrating examples of operations of a communication device according to some embodiments of the present disclosure.

Operations of a communication device (implemented using the structure of the block diagram of FIG. 11 will now be discussed with reference to the flow chart of FIG. 13 according to some embodiments of the present disclosure. FIG. 13 illustrates a method 1200 performed by a communication device 1000 in a telecommunications network. For example, modules may be stored in memory 1005 of FIG. 11, and these modules may provide instructions so that when the instructions of a module are executed by respective communication device processing circuitry 1003, the processing circuitry 1003 performs respective operations of the flow chart.

At blocks 1201 and 1203, the method 1200 includes at least one of (i) receiving 1201 a sounding reference signal (SRS) configuration from a network node having an SRS sequence length that is non-supported by the communication device, and (ii) not receiving (1203) the SRS configuration based on a determination by the network node that the SRS configuration has an SRS sequence length that is not supported by the communication device. The SRS configuration may involve at least one of a bandwidth configuration, a transmission comb configuration, and a partial sounding factor configuration. The bandwidth configuration may comprise a SRS frequency bandwidth.

At block 1205, the method 1200 further includes applying at least one of (i) either prohibiting or allowing the SRS configuration, (ii) a first adaption to the SRS configuration to obtain a new SRS configuration that is supported by the communication device, and (iii) a second adaption of an SRS transmission to map the SRS to a subset of configured subcarriers.

In some embodiments, when not receiving 1203 the SRS configuration, the prohibiting comprises ignoring the SRS configuration received from the network node having an SRS sequence length that is non-supported by the communication device.

In some embodiments, when not receiving the SRS configuration, the prohibiting comprises that the communication device expects not to receive the SRS configuration.

In some embodiments, the prohibiting comprises that behavior of the communication device is undefined when the SRS configuration received from the network node has the SRS sequence length that is non-supported by the communication device.

In some embodiments, the prohibiting applies when the partial sounding factor is configured and has a value other than one.

In some embodiments, the partial sounding factor has a value above a defined threshold value, and the first adaption comprises using a largest possible partial sounding factor that results in a supported SRS sequence length.

In some embodiments, the first adaption comprises using an SRS sequence length that is shorter than the non-supported SRS sequence length.

In some embodiments, the bandwidth is an SRS frequency bandwidth, and the second adaption of the SRS transmission to map the SRS to a subset of configured subcarriers comprises mapping an SRS having a shorter SRS sequence length than the non-supported SRS sequence length to subcarriers other than the lower end and/or upper end of the SRS frequency bandwidth to which the SRS with the non-supported SRS sequence length would have been mapped.

In some embodiments, the bandwidth is a an SRS frequency bandwidth, and the second adaption of the SRS transmission to map the SRS to a subset of configured subcarriers comprises mapping an SRS having a shorter SRS sequence length than the non-supported SRS sequence length to a central portion of the SRS frequency bandwidth to which the SRS with the non-supported SRS sequence length would have been mapped.

In some embodiments, the either prohibiting or allowing comprises applying a rule.

In some embodiments, the rule includes a mapping of a plurality of partial sounding factors that are either allowed or prohibited to a plurality of combinations of transmission comb values and the bandwidth configuration in a number of resource blocks per an orthogonal frequency division multiplexing (OFDM) symbol for the SRS.

In some embodiments, the rule includes a mapping of a plurality of partial sounding factors to a plurality of combinations of transmission comb values and the bandwidth configuration in a number of resource blocks per OFDM symbol for the SRS, wherein a combination that is omitted from the mapping is an allowed SRS configuration.

In some embodiments, the first adaption includes an adjustment of a frequency allocation and a subset of sequence samples used by an SRS resource sequence in the SRS configuration.

Various operations from the flow chart of FIG. 13 may be optional with respect to some embodiments of communication devices and related methods. For example, with regard to embodiment 3 below, blocks 1201 of FIG. 13 may be optional.

Operations of a network node 1100 (implemented using the structure of the block diagram of FIG. 12) will now be discussed with reference to the flow chart of FIG. 14 according to some embodiments of the present disclosure. For example, modules may be stored in memory 1105 of FIG. 12, and these modules may provide instructions so that when the instructions of a module are executed by respective network node processing circuitry 1103, the processing circuitry 1103 performs respective operations of the flow chart.

At blocks 1301 and 1303, the method 1300 includes at least one of (i) signalling 1301, to a communication device 1000, a sounding reference signal (SRS) configuration having an SRS sequence length that is non-supported by the communication device 1000, the SRS configuration involving at least one of a bandwidth configuration, a transmission comb configuration, and a partial sounding factor configuration, and (ii) not signalling 1303 the SRS configuration based on a determination by the network node 1100 that the SRS configuration has a SRS sequence length that is not supported by the communication device 1000.

In some embodiments, the not receiving 1305 comprises ignoring the SRS configuration received from the network node 1100 having an SRS sequence length that is non-supported by the communication device 1000.

In some embodiments, when not signalling 1303 the SRS configuration, the not receiving 1305 comprises that the communication device 1000 expects not to receive the SRS configuration.

In some embodiments, responsive to the signalling 1301, the receiving a SRS according to a new SRS configuration comprises that behavior of the communication device 1000 is undefined when the SRS configuration received from the network node 1100 has the SRS sequence length that is non-supported by the communication device 1000.

In some embodiments, responsive to the signalling 1301, the receiving a SRS according to a new SRS configuration applies when the partial sounding factor is configured and has a value other than one.

In some embodiments, when the partial sounding factor has a value above a defined threshold value, the receiving a SRS according to a new SRS configuration comprises using a largest possible partial sounding factor that results in a supported SRS sequence length.

In some embodiments, the receiving a SRS according to a new SRS configuration comprises using an SRS sequence length that is shorter than the non-supported SRS sequence length.

In some embodiments, the bandwidth is an SRS frequency bandwidth, and the receiving a SRS according to a new SRS configuration comprises an adaption of the SRS transmission by the communication device 1000 mapping the SRS to a subset of configured subcarriers, and wherein the mapping comprises mapping an SRS having a shorter SRS sequence length than the non-supported SRS sequence length to subcarriers other than the lower end and/or upper end of the SRS frequency bandwidth to which the SRS with the non-supported SRS sequence length would have been mapped.

In some embodiments, the bandwidth is a an SRS frequency bandwidth, and the receiving a SRS according to a new SRS configuration comprises an adaption of the SRS transmission by the communication device 1000 mapping the SRS to a subset of configured subcarriers, and wherein the mapping comprises mapping an SRS having a shorter SRS sequence length than the non-supported SRS sequence length to a central portion of the SRS frequency bandwidth to which the SRS with the non-supported SRS sequence length would have been mapped.

In some embodiments, the at least one of (i) not receiving 1305 from the communication device 1000 a SRS according to the signalled SRS configuration, the (ii) allowing the SRS configuration, and the (iii) receiving a SRS according to a new SRS configuration comprises applying a rule.

In some embodiments, the rule includes a mapping of a plurality of partial sounding factors that are either allowed or prohibited to a plurality of combinations of transmission comb values and the bandwidth configuration in a number of resource blocks per an orthogonal frequency division multiplexing, OFDM, symbol for the SRS.

In some embodiments, the rule includes a mapping of a plurality of partial sounding factors to a plurality of combinations of transmission comb values and the bandwidth configuration in a number of resource blocks per OFDM symbol for the SRS, wherein a combination that is omitted from the mapping is an allowed SRS configuration.

In some embodiments, the at least one of (i) not receiving 1305 from the communication device a SRS according to the signalled SRS configuration, and the (iii) receiving a SRS according to a new SRS configuration comprises an adjustment of a frequency allocation and a subset of sequence samples used by a SRS resource sequence in the SRS configuration.

Figure 14:
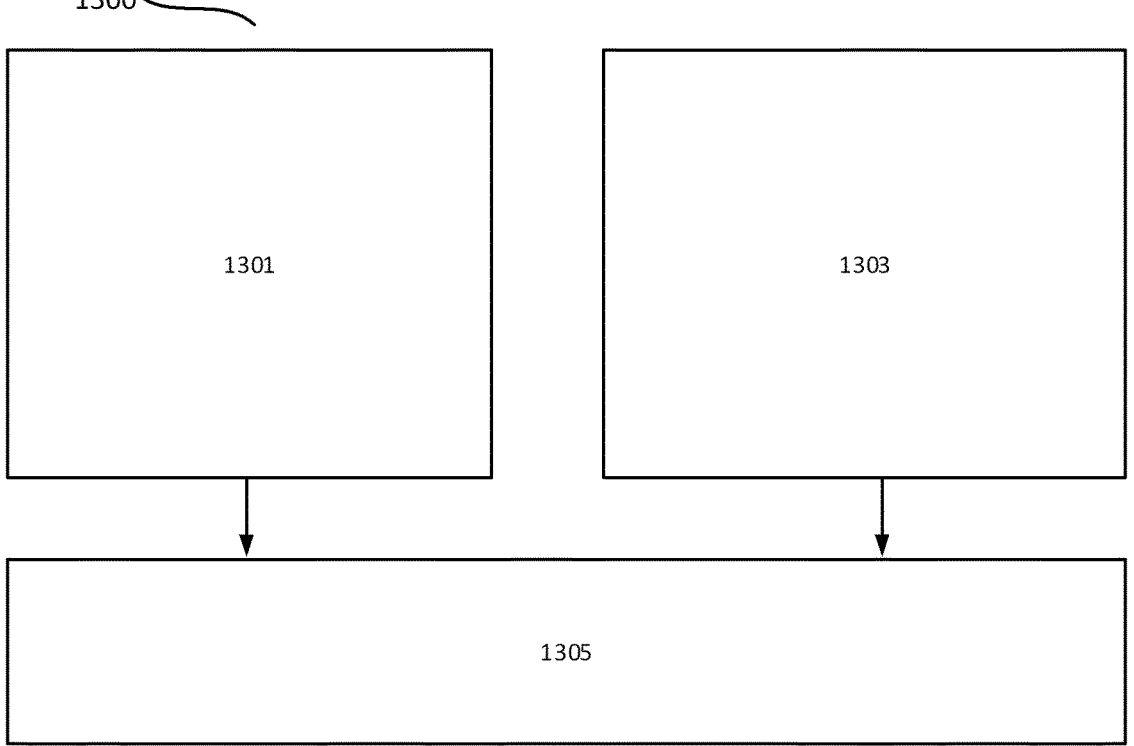
FIG. 14 is a flow chart illustrating examples of operations of a network node according to some embodiments of the present disclosure.

Various operations from the flow chart of FIG. 14 may be optional with respect to some embodiments of network nodes 1100 and related methods. For example, in regard to embodiment 23 below, block 1301 of FIG. 14 may be optional.

Example embodiments are discussed below. These example embodiments may relate to the embodiments described with regard to the above stated aspects 1, 2, 3, and 4.

Embodiment 1. A method performed by a communication device (1000) in a telecommunications network, the method comprising:

at least one of (i) receiving (1201) a sounding reference signal, SRS, configuration from a network node having an SRS sequence length that is non-supported by the communication device, the SRS configuration involving at least one of a bandwidth configuration, a transmission comb configuration, and a partial sounding factor configuration, and (ii) not receiving (1203) the SRS configuration based on a determination by the network node that the SRS configuration has an SRS sequence length that is not supported by the communication device; and applying (1205) at least one of (i) either prohibiting or allowing the SRS configuration, (ii) a first adaption to the SRS configuration to obtain a new SRS configuration that is supported by the communication device, and (iii) a second adaption of an SRS transmission to map the SRS to a subset of configured subcarriers.

Embodiment 2. The method of Embodiment 1, wherein the prohibiting comprises ignoring the SRS configuration received from the network node having an SRS sequence length that is non-supported by the communication device.

Embodiment 3. The method of any of Embodiments 1 or 2, wherein, when not receiving (1203) the SRS configuration, the prohibiting comprises that the communication device expects not to receive the SRS configuration.

Embodiment 4. The method of any of Embodiments 1-3, wherein the prohibiting comprises that behavior of the communication device is undefined when the SRS configuration received from the network node has the SRS sequence length that is non-supported by the communication device.

Embodiment 5. The method of any of Embodiments 1-4, wherein the prohibiting applies when the partial sounding factor is configured and has a value other than one.

Embodiment 6. The method of any of Embodiment 1-5, wherein when the partial sounding factor has a value above a defined threshold value, and the first adaption comprises using a largest possible partial sounding factor that results in a supported SRS sequence length.

Embodiment 7. The method of any of Embodiment 1-6, wherein the first adaption comprises using an SRS sequence length that is shorter than the non-supported SRS sequence length.

Embodiment 8. The method of any of Embodiments 1-7, wherein the bandwidth is a an SRS frequency bandwidth, and wherein the second adaption of the SRS transmission to map the SRS to a subset of configured subcarriers comprises mapping an SRS having a shorter SRS sequence length than the non-supported SRS sequence length to subcarriers other than the lower end and/or upper end of the SRS frequency bandwidth to which the SRS with the non-supported SRS sequence length would have been mapped.

Embodiment 9. The method of any of Embodiments 1-7, wherein the bandwidth is a an SRS frequency bandwidth, and wherein the second adaption of the SRS transmission to map the SRS to a subset of configured subcarriers comprises mapping an SRS having a shorter SRS sequence length than the non-supported SRS sequence length to a central portion of the SRS frequency bandwidth to which the SRS with the non-supported SRS sequence length would have been mapped.

Embodiment 10. The method of any of Embodiments 1-9, wherein the either prohibiting or allowing comprises applying a rule.

Embodiment 11. The method of Embodiment 10, wherein the rule comprises:

a mapping of a plurality of partial sounding factors that are either allowed or prohibited to a plurality of combinations of transmission comb values and the bandwidth configuration in a number of resource blocks per an orthogonal frequency division multiplexing, OFDM, symbol for the SRS.

Embodiment 12. The method of any of Embodiments 10-11 wherein the rule comprises:

a mapping of a plurality of partial sounding factors to a plurality of combinations of transmission comb values and the bandwidth configuration in a number of resource blocks per OFDM symbol for the SRS, wherein a combination that is omitted from the mapping is an allowed SRS configuration.

Embodiment 13. The method of and of Embodiments 1-12, wherein the first adaption comprises:

an adjustment of a frequency allocation and a subset of sequence samples used by a SRS resource sequence in the SRS configuration.

Embodiment 14. A communication device (1000), the communication device comprising:

processing circuitry (1003); and memory (1005) coupled with the processing circuitry, wherein the memory includes instructions that when executed by the processing circuitry causes the communication device to perform operations, the operations comprising:

at least one of (i) receive a sounding reference signal, SRS, configuration from a network node having an SRS sequence length that is non-supported by the communication device, the SRS configuration involving at least one of a bandwidth configuration, a transmission comb configuration, and a partial sounding factor configuration, and (ii) not receive the SRS configuration based on a determination by the network node that the SRS configuration has an SRS sequence length that is not supported by the communication device; and apply at least one of (i) either prohibiting or allowing the SRS configuration, (ii) a first adaption to the SRS configuration to obtain a new SRS configuration that is supported by the communication device, and (iii) a second adaption of an SRS transmission to map the SRS to a subset of configured subcarriers.

Embodiment 15. The communication device of Embodiment 1, wherein the memory includes instructions that when executed by the processing circuitry causes the communication device to perform operations according to any of Embodiments 1-13.

Embodiment 16. A communication device (1000), the communication device adapted to:

at least one of (i) receive a sounding reference signal, SRS, configuration from a network node having an SRS sequence length that is non-supported by the communication device, the SRS configuration involving at least one of a bandwidth configuration, a transmission comb configuration, and a partial sounding factor configuration, and (ii) not receive the SRS configuration based on a determination by the network node that the SRS configuration has an SRS sequence length that is not supported by the communication device; and apply at least one of (i) either prohibiting or allowing the SRS configuration, (ii) a first adaption to the SRS configuration to obtain a new SRS configuration that is supported by the communication device, and (iii) a second adaption of an SRS transmission to map the SRS to a subset of configured subcarriers.

Embodiment 17. The communication device of Embodiment 16 adapted to perform according to any of Embodiments 2-13.

Embodiment 18. A computer program comprising program code to be executed by processing circuitry (1003) of a communication device (1000), whereby execution of the program code causes the communication device to perform operations, the operations comprising:

at least one of (i) receive a sounding reference signal, SRS, configuration from a network node having an SRS sequence length that is non-supported by the communication device, the SRS configuration involving at least one of a bandwidth configuration, a transmission comb configuration, and a partial sounding factor configuration, and (ii) not receive the SRS configuration based on a determination by the network node that the SRS configuration has an SRS sequence length that is not supported by the communication device; and apply at least one of (i) either prohibiting or allowing the SRS configuration, (ii) a first adaption to the SRS configuration to obtain a new SRS configuration that is supported by the communication device, and (iii) a second adaption of an SRS transmission to map the SRS to a subset of configured subcarriers.

Embodiment 19. The computer program of Embodiment 18 whereby execution of the program code causes the communication device to perform operations according to any of Embodiments 2-13.

Embodiment 20. A computer program product comprising a non-transitory storage medium including program code to be executed by processing circuitry (1003) of a communication device (1000), whereby execution of the program code causes the communication device to perform operations, the operations comprising:

at least one of (i) receive a sounding reference signal, SRS, configuration from a network node having an SRS sequence length that is non-supported by the communication device, the SRS configuration involving at least one of a bandwidth configuration, a transmission comb configuration, and a partial sounding factor configuration, and (ii) not receive the SRS configuration based on a determination by the network node that the SRS configuration has an SRS sequence length that is not supported by the communication device; and apply at least one of (i) either prohibiting or allowing the SRS configuration, (ii) a first adaption to the SRS configuration to obtain a new SRS configuration that is supported by the communication device, and (iii) a second adaption of an SRS transmission to map the SRS to a subset of configured subcarriers.

Embodiment 21. A method performed by a network node (1100) in a telecommunications network, the method comprising:

at least one of (i) signalling (1301), to a communication device, a sounding reference signal, SRS, configuration having an SRS sequence length that is non-supported by the communication device, the SRS configuration involving at least one of a bandwidth configuration, a transmission comb configuration, and a partial sounding factor configuration, and (ii) not signalling (1303) the SRS configuration based on a determination by the network node that the SRS configuration has a SRS sequence length that is not supported by the communication device;

responsive to the at least one of the signalling (1301) and the not signalling (1303), at least one of: (i) not receiving (1305) from the communication device a SRS according to the signalled SRS configuration, (ii) allowing the SRS configuration, and (iii) receiving a SRS according to a new SRS configuration that is supported by the communication device.

Embodiment 22. The method of Embodiment 21, wherein the not receiving (1305) comprises ignoring the SRS configuration received from the network node having an SRS sequence length that is non-supported by the communication device.

Embodiment 23. The method of any of Embodiments 21 or 22, wherein, when not signalling (1303) the SRS configuration, the not receiving (1305) comprises that the communication device expects not to receive the SRS configuration.

Embodiment 24. The method of any of Embodiments 21-23, wherein responsive to the signalling (1301), the receiving a SRS according to a new SRS configuration comprises that behavior of the communication device is undefined when the SRS configuration received from the network node has the SRS sequence length that is non-supported by the communication device.

Embodiment 25. The method of any of Embodiments 21-24, wherein responsive to the signalling (1301), the receiving a SRS according to a new SRS configuration applies when the partial sounding factor is configured and has a value other than one.

Embodiment 26. The method of any of Embodiment 21-25, wherein when the partial sounding factor has a value above a defined threshold value, the receiving a SRS according to a new SRS configuration comprises using a largest possible partial sounding factor that results in a supported SRS sequence length.

Embodiment 27. The method of any of Embodiment 21-26, wherein the receiving a SRS according to a new SRS configuration comprises using an SRS sequence length that is shorter than the non-supported SRS sequence length.

Embodiment 28. The method of any of Embodiments 21-27, wherein the bandwidth is an SRS frequency bandwidth, and wherein the receiving a SRS according to a new SRS configuration comprises an adaption of the SRS transmission by the communication device mapping the SRS to a subset of configured subcarriers, and wherein the mapping comprises mapping an SRS having a shorter SRS sequence length than the non-supported SRS sequence length to subcarriers other than the lower end and/or upper end of the SRS frequency bandwidth to which the SRS with the non-supported SRS sequence length would have been mapped.

Embodiment 29. The method of any of Embodiments 21-27, wherein the bandwidth is a an SRS frequency bandwidth, and wherein the receiving a SRS according to a new SRS configuration comprises an adaption of the SRS transmission by the communication device mapping the SRS to a subset of configured subcarriers, and wherein the mapping comprises mapping an SRS having a shorter SRS sequence length than the non-supported SRS sequence length to a central portion of the SRS frequency bandwidth to which the SRS with the non-supported SRS sequence length would have been mapped.

Embodiment 30. The method of any of Embodiments 21-29, wherein the at least one of (i) not receiving (1305) from the communication device a SRS according to the signalled SRS configuration, the (ii) allowing the SRS configuration, and the (iii) receiving a SRS according to a new SRS configuration comprises applying a rule.

Embodiment 31. The method of Embodiment 30, wherein the rule comprises:

a mapping of a plurality of partial sounding factors that are either allowed or prohibited to a plurality of combinations of transmission comb values and the bandwidth configuration in a number of resource blocks per an orthogonal frequency division multiplexing, OFDM, symbol for the SRS.

Embodiment 32. The method of any of Embodiments 30-31 wherein the rule comprises:

a mapping of a plurality of partial sounding factors to a plurality of combinations of transmission comb values and the bandwidth configuration in a number of resource blocks per OFDM symbol for the SRS, wherein a combination that is omitted from the mapping is an allowed SRS configuration.

Embodiment 33. The method of and of Embodiments 31-32, wherein the at least one of (i) not receiving (1305) from the communication device a SRS according to the signalled SRS configuration, and the (iii) receiving a SRS according to a new SRS configuration comprises:

an adjustment of a frequency allocation and a subset of sequence samples used by a SRS resource sequence in the SRS configuration.

Embodiment 34. A network node (1100), the network node comprising:

processing circuitry (1103); and memory (1105) coupled with the processing circuitry, wherein the memory includes instructions that when executed by the processing circuitry causes the network node to perform operations, the operations comprising:

at least one of (i) signal, to a communication device, a sounding reference signal, SRS, configuration having an SRS sequence length that is non-supported by the communication device, the SRS configuration involving at least one of a bandwidth configuration, a transmission comb configuration, and a partial sounding factor configuration, and (ii) not signal the SRS configuration based on a determination by the network node that the SRS configuration has a SRS sequence length that is not supported by the communication device;

responsive to the at least one of the signalling (1301) and the not signalling (1303), at least one of: (i) not receiving (1305) from the communication device a SRS according to the signalled SRS configuration, (ii) allowing the SRS configuration, and (iii) receiving a SRS according to a new SRS configuration that is supported by the communication device.

Embodiment 35. The first network node of Embodiment 34, wherein the memory includes instructions that when executed by the processing circuitry causes the network node to perform operations according to any of Embodiments 21-33.

Embodiment 36. A network node (1100), the network node adapted to:

at least one of (i) signal, to a communication device, a sounding reference signal, SRS, configuration having an SRS sequence length that is non-supported by the communication device, the SRS configuration involving at least one of a bandwidth configuration, a transmission comb configuration, and a partial sounding factor configuration, and (ii) not signal the SRS configuration based on a determination by the network node that the SRS configuration has a SRS sequence length that is not supported by the communication device;

responsive to the at least one of the signal and the not signal, at least one of: (i) not receive from the communication device a SRS according to the signalled SRS configuration, (ii) allow the SRS configuration, and (iii) receive a SRS according to a new SRS configuration that is supported by the communication device.

Embodiment 37. The network node of Embodiment 36 adapted to perform operations according to any of Embodiment 22-33.

Embodiment 38. A computer program comprising program code to be executed by processing circuitry (1103) of a network node (1100), whereby execution of the program code causes the network node to perform operations comprising:

at least one of (i) signal, to a communication device, a sounding reference signal, SRS, configuration having an SRS sequence length that is non-supported by the communication device, the SRS configuration involving at least one of a bandwidth configuration, a transmission comb configuration, and a partial sounding factor configuration, and (ii) not signal the SRS configuration based on a determination by the network node that the SRS configuration has a SRS sequence length that is not supported by the communication device;

responsive to the at least one of the signal and the not signal, at least one of: (i) not receive from the communication device a SRS according to the signalled SRS configuration, (ii) allow the SRS configuration, and (iii) receive a SRS according to a new SRS configuration that is supported by the communication device.

Embodiment 39. The computer program of Embodiment 38 whereby execution of the program code causes the network node to perform operations according to any of Embodiments 22-33.

Embodiment 40. A computer program product comprising a non-transitory storage medium including program code to be executed by processing circuitry (1103) of a network node (1100), whereby execution of the program code causes the network node to perform operations comprising:

at least one of (i) signal, to a communication device, a sounding reference signal, SRS, configuration having an SRS sequence length that is non-supported by the communication device, the SRS configuration involving at least one of a bandwidth configuration, a transmission comb configuration, and a partial sounding factor configuration, and (ii) not signal the SRS configuration based on a determination by the network node that the SRS configuration has a SRS sequence length that is not supported by the communication device;

responsive to the at least one of the signal and the not signal, at least one of: (i) not receive from the communication device a SRS according to the signalled SRS configuration, (ii) allow the SRS configuration, and (iii) receive a SRS according to a new SRS configuration that is supported by the communication device.

Embodiment 41. The computer program product of Embodiment 40, whereby execution of the program code causes the network node to perform operations according to any of Embodiments 22-33.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 15:
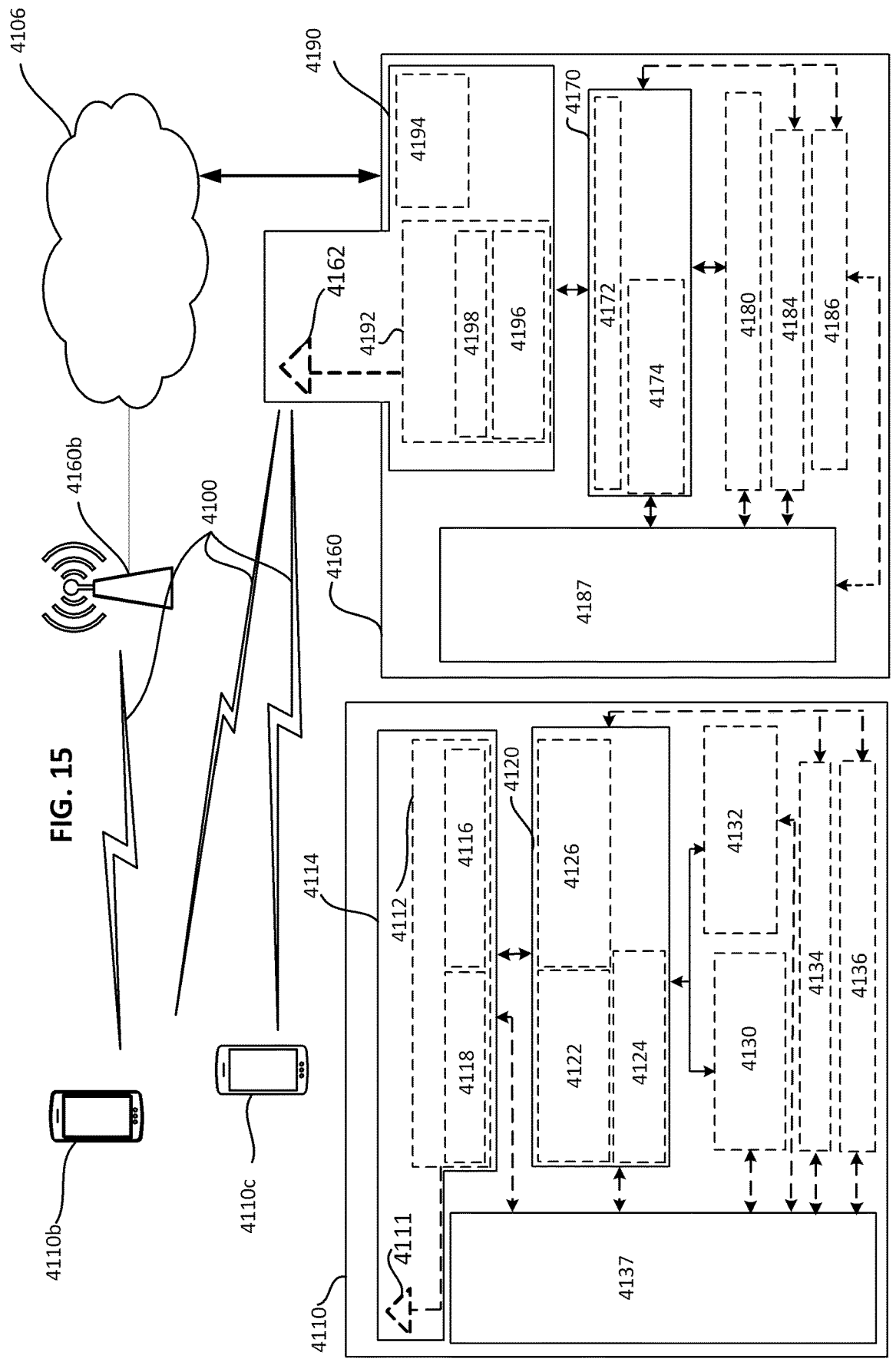
FIG. 15 is a block diagram of a wireless network in accordance with some embodiments.

FIG. 15 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

The network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections. The network node 4160b may have the configuration described with regard to the network node 4160. The wireless devices 4110b and 4110c may have the configuration described with regard to the wireless device 4110.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, the network node 4160 includes a processing circuitry 4170, a device readable medium 4180, an interface 4190, an auxiliary equipment 4184, a power source 4186, a power circuitry 4187, and an antenna 4162. Although the network node 4160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of the network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules). The network node 4160 may be the network node 1100 described above and may be configured to perform the method 1300 outlined above.

Similarly, the network node 4160 may be composed of multiple physically separate components (e.g., a NodeB component and a RNC component, or a BTS component and a BSC component, etc.), which may each have their own respective components. In certain scenarios in which the network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). The network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within the network node 4160.

The processing circuitry 4170 may be configured to perform any determining, calculating, or similar operations (e.g., certain obtaining operations) described herein as being provided by a network node. These operations performed by the processing circuitry 4170 may include processing information obtained by the processing circuitry 4170 by, for example, converting the obtained information into other information, comparing the obtained information or converted information to information stored in the network node, and/or performing one or more operations based on the obtained information or converted information, and as a result of said processing making a determination.

The processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, the processing circuitry 4170 may execute instructions stored in the device readable medium 4180 or in a memory within the processing circuitry 4170. Such functionality may include providing any of the various wireless features, functions, or benefits discussed herein. In some embodiments, the processing circuitry 4170 may include a system on a chip (SOC).

In some embodiments, the processing circuitry 4170 may include one or more of radio frequency (RF) transceiver circuitry 4172 and baseband processing circuitry 4174. In some embodiments, the radio frequency (RF) transceiver circuitry 4172 and the baseband processing circuitry 4174 may be on separate chips (or sets of chips), boards, or units, such as radio units and digital units. In alternative embodiments, part or all of the RF transceiver circuitry 4172 and the baseband processing circuitry 4174 may be on the same chip or set of chips, boards, or units In certain embodiments, some or all of the functionality described herein as being provided by a network node, base station, eNB or other such network device may be performed by the processing circuitry 4170 executing instructions stored on the device readable medium 4180 or a memory within the processing circuitry 4170. In alternative embodiments, some or all of the functionality may be provided by the processing circuitry 4170 without executing instructions stored on a separate or discrete device readable medium, such as in a hard-wired manner. In any of those embodiments, whether executing instructions stored on a device readable storage medium or not, the processing circuitry 4170 can be configured to perform the described functionality. The benefits provided by such functionality are not limited to the processing circuitry 4170 alone or to other components of the network node 4160 but are enjoyed by the network node 4160 as a whole, and/or by end users and the wireless network generally.

The device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. The device readable medium 4180 may store any suitable instructions, data or information, including a computer program, software, an application including one or more of logic, rules, code, tables, etc. and/or other instructions capable of being executed by the processing circuitry 4170 and, utilized by the network node 4160. The device readable medium 4180 may be used to store any calculations made by the processing circuitry 4170 and/or any data received via interface 4190. In some embodiments, the processing circuitry 4170 and the device readable medium 4180 may be considered to be integrated.

The interface 4190 may be used in the wired or wireless communication of signalling and/or data between the network node 4160, the network 4106, and/or the WDs 4110. As illustrated, the interface 4190 may comprise port(s)/terminal(s) 4194 to send and receive data, for example to and from the network 4106 over a wired connection. The interface 4190 may also include a radio front end circuitry 4192 that may be coupled to, or in certain embodiments a part of, an antenna 4162. The radio front end circuitry 4192 may comprise filters 4198 and amplifiers 4196. The radio front end circuitry 4192 may be connected to the antenna 4162 and the processing circuitry 4170. The radio front end circuitry may be configured to condition signals communicated between the antenna 4162 and the processing circuitry 4170. The radio front end circuitry 4192 may receive digital data that is to be sent out to other network nodes or WDs via a wireless connection. The radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by the radio front end circuitry 4192. The digital data may be passed to the processing circuitry 4170. In other embodiments, the interface may comprise different components and/or different combinations of components.

In certain alternative embodiments, the network node 4160 may not include a separate radio front end circuitry 4192, instead, the processing circuitry 4170 may comprise the radio front end circuitry and may be connected to the antenna 4162 without separate radio front end circuitry 4192. Similarly, in some embodiments, all or some of the RF transceiver circuitry 4172 may be considered a part of the interface 4190. In still other embodiments, the interface 4190 may include one or more ports or terminals 4194, radio front end circuitry 4192, and RF transceiver circuitry 4172, as part of a radio unit (not shown), and the interface 4190 may communicate with a baseband processing circuitry 4174, which is part of a digital unit (not shown).

The antenna 4162 may include one or more antennas, or antenna arrays, configured to send and/or receive wireless signals 4100. The antenna 4162 may be coupled to the radio front end circuitry 4192 and may be any type of antenna capable of transmitting and receiving data and/or signals wirelessly. In some embodiments, the antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, the antenna 4162 may be separate from the network node 4160 and may be connectable to the network node 4160 through an interface or port.

The antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, the antenna 4162, interface 4190, and/or processing circuitry 4170 may be configured to perform any transmitting operations described herein as being performed by a network node. Any information, data and/or signals may be transmitted to a wireless device, another network node and/or any other network equipment.

The power circuitry 4187 may comprise, or be coupled to, a power management circuitry and is configured to supply the components of the network node 4160 with power for performing the functionality described herein. The power circuitry 4187 may receive power from the power source 4186. The power source 4186 and/or power circuitry 4187 may be configured to provide power to the various components of the network node 4160 in a form suitable for the respective components (e.g., at a voltage and current level needed for each respective component). The power source 4186 may either be included in, or external to, the power circuitry 4187 and/or network node 4160. For example, the network node 4160 may be connectable to an external power source (e.g., an electricity outlet) via an input circuitry or interface such as an electrical cable, whereby the external power source supplies power to the power circuitry 4187. As a further example, the power source 4186 may comprise a source of power in the form of a battery or battery pack which is connected to, or integrated in, the power circuitry 4187. The battery may provide backup power should the external power source fail. Other types of power sources, such as photovoltaic devices, may also be used.

Alternative embodiments of the network node 4160 may include additional components beyond those shown in FIG. 15 that may be responsible for providing certain aspects of the network node's functionality, including any of the functionality described herein and/or any functionality necessary to support the subject matter described herein. For example, the network node 4160 may include user interface equipment to allow input of information into the network node 4160 and to allow output of information from the network node 4160. This may allow a user to perform diagnostic, maintenance, repair, and other administrative functions for the network node 4160.

As used herein, a wireless device (WD) 4100 refers to a device capable, configured, arranged and/or operable to communicate wirelessly with network nodes and/or other wireless devices. Unless otherwise noted, the term WD may be used interchangeably herein with user equipment (UE) or communication device. Communicating wirelessly may involve transmitting and/or receiving wireless signals 4100 using electromagnetic waves, radio waves, infrared waves, and/or other types of signals suitable for conveying information through air. In some embodiments, a WD 4100 may be configured to transmit and/or receive information without direct human interaction. For instance, a WD 4100 may be designed to transmit information to a network on a predetermined schedule, when triggered by an internal or external event, or in response to requests from the network. Examples of a WD 4100 include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD 4100 may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD 4100 may represent a machine or other device that performs monitoring and/or measurements, and transmits the results of such monitoring and/or measurements to another WD and/or a network node 4160. The WD 4100 may in this case be a machine-to-machine (M2M) device, which may in a 3GPP context be referred to as an MTC device. As one particular example, the WD 4100 may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD 4100 may represent a vehicle or other equipment that is capable of monitoring and/or reporting on its operational status or other functions associated with its operation. A WD 4100 as described above may represent the endpoint of a wireless connection, in which case the device may be referred to as a wireless terminal. Furthermore, a WD as described above may be mobile, in which case it may also be referred to as a mobile device or a mobile terminal. The WD 4100 may be the communication device 1000 described above and may be configured to perform the method 1200 outlined above.

As illustrated, the WD 4110 may include an antenna 4111, an interface 4114, a processing circuitry 4120, a device readable medium 4130, a user interface equipment 4132, an auxiliary equipment 4134, a power source 4136, and a power circuitry 4137. The WD 4110 may include multiple sets of one or more of the illustrated components for different wireless technologies supported by the WD 4110, such as, for example, GSM, WCDMA, LTE, NR, WiFi, WiMAX, or Bluetooth wireless technologies, just to mention a few. These wireless technologies may be integrated into the same or different chips or set of chips as other components within the WD 4110.

The antenna 4111 may include one or more antennas or antenna arrays, configured to send and/or receive wireless signals 4100, and is connected to the interface 4114. In certain alternative embodiments, the antenna 4111 may be separate from the WD 4110 and be connectable to the WD 4110 through an interface or port. The antenna 4111, interface 4114, and/or processing circuitry 4120 may be configured to perform any receiving or transmitting operations described herein as being performed by a WD. Any information, data and/or signals may be received from a network node 4160 and/or another WD. In some embodiments, the radio front end circuitry and/or antenna 4111 may be considered an interface.

As illustrated, the interface 4114 may comprise a radio front end circuitry 4112 and antenna 4111. The radio front end circuitry 4112 may comprise one or more filters 4118 and amplifiers 4116. The radio front end circuitry 4112 may be connected to the antenna 4111 and processing circuitry 4120, and may be configured to condition signals communicated between the antenna 4111 and processing circuitry 4120. The radio front end circuitry 4112 may be coupled to or a part of the antenna 4111. In some embodiments, the WD 4110 may not include a separate radio front end circuitry 4112; rather, the processing circuitry 4120 may comprise the radio front end circuitry and may be connected to the antenna 4111. Similarly, in some embodiments, some or all of the RF transceiver circuitry 4122 may be considered a part of the interface 4114. The radio front end circuitry 4112 may receive digital data that is to be sent out to other network nodes or WDs via a wireless connection. The radio front end circuitry 4112 may convert the digital data into a radio signal having the appropriate channel and bandwidth parameters using a combination of filters 4118 and/or amplifiers 4116. The radio signal may then be transmitted via the antenna 4111. Similarly, when receiving data, the antenna 4111 may collect radio signals which are then converted into digital data by the radio front end circuitry 4112. The digital data may be passed to the processing circuitry 4120. In other embodiments, the interface may comprise different components and/or different combinations of components.

The processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, the processing circuitry 4120 may execute instructions stored in the device readable medium 4130 or in a memory within the processing circuitry 4120 to provide the functionality disclosed herein.

As illustrated, the processing circuitry 4120 may include one or more of RF transceiver circuitry 4122, baseband processing circuitry 4124, and application processing circuitry 4126. In other embodiments, the processing circuitry 4120 may comprise different components and/or different combinations of components. In certain embodiments, the processing circuitry 4120 of the WD 4110 may comprise a SOC. In some embodiments, the RF transceiver circuitry 4122, baseband processing circuitry 4124, and application processing circuitry 4126 may be on separate chips or sets of chips. In alternative embodiments, part or all of the baseband processing circuitry 4124 and application processing circuitry 4126 may be combined into one chip or set of chips, and the RF transceiver circuitry 4122 may be on a separate chip or set of chips. In still alternative embodiments, part or all of the RF transceiver circuitry 4122 and baseband processing circuitry 4124 may be on the same chip or set of chips, and the application processing circuitry 4126 may be on a separate chip or set of chips. In yet other alternative embodiments, part or all of the RF transceiver circuitry 4122, baseband processing circuitry 4124, and application processing circuitry 4126 may be combined in the same chip or set of chips. In some embodiments, the RF transceiver circuitry 4122 may be a part of the interface 4114. The RF transceiver circuitry 4122 may condition RF signals for the processing circuitry 4120.

In certain embodiments, some or all of the functionality described herein as being performed by a WD 4110 may be provided by the processing circuitry 4120 executing instructions stored on a device readable medium 4130, which in certain embodiments may be a computer-readable storage medium. In alternative embodiments, some or all of the functionality may be provided by the processing circuitry 4120 without executing instructions stored on a separate or discrete device readable storage medium, such as in a hard-wired manner. In any of those particular embodiments, whether executing instructions stored on a device readable storage medium or not, the processing circuitry 4120 can be configured to perform the described functionality. The benefits provided by such functionality are not limited to the processing circuitry 4120 alone or to other components of WD 4110, but are enjoyed by the WD 4110 as a whole, and/or by end users and the wireless network generally.

The processing circuitry 4120 may be configured to perform any determining, calculating, or similar operations (e.g., certain obtaining operations) described herein as being performed by a WD 4110. These operations, as performed by the processing circuitry 4120, may include processing information obtained by the processing circuitry 4120 by, for example, converting the obtained information into other information, comparing the obtained information or converted information to information stored by the WD 4110, and/or performing one or more operations based on the obtained information or converted information, and as a result of said processing making a determination.

The device readable medium 4130 may be operable to store a computer program, software, an application including one or more of logic, rules, code, tables, etc. and/or other instructions capable of being executed by the processing circuitry 4120. The device readable medium 4130 may include a computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by the processing circuitry 4120. In some embodiments, the processing circuitry 4120 and device readable medium 4130 may be considered to be integrated.

The user interface equipment 4132 may provide components that allow for a human user to interact with the WD 4110. Such interaction may be of many forms, such as visual, audial, tactile, etc. The user interface equipment 4132 may be operable to produce output to the user and to allow the user to provide input to the WD 4110. The type of interaction may vary depending on the type of the user interface equipment 4132 installed in the WD 4110. For example, if the WD 4110 is a smart phone, the interaction may be via a touch screen; if the WD 4110 is a smart meter, the interaction may be through a screen that provides usage (e.g., the number of gallons used) or a speaker that provides an audible alert (e.g., if smoke is detected). The user interface equipment 4132 may include input interfaces, devices and circuits, and output interfaces, devices and circuits. The user interface equipment 4132 is configured to allow input of information into the WD 4110, and is connected to the processing circuitry 4120 to allow the processing circuitry 4120 to process the input information. The user interface equipment 4132 may include, for example, a microphone, a proximity or other sensor, keys/buttons, a touch display, one or more cameras, a USB port, or other input circuitry. The user interface equipment 4132 is also configured to allow output of information from the WD 4110, and to allow the processing circuitry 4120 to output information from the WD 4110. The user interface equipment 4132 may include, for example, a speaker, a display, vibrating circuitry, a USB port, a headphone interface, or other output circuitry. Using one or more input and output interfaces, devices, and circuits, of the user interface equipment 4132, the WD 4110 may communicate with end users and/or the wireless network, and allow them to benefit from the functionality described herein.

The auxiliary equipment 4134 may be operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

The power source 4136 may, in some embodiments, be in the form of a battery or battery pack. Other types of power sources, such as an external power source (e.g., an electricity outlet), photovoltaic devices or power cells, may also be used. The WD 4110 may further comprise the power circuitry 4137 for delivering power from the power source 4136 to the various parts of the WD 4110 which need power from the power source 4136 to carry out any functionality described or indicated herein. The power circuitry 4137 may in certain embodiments comprise a power management circuitry. The power circuitry 4137 may additionally or alternatively be operable to receive power from an external power source; in which case the WD 4110 may be connectable to the external power source (such as an electricity outlet) via input circuitry or an interface such as an electrical power cable. The power circuitry 4137 may also in certain embodiments be operable to deliver power from an external power source to the power source 4136. This may be, for example, for the charging of the power source 4136. The power circuitry 4137 may perform any formatting, converting, or other modification to the power from the power source 4136 to make the power suitable for the respective components of the WD 4110 to which power is supplied.

Figure 16:
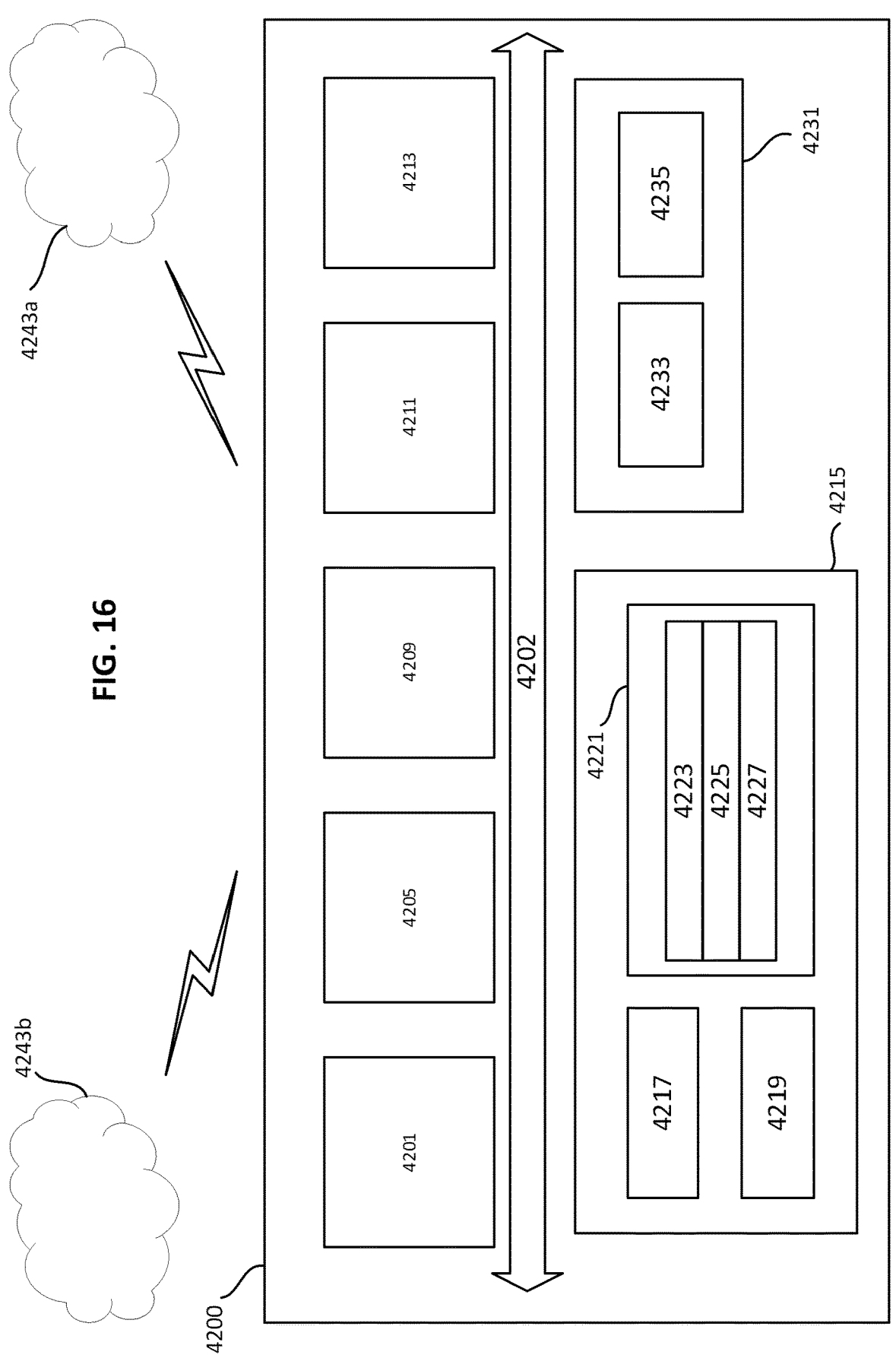
FIG. 16 is a block diagram of a user equipment in accordance with some embodiments.

FIG. 16 illustrates a user equipment (UE) 4200 in accordance with some embodiments. The UE 4200 may be the communication device 1000 or the WD 4110 described above and may be configured to perform the method 1200 outlined above.

FIG. 16 illustrates one embodiment of a UE 4200 in accordance with various aspects described herein. As used herein, a user equipment or UE 4200 may not necessarily have a user in the sense of a human user who owns and/or operates the relevant device. Instead, a UE 4200 may represent a device that is intended for sale to, or operation by, a human user but which may not, or which may not initially, be associated with a specific human user (e.g., a smart sprinkler controller). Alternatively, a UE 4200 may represent a device that is not intended for sale to, or operation by, an end user but which may be associated with or operated for the benefit of a user (e.g., a smart power meter). The UE 4200 may be any UE identified by the 3rd Generation Partnership Project (3GPP), including a NB-IoT UE, a machine type communication (MTC) UE, and/or an enhanced MTC (eMTC) UE. The UE 4200, as illustrated in FIG. 16, is one example of a WD 4110 configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, the UE 4200 includes a processing circuitry 4201 that is operatively coupled to an input/output interface 4205, a radio frequency (RF) interface 4209, a network connection interface 4211, a memory 4215 including a random access memory (RAM) 4217, a read-only memory (ROM) 4219, and a storage medium 4221 or the like, a communication subsystem 4231, a power source 4213, and/or any other component, or any combination thereof. The storage medium 4221 includes an operating system 4223, an application program 4225, and data 4227. In other embodiments, the storage medium 4221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, the processing circuitry 4201 may be configured to process computer instructions and data. The processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, the input/output interface 4205 may be configured to provide a communication interface to an input device, output device, or input and output device. The UE 4200 may be configured to use an output device via the input/output interface 4205. An output device may use the same type of interface port as an input device. For example, a USB port may be used to provide input to and output from the UE 4200. The output device may be a speaker, a sound card, a video card, a display, a monitor, a printer, an actuator, an emitter, a smartcard, another output device, or any combination thereof. The UE 4200 may be configured to use an input device via input/output interface 4205 to allow a user to capture information into the UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, the RF interface 4209 may be configured to provide a communication interface to RF components such as a transmitter, a receiver, and an antenna. The network connection interface 4211 may be configured to provide a communication interface to the network 4243a. The network 4243a may encompass wired and/or wireless networks such as a local-area network (LAN), a wide-area network (WAN), a computer network, a wireless network, a telecommunications network, another like network or any combination thereof. For example, the network 4243a may comprise a Wi-Fi network. The network connection interface 4211 may be configured to include a receiver and a transmitter interface used to communicate with one or more other devices over a communication network according to one or more communication protocols, such as Ethernet, TCP/IP, SONET, ATM, or the like. The network connection interface 4211 may implement receiver and transmitter functionality appropriate to the communication network links (e.g., optical, electrical, and the like). The transmitter and receiver functions may share circuit components, software or firmware, or alternatively may be implemented separately.

The RAM 4217 may be configured to interface via a bus 4202 to the processing circuitry 4201 to provide storage or caching of data or computer instructions during the execution of software programs such as the operating system, application programs, and device drivers. The ROM 4219 may be configured to provide computer instructions or data to the processing circuitry 4201. For example, the ROM 4219 may be configured to store invariant low-level system code or data for basic system functions such as basic input and output (1/O), startup, or reception of keystrokes from a keyboard that are stored in a non-volatile memory. The storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 4221 may be configured to include an operating system 4223, an application program 4225 such as a web browser application, a widget or gadget engine or another application, and data a file 4227. The Storage medium 4221 may store, for use by the UE 4200, any of a variety of various operating systems or combinations of operating systems.

The storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 4221 may allow the UE 4200 to access computer-executable instructions, application programs or the like, stored on transitory or non-transitory memory media, to off-load data, or to upload data. An article of manufacture, such as one utilizing a communication system may be tangibly embodied in the storage medium 4221, which may comprise a device readable medium.

In FIG. 16, the processing circuitry 4201 may be configured to communicate with the network 4243b using a communication subsystem 4231. The Network 4243a and network 4243b may be the same network or networks or different network or networks. The communication subsystem 4231 may be configured to include one or more transceivers used to communicate with the network 4243b. For example, the communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include a transmitter 4233 and/or receiver 4235 to implement transmitter or receiver functionality, respectively, appropriate to the RAN links (e.g., frequency allocations and the like). Further, the transmitter 4233 and receiver 4235 of each transceiver may share circuit components, software or firmware, or alternatively may be implemented separately.

In the illustrated embodiment, the communication functions of the communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 4231 may include cellular communication, Wi-Fi communication, Bluetooth communication, and GPS communication. The network 4243b may encompass wired and/or wireless networks such as a local-area network (LAN), a wide-area network (WAN), a computer network, a wireless network, a telecommunications network, another like network or any combination thereof. For example, the network 4243b may be a cellular network, a Wi-Fi network, and/or a near-field network. The power source 4213 may be configured to provide alternating current (AC) or direct current (DC) power to components of the UE 4200.

The features, benefits and/or functions described herein may be implemented in one of the components of the UE 4200 or partitioned across multiple components of the UE 4200. Further, the features, benefits, and/or functions described herein may be implemented in any combination of hardware, software or firmware. In one example, the communication subsystem 4231 may be configured to include any of the components described herein. Further, the processing circuitry 4201 may be configured to communicate with any of such components over bus 4202. In another example, any of such components may be represented by program instructions stored in memory that when executed by the processing circuitry 4201 perform the corresponding functions described herein. In another example, the functionality of any of such components may be partitioned between the processing circuitry 4201 and the communication subsystem 4231. In another example, the non-computationally intensive functions of any of such components may be implemented in software or firmware and the computationally intensive functions may be implemented in hardware.

Figure 17:
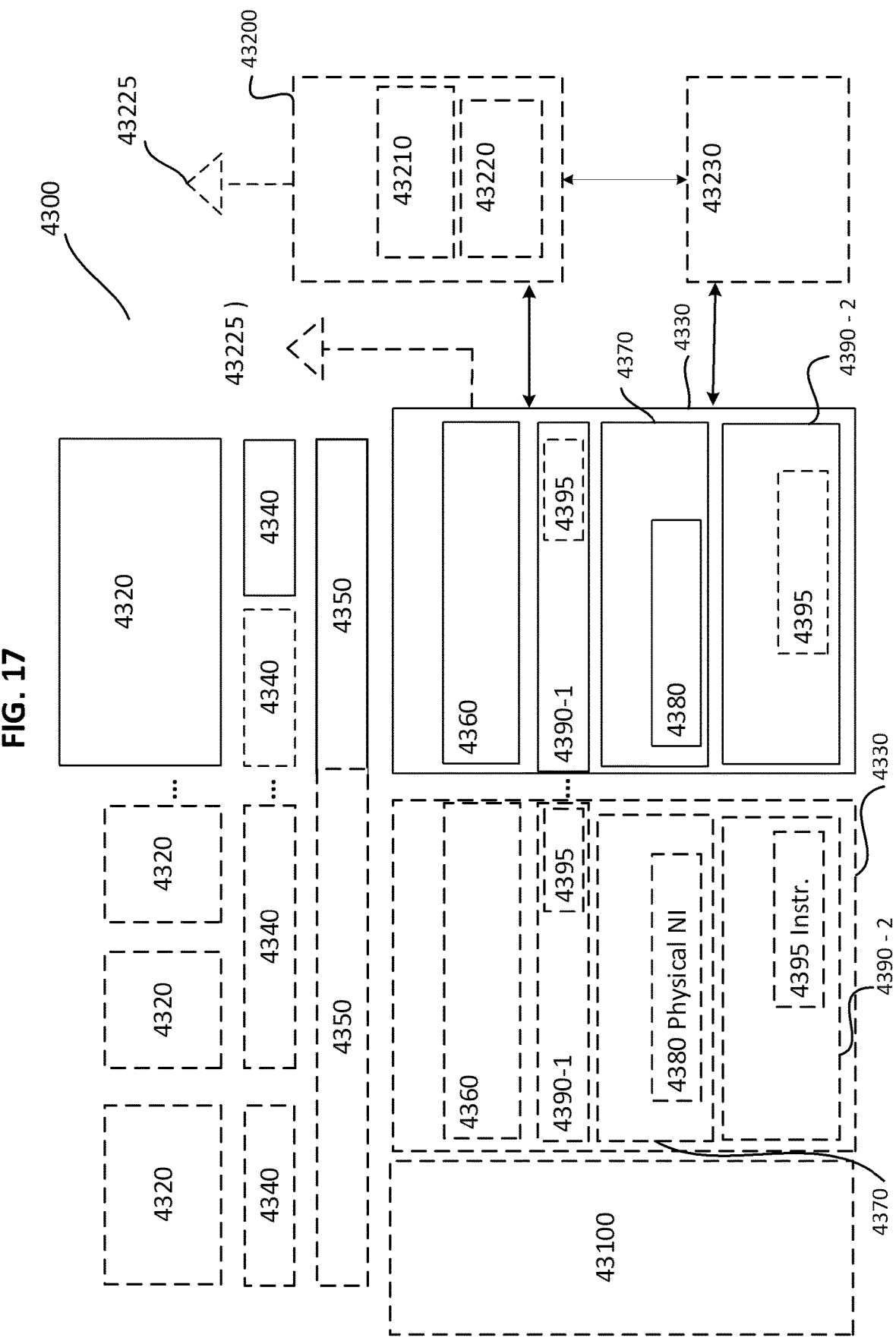
FIG. 17 is a block diagram of a virtualization environment in accordance with some embodiments.

FIG. 17 illustrates a virtualization environment in accordance with some embodiments.

FIG. 17 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device described above) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications (Apps) 4320 (which may alternatively be called software instances, virtual appliances, network functions, virtual nodes, virtual network functions, etc.) operative to implement some of the features, functions, and/or benefits of some of the embodiments disclosed herein. The applications 4320 are run in the virtualization environment 4300 which provides a hardware 4330 comprising a processing circuitry 4360 and a memory 4390. The memory 4390 contains instructions 4395 executable by the processing circuitry 4360 whereby the application 4320 is operative to provide one or more of the features, benefits, and/or functions disclosed herein.

The virtualization environment 4300 may comprise general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise a memory 4390-1 which may be non-persistent memory for temporarily storing instructions 4395 or software executed by the processing circuitry 4360. Each hardware device may comprise one or more network interface controllers (NICs) 4370, also known as network interface cards, which include the physical network interface 4380. Each hardware device may also include non-transitory, persistent, machine-readable storage media 4390-2 having stored therein software 4395 and/or instructions executable by the processing circuitry 4360. The software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 may comprise virtual processing, virtual memory, virtual networking or interface and virtual storage, and may be run by a corresponding virtualization layer 4350 or hypervisor. Different embodiments of the instance of the virtual appliance 4320 may be implemented on one or more of virtual machines 4340, and the implementations may be made in different ways.

During operation, the processing circuitry 4360 may execute software 4395 to instantiate the hypervisor or virtualization layer 4350, which may sometimes be referred to as a virtual machine monitor (VMM). The virtualization layer 4350 may present a virtual operating platform that appears like networking hardware to virtual machine 4340.

As shown in FIG. 17, the hardware 4330 may be a standalone network node with generic or specific components. The hardware 4330 may comprise an antenna 43225 and may implement some functions via virtualization. Alternatively, the hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, the virtual machine 4340 may be a software implementation of a physical machine that runs programs as if they were executing on a physical, non-virtualized machine. Each of the virtual machines 4340, and that part of the hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of the hardware networking infrastructure 4330 and corresponds to the application 4320 in FIG. 17.

In some embodiments, one or more radio units 43200 that each include one or more transmitters 43220 and one or more receivers 43210 may be coupled to one or more antennas 43225. The radio units 43200 may communicate directly with the hardware nodes 4330 via one or more appropriate network interfaces and may be used in combination with the virtual components to provide a virtual node with radio capabilities, such as a radio access node or a base station.

In some embodiments, some signalling can be effected with the use of the control system 43230 which may alternatively be used for communication between the hardware nodes 4330 and radio units 43200.

Figure 18:
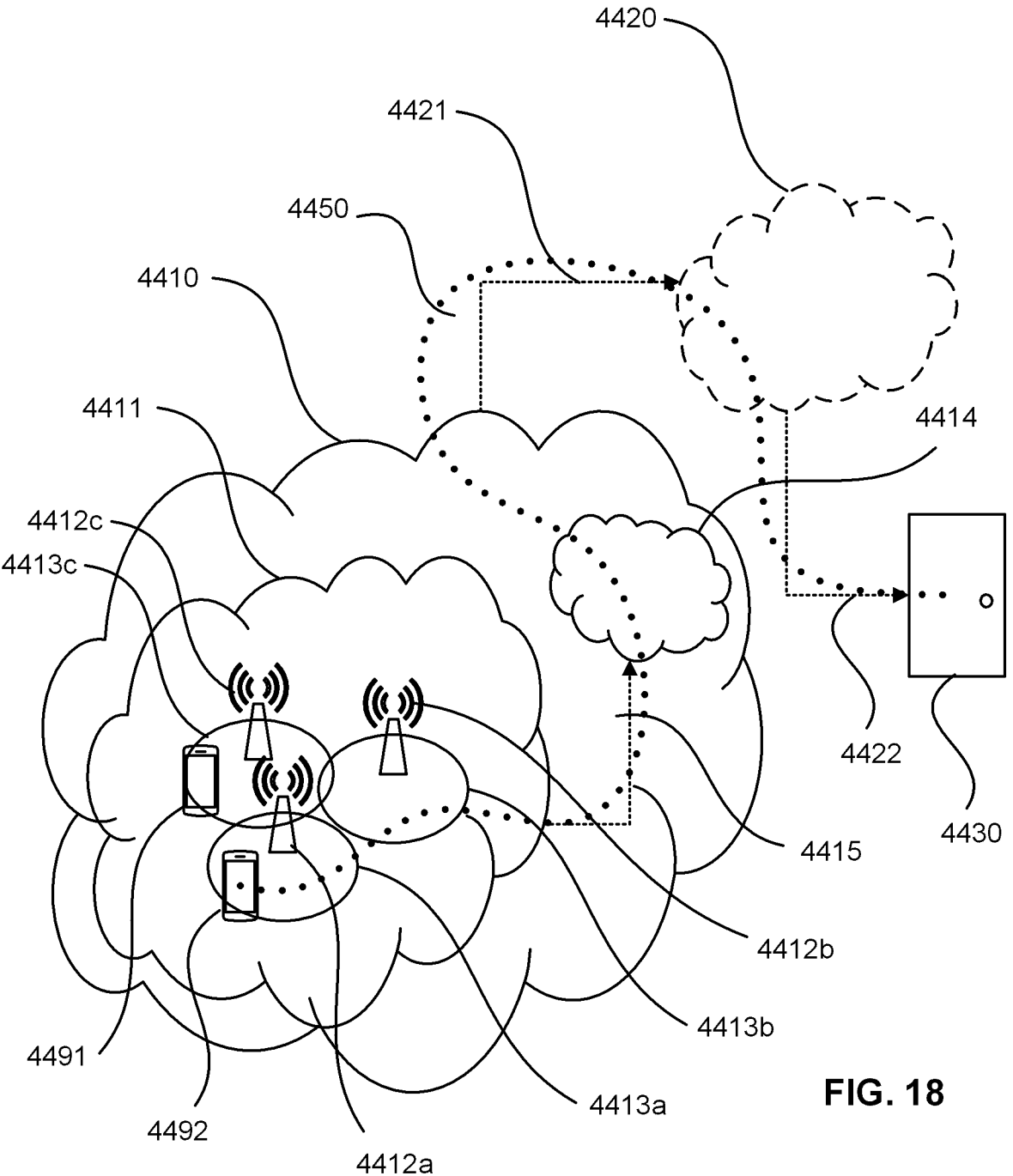
FIG. 18 is a block diagram of a telecommunication network connected via an intermediate network to a host computer in accordance with some embodiments.

FIG. 18 illustrates a telecommunication network 4410 connected via an intermediate network to a host computer in accordance with some embodiments.

With reference to FIG. 18, in accordance with an embodiment, a communication system includes the telecommunication network 4410, such as a 3GPP-type cellular network, which comprises an access network 4411, such as a radio access network, and a core network 4414. The access network 4411 comprises a plurality of base stations 4412a, 4412b, 4412c, such as NBs, eNBs, gNBs or other types of wireless access points, each defining a corresponding coverage area 4413a, 4413b, 4413c. The base stations 4412a, 4412b, 4412c may be the network node 1100 or 4160 described above. Each base station 4412a, 4412b, 4412c is connectable to the core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412. The UEs 4491, 4492 may be the communication device 1000, the WD 4110, or the UE 4200 described above.

The telecommunication network 4410 may be itself connected to a host computer 4430, which may be embodied in the hardware and/or software of a standalone server, a cloud-implemented server, a distributed server or as processing resources in a server farm. The host computer 4430 may be under the ownership or control of a service provider, or may be operated by the service provider or on behalf of the service provider. Connections 4421 and 4422 between the telecommunication network 4410 and the host computer 4430 may extend directly from the core network 4414 to the host computer 4430 or may go via an optional intermediate network 4420. The intermediate network 4420 may be one of, or a combination of more than one of, a public, private or hosted network; intermediate network 4420, if any, may be a backbone network or the Internet; in particular, the intermediate network 4420 may comprise two or more sub-networks (not shown).

The communication system of FIG. 18 as a whole enables connectivity between the connected UEs 4491, 4492 and host computer 4430. The connectivity may be described as an over-the-top (OTT) connection 4450. The host computer 4430 and the connected UEs 4491, 4492 are configured to communicate data and/or signaling via OTT connection 4450, using the access network 4411, core network 4414, any intermediate network 4420 and possible further infrastructure (not shown) as intermediaries. The OTT connection 4450 may be transparent in the sense that the participating communication devices through which the OTT connection 4450 passes are unaware of routing of uplink and downlink communications. For example, the base station 4412 may not or need not be informed about the past routing of an incoming downlink communication with data originating from the host computer 4430 to be forwarded (e.g., handed over) to a connected UE 4491. Similarly, the base station 4412 need not be aware of the future routing of an outgoing uplink communication originating from the UE 4491 towards the host computer 4430.

Figure 19:
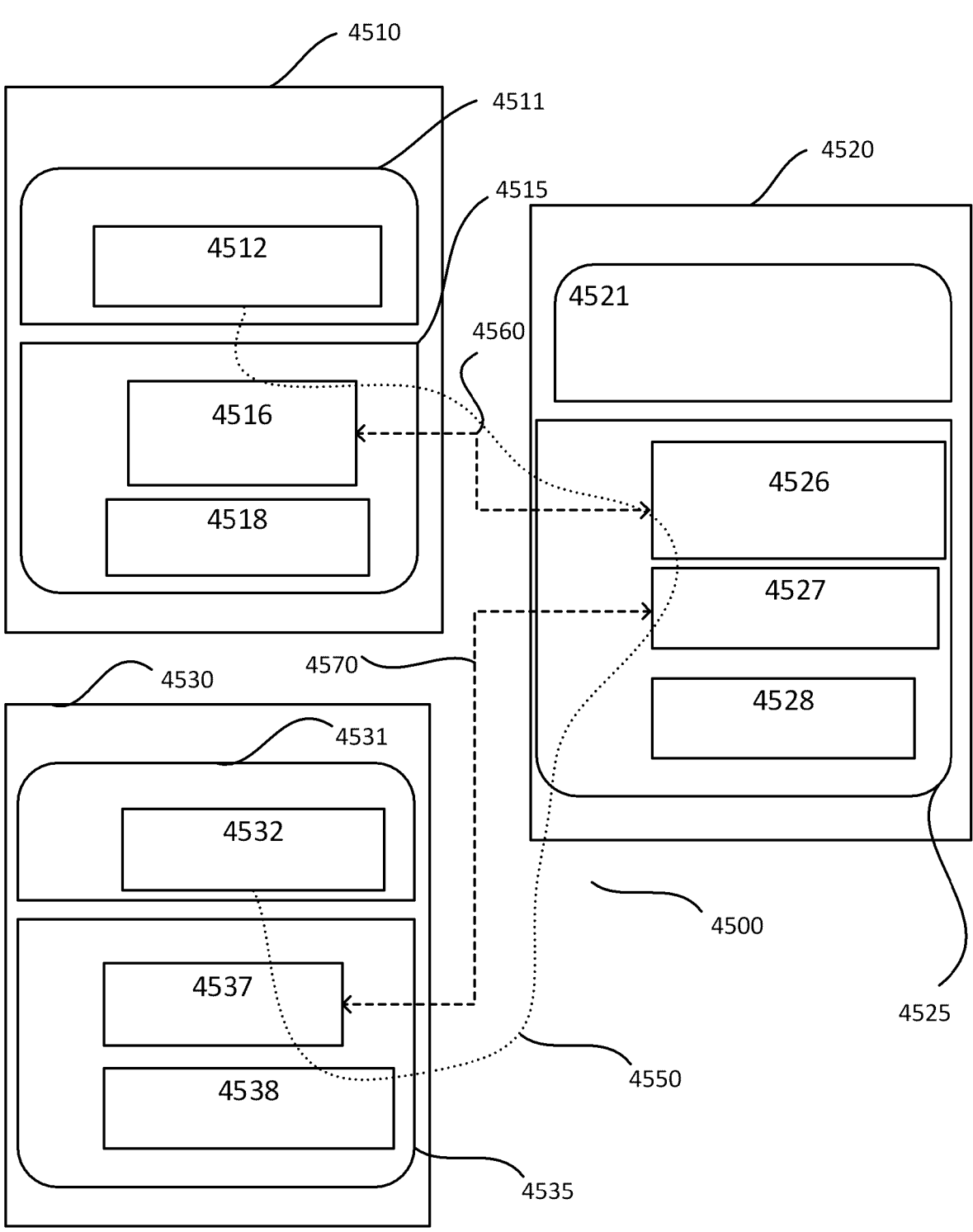
FIG. 19 is a block diagram of a host computer communicating via a base station with a user equipment over a partially wireless connection in accordance with some embodiments.

FIG. 19 illustrates a host computer 4510 communicating via a base station 4520 with a user equipment (UE) 4530 over a partially wireless connection in accordance with some embodiments. The base station 4530 may be the network node 1100 or 4160 described above and the UE 4530 may be the communication device 1000 or WD 4110 or UEs 4200, 4491, 4492 described above.

Example implementations, in accordance with an embodiment, of the UE, base station and host computer discussed in the preceding paragraphs will now be described with reference to FIG. 19. In a communication system 4500, the host computer 4510 comprises hardware 4515 including a communication interface 4516 configured to set up and maintain a wired or wireless connection with an interface of a different communication device of the communication system 4500. The host computer 4510 further comprises a processing circuitry 4518, which may have storage and/or processing capabilities. In particular, the processing circuitry 4518 may comprise one or more programmable processors, application-specific integrated circuits, field programmable gate arrays or combinations of these (not shown) adapted to execute instructions. The host computer 4510 further comprises software 4511, which is stored in or accessible by the host computer 4510 and executable by the processing circuitry 4518. The software 4511 includes a host application 4512. The host application 4512 may be operable to provide a service to a remote user, such as the UE 4530 connecting via a OTT connection 4550 terminating at the UE 4530 and the host computer 4510. In providing the service to the remote user, the host application 4512 may provide user data which is transmitted using the OTT connection 4550.

The communication system 4500 may further include a base station 4520 provided in a telecommunication system and comprising hardware 4525 enabling it to communicate with the host computer 4510 and with the UE 4530. The hardware 4525 may include a communication interface 4526 for setting up and maintaining a wired or wireless connection with an interface of a different communication device of the communication system 4500, as well as a radio interface 4527 for setting up and maintaining at least a wireless connection 4570 with the UE 4530 located in a coverage area (not shown in FIG. 19) served by the base station 4520. The communication interface 4526 may be configured to facilitate a connection 4560 to the host computer 4510. The connection 4560 may be direct or it may pass through a core network (not shown in FIG. 19) of the telecommunication system and/or through one or more intermediate networks outside the telecommunication system. In the embodiment shown, the hardware 4525 of the base station 4520 further includes a processing circuitry 4528, which may comprise one or more programmable processors, application-specific integrated circuits, field programmable gate arrays or combinations of these (not shown) adapted to execute instructions. The base station 4520 further has software 4521 stored internally or accessible via an external connection.

The communication system 4500 may further include the UE 4530 already referred to. Its hardware 4535 may include a radio interface 4537 configured to set up and maintain a wireless connection 4570 with a base station serving a coverage area in which the UE 4530 is currently located. The hardware 4535 of the UE 4530 further includes a processing circuitry 4538, which may comprise one or more programmable processors, application-specific integrated circuits, field programmable gate arrays or combinations of these (not shown) adapted to execute instructions. The UE 4530 further comprises software 4531, which is stored in or accessible by the UE 4530 and executable by the processing circuitry 4538. The software 4531 includes a client application 4532. The client application 4532 may be operable to provide a service to a human or non-human user via the UE 4530, with the support of the host computer 4510. In the host computer 4510, an executing host application 4512 may communicate with the executing client application 4532 via OTT connection 4550 terminating at the UE 4530 and the host computer 4510. In providing the service to the user, the client application 4532 may receive request data from the host application 4512 and provide user data in response to the request data. The OTT connection 4550 may transfer both the request data and the user data. The client application 4532 may interact with the user to generate the user data that it provides.

It is noted that the host computer 4510, base station 4520 and UE 4530 illustrated in FIG. 19 may be similar or identical to host computer 4430, one of base stations 4412*a*, 4412*b*, 4412*c* and one of UEs 4491, 4492 of FIG. 18, respectively. This is to say, the inner workings of these entities may be as shown in FIG. 19 and independently, the surrounding network topology may be that of FIG. 18.

In FIG. 19, the OTT connection 4550 has been drawn abstractly to illustrate the communication between the host computer 4510 and UE 4530 via the base station 4520, without explicit reference to any intermediary devices and the precise routing of messages via these devices. Network infrastructure may determine the routing, which it may be configured to hide from the UE 4530 or from the service provider operating the host computer 4510, or both. While the OTT connection 4550 is active, the network infrastructure may further take decisions by which it dynamically changes the routing (e.g., on the basis of load balancing consideration or reconfiguration of the network).

The wireless connection 4570 between the UE 4530 and the base station 4520 is in accordance with the teachings of the embodiments described throughout this disclosure. One or more of the various embodiments may improve the performance of the OTT services provided to the UE 4530 using the OTT connection 4550, in which the wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring the OTT connection 4550 between the host computer 4510 and the UE 4530, in response to variations in the measurement results. The measurement procedure and/or the network functionality for reconfiguring the OTT connection 4550 may be implemented in software 4511 and hardware 4515 of the host computer 4510 or in software 4531 and hardware 4535 of the UE 4530, or both. In embodiments, sensors (not shown) may be deployed in or in association with communication devices through which the OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of the OTT connection 4550 may include message format, retransmission settings, preferred routing etc.; the reconfiguring need not affect the base station 4520, and it may be unknown or imperceptible to the base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using the OTT connection 4550 while it monitors propagation times, errors etc.

Figures 20, 21:
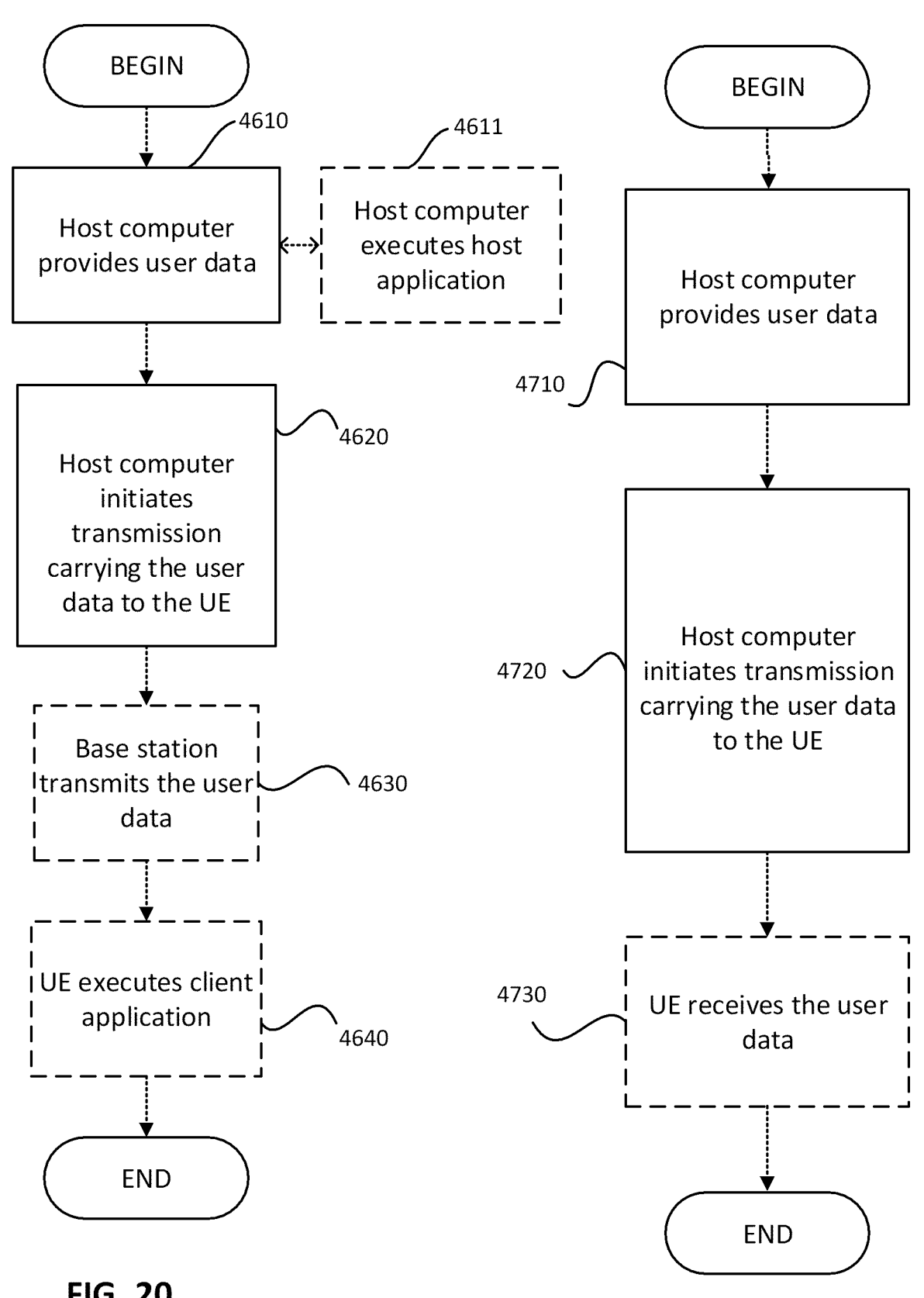
FIG. 20 is a block diagram of methods implemented in a communication system including a host computer, a base station and a user equipment in accordance with some embodiments.
FIG. 21 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments. Optional steps are illustrated with dashed lines.

FIG. 20 is a flowchart illustrating a method implemented in a communication system, in accordance with one embodiment. The communication system includes a host computer, a base station and a UE which may be those described with reference to FIGS. 18-19. For simplicity of the present disclosure, only drawing references to FIG. 20 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 21 illustrates methods implemented in a communication system including a host computer, a base station and a user equipment in accordance with some embodiments. Optional steps are illustrated with dashed lines.

FIG. 21 is a flowchart illustrating a method implemented in a communication system, in accordance with one embodiment. The communication system includes a host computer, a base station and a UE which may be those described with reference to FIGS. 18-19. For simplicity of the present disclosure, only drawing references to FIG. 21 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figures 22, 23:
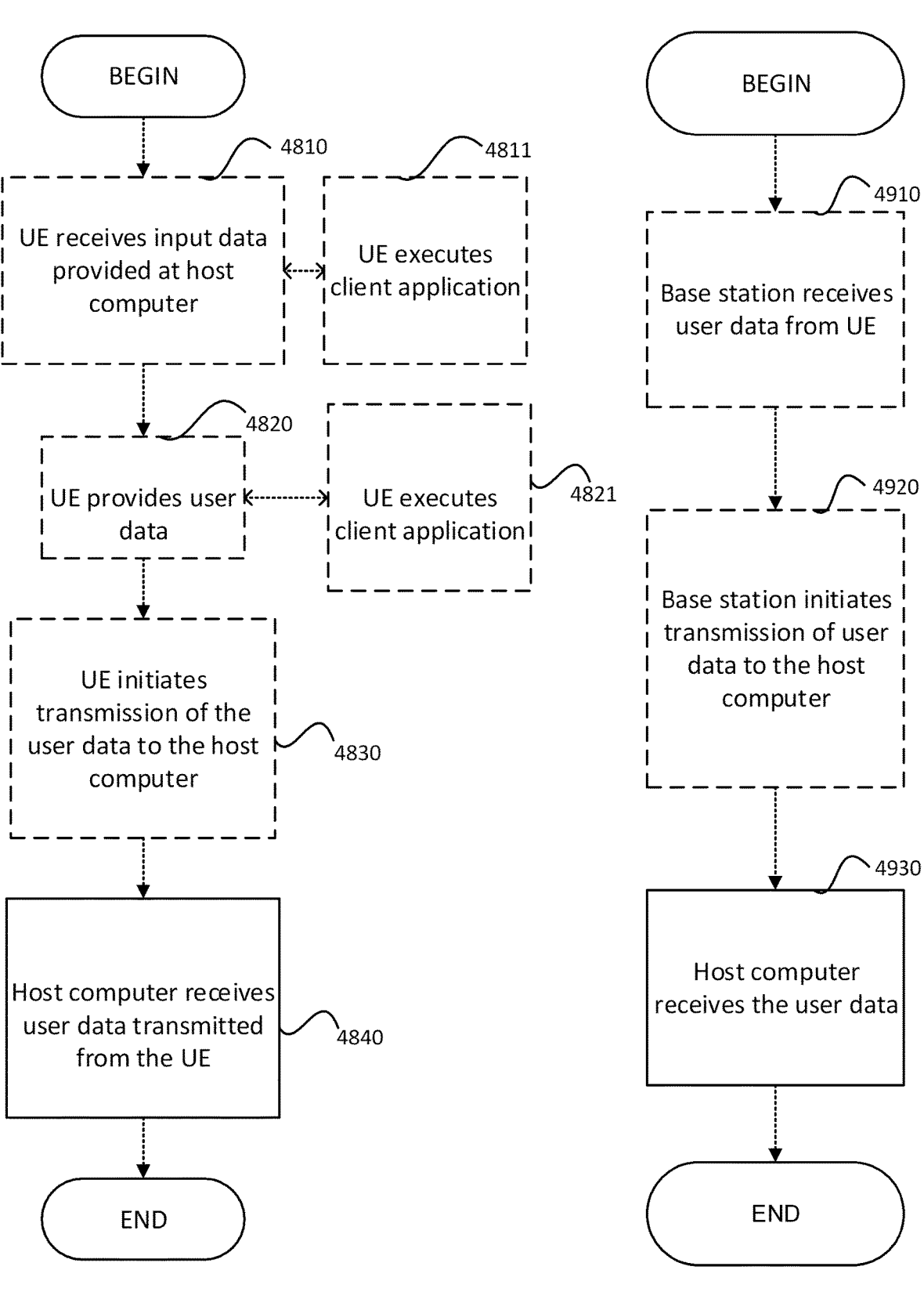
FIG. 22 is a block diagram of methods implemented in a communication system including a host computer, a base station and a user equipment in accordance with some embodiments.
FIG. 23 is a block diagram of methods implemented in a communication system including a host computer, a base station and a user equipment in accordance with some embodiments.

FIG. 22 illustrates methods implemented in a communication system including a host computer, a base station and a user equipment in accordance with some embodiments. Optional steps are illustrated with dashed lines.

FIG. 22 is a flowchart illustrating a method implemented in a communication system, in accordance with one embodiment. The communication system includes a host computer, a base station and a UE which may be those described with reference to FIGS. 18-19. For simplicity of the present disclosure, only drawing references to FIG. 22 will be included in this section. In step 4810 (which may be optional), the UE receives input data provided by the host computer. Additionally or alternatively, in step 4820, the UE provides user data. In substep 4821 (which may be optional)

of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 23 illustrates methods implemented in a communication system including a host computer, a base station and a user equipment in accordance with some embodiments. Optional steps are illustrated with dashed lines.

FIG. 23 is a flowchart illustrating a method implemented in a communication system, in accordance with one embodiment. The communication system includes a host computer, a base station and a UE which may be those described with reference to FIGS. 18-19. For simplicity of the present disclosure, only drawing references to FIG. 23 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
ASN Abstract Syntax Notation
CE Control Element
CDMA Code Division Multiplexing Access
CSI Channel State Information
CSI-RS Channel State Information Reference Signal
DCI Downlink Control Information
DL Downlink
DM Demodulation
E-SMLC Evolved-Serving Mobile Location Centre
eNB E-UTRAN NodeB
E-SMLC evolved Serving Mobile Location Center
E-UTRA Evolved UTRA
E-UTRAN Evolved UTRAN
FFS For Further Study
FR1 Frequency Range 1
FR2 Frequency Range 2
gNB gNodeB; Base station in NR
GSM Global System for Mobile communication
LTE Long-Term Evolution
MAC Medium Access Control
MCS Modulation and Coding Scheme
MDT Minimization of Drive Tests
MIMO Multiple-Input Multiple-Output
MSC Mobile Switching Center
NR New Radio
OFDM Orthogonal Frequency Division Multiplexing
OSS Operations Support System
O&M Operation and Maintenance
PA Power Amplifier
PBCH Physical Broadcast Channel
PC Power Control
PDCCH Physical Downlink Control Channel
PDSCH Physical Downlink Shared Channel
PUCCH Physical Uplink Control Channel
PUSCH Physical Uplink Shared Channel
RAN Radio Access Network
RB Resource Block
RF Radio Frequency
RNC Radio Network Controller
RRC Radio Resource Control
RS Reference Signal
RSRP Reference Symbol Received Power OR Reference
   Signal Received Power
SCS Subcarrier Spacing
SNR Signal-to-Noise Ratio
SON Self Optimized Network
SRS Sounding Reference Signal
SS Synchronization Signal
SSB Synchronization Signal Block
UE User Equipment
UL Uplink
UMTS Universal Mobile Telecommunication System
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

In the following sections, the following further embodiments of the present disclosure are described. The network node is embodied as a transmission point, TRP, or gNB, respectively, and the communication device is embodied as a user equipment, UE:

A work item for further enhancements to NR MIMO was agreed. One objective of the work item concerns enhancements to SRS:

Enhancement on SRS, targeting both FR1 and FR2:
    a. Identify and specify enhancements on aperiodic SRS triggering to facilitate more flexible triggering and/or DCI overhead/usage reduction
    b. Specify SRS switching for up to 8 antennas (e.g., xTyR, x={1,2,4} and y={6,8})

c. Evaluate and, if needed, specify the following mechanism(s) to enhance SRS capacity and/or coverage: SRS time bundling, increased SRS repetition, partial sounding across frequency In the following, ways to fulfil this objective may be considered. Approaches to increase aperiodic SRS triggering flexibility and reduce PDCCH overhead are discussed in more detail. Next, methods to avoid duplicate SRS configurations with SRS antenna switching are elaborated further, related mechanisms to support UL antenna selection are introduced, and details of SRS switching configurations are considered, including guard times, the need for a 4T6R configuration, and dynamic adaptation to SRS switching configurations. Issues in SRS coverage evaluation including suitable baselines and simulation parameters are also provided. Enhancement alternatives and baselines for SRS coverage and capacity are analyzed. Furthermore, link level evaluations of potential downlink throughput benefits of increased SRS coverage are shown that provide insight into potential use cases. Finally, initial system level results are given on the efficiency of repetition and frequency hopping.

Aperiodic SRS Offset for Increased Flexibility in Triggering

The following agreements were made in previous 3GPP meetings:

Agreement (RAN1 #104-e)

A list of t values is configured in RRC for each SRS resource set. Adopt at least one of the following for DCI indication of t.

In DCI format 0_1/0_2 without data and without CSI request,

Alt 1-1: Reuse the same scheme used for DCI format 0_1/0_2/1-1/1-2 that schedules a PDSCH or PUSCH Alt 1-2: Re-purpose unused DCI field to indicate t Alt 1-3: t is indicated by a configurable DCI field, where the DCI field may contain bits from unused fields and additional bits configured by gNB i. FFS design details with other potential field(s)

FFS: whether t can be slot offset

In DCI format 0_1/0_2/1-1/1-2 that schedules a PDSCH or PUSCH

Alt 2-1: t is indicated by adding a new configurable DCI field

Alt 2-2: t is indicated without adding DCI payload

Note: The size of DCI payload does not change dynamically

Note: RAN1 should strive for unified solution for different DCI formats.

FFS: The number of RRC configured t values per SRS resource set and DCI bit field size.

Agreement (RAN1 #104-e)

Confirm the following working assumption with modifications. An "available slot" is a slot satisfying that there are UL or flexible symbol(s) for the time-domain location(s) for all the SRS resources in the resource set and it satisfies UE capability on the minimum timing requirement between triggering PDCCH and all the SRS resources in the resource set.

From the first symbol carrying the SRS request DCI and the last symbol of the triggered SRS resource set, UE does not expect to receive SFI indication, UL cancellation indication or dynamic scheduling of DL channel/signal(s) on flexible symbol(s) that may change the determination of "available slot".

Note: Collision handling between the triggered SRS and any other UL channel/signal is performed after the determination of available slot.

FFS: Rules to handle the case of multiple SRS resource sets with overlapping symbols and/or triggered by a same DCI.

Agreement (RAN1 #103-e)

A given aperiodic SRS resource set is transmitted in the (t+1)th available slot counting from a reference slot, where t is indicated from DCI, or RRC (if only one value of t is configured in RRC), and the candidate values of t at least include 0. Adopt at least one of the following options for the reference slot.

Opt. 1: Reference slot is the slot with the triggering DCI.

Opt. 2: Reference slot is the slot indicated by the legacy triggering offset.

FFS . . .

FFS explicit or implicit indication of t.

FFS whether updating candidate triggering offsets in MAC CE may be beneficial.

Figure 24A:
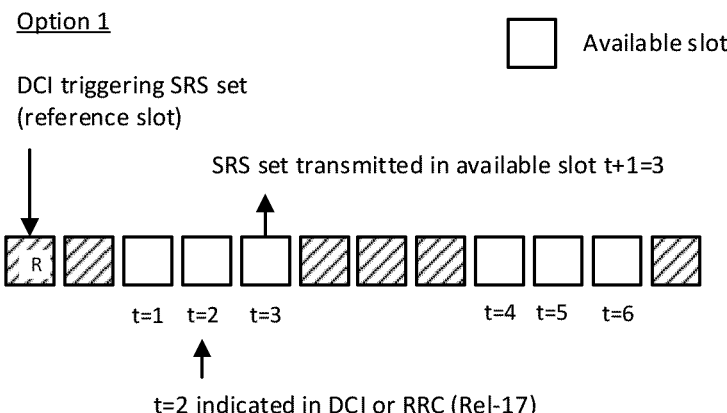
FIGS. 24A and 24B illustrate options 1 and 2 from the agreement in RAN1 #103-e.
Figure 24B:
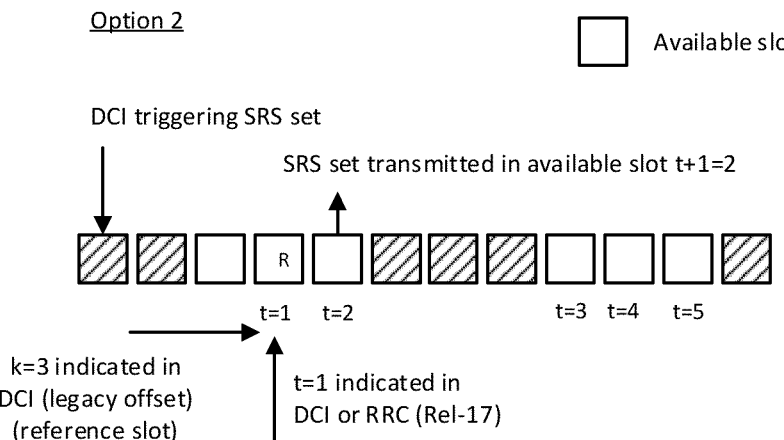

FIGS. 24A and 24B illustrate option 1 and 2 from the agreement in RAN1 #103-e. Note that in either of the options, the reference slot may be in an available slot or in a non-available slot. The two options are related to how the reference slot is defined and these two options are depicted in FIGS. 24A and 24B.

The agreement includes that the (t+1)th slot is used for SRS transmission and that t=0 is possible to indicate. This means that the available slots must be numbered as t+1={1, 2,3, . . . }.

Option 2 may be the most useful interpretation as it builds on the legacy slot offset k. Note that k has the large range from 0 to 32. It thus gives the static offset e.g., to avoid the DL slots in TDD. The t parameter is used to distribute the SRS occasions from multiple UEs to different available slots, to avoid SRS congestion. The scheme thus uses a combination of a semi-static (RRC configured) and dynamic offset. It may be proposed the following:

Proposal 1 Support option 2, the reference slot is the slot indicated by the legacy triggering offset.

If the reference slot is an available slot, then it is enumerated as starting with 1 (in the range of t-values), to allow scheduling an SRS transmission also in the reference slot (due to the agreement, SRS is transmitted in slot t+1, by indicating t=0, the SRS is thus transmitted in slot 1, which is the first available slot).

Furthermore, it may be agreed that a list of t values is configured in RRC for each SRS resource set. This allows some degree of flexibility in distributing the SRS to nearby slots while at the same keeping the complexity of the solution at minimal. To keep the complexity low the allowed values for t is 0, 1, 2 or 3. Therefore, in DCI format 0_1/0_2 without data and without CSI request, Alt 2-2 may be supported.

Proposal 2 Support Alt 2-2, t is indicated without adding DCI payload. A UE can be configured, using RRC, a delay value t to each of the SRS trigger states respectively. Possible delay is in the value range {0, 1, 2, 3}. Default value is t=0.

As discussed in the next section, when triggering without data or CSI request, using unused DCI fields may be supported:

Proposal 3 In DCI format 0_1/0_2 without data and without CSI request we support Alt 1-2: Re-purpose unused DCI field to indicate t.

If a trigger point contains multiple SRS sets, the sets have individual classification of available slots. Hence, one slot may be classified as available for one set but not the other. This can, even if a k-value is configured per set, lead to that two sets ends up in the same available slot. If this occurs, a rule needs to be specified to determine which set should be transmitted and which should be dropped.

The most time critical SRS usage is the antenna switching, since it is used for DL CSI and where MU-MIMO precoding may be based on the instantaneous channel (i.e., the phase). Therefore, this usage should be prioritized when collisions occur. The least time sensitive SRS usage is the beam management as it doesn't utilize the phase relations. Hence, following priority proposal may be made:

Proposal 4 In case multiple triggered SRS resource sets collide, i.e., map to a potential transmission in overlapping OFDM symbols, set dropping applies based on priority where lower priority set is dropped. Priority is based on set usage, where antenna switching has highest priority and beam management has lowest. Codebook has second highest priority.

Using DCI 0_1 and 0-2 to Trigger Aperiodic SRS

The following agreements were made in previous 3GPP meetings:

Agreement (RAN1 #104-e)

Further study whether and if needed, how to achieve further enhancements on aperiodic SRS triggering and resource management based on repurposing unused fields in DCI format 0_1/0_2 without data and without CSI. Consider the following examples CAT A: Time-domain parameters
  A-1: Indication of available slot position, i.e., the t values
  A-2: Indication of slot offset
  A-3: Indication of SRS symbol-level offset
  A-4: Indication of time-domain behavior for SRS transmission over multiple OFDM symbols, e.g., repetition, hopping, and/or splitting
CAT B: Frequency-domain parameters
  B-1: Indication of a group of CCs for SRS transmission
  B-2: Indication of frequency domain resource in a BWP for SRS transmission
  B-3: Indication of whether DL/UL BWP is applied for SRS transmission
CAT C: Power control parameters
  C-1: Re-purpose 'TPC command for PUSCH' as 'TPC command for SRS'
  FFS impact on power control, impact from triggering a group of CCs for SRS
  C-2: Indication of open loop power control parameter e.g., p0.
CAT D: Spatial-domain parameters, i.e., indication of SRS port and beamforming Due to the increased use of massive MIMO and reliance on aperiodic SRS for both UL and DL CSI, it is very useful to take this opportunity to give the SRS functionality in NR a boost. The current NR SRS is more or less based on the LTE framework, dating back more than 10 years where classic radios (up to 8 branches) was predominant. So, in general, further SRS enhancements (if beneficial) by re-purposing unused fields in DCI are introduced.

These are the use cases that may be found useful to specify:
  A-1/A-2: Having even larger flexibility in triggering slot offset than the one we agreed for the general DCI (which has some limitations). Also, for DL heavy TDD patterns like DDDSU and when the cell has high load, it would be useful to increase the slot offset to more than the current 32 slots.
  B-2: An NR bandwidth will be used for multiple different verticals with different service requirements. In some part of the band there will be URLLC traffic which has priority over eMBB traffic. For eMBB, particularly for DL CSI, SRS measurements for the whole band is needed, and the aperiodic SRS is therefore configured as full bandwidth. It may then be a conflict between an URLLC PUSCH transmission for a UE and an eMBB SRS transmission for another UE and due to the priority, the eMBB SRS will not be triggered. In this situation, it is useful of the aperiodic SRS for the eMBB users can be triggered occasionally with a smaller bandwidth. Note that although there are multiple SRS trigger states, we cannot currently utilize those to adapt the SRS transmission bandwidth for a given usage type, e.g., antenna switching. This due to the restriction on a single SRS resource set per usage (except for the special case: 1T4R) In addition, there are cases when the gNB is only interested in sounding the band in some specific part of the UL bandwidth, and/or when some frequency band should be avoided since they are subject to interference or are sensitive to interference towards victim cells.

Proposal 5 Support A-2 and B-2 for aperiodic SRS triggering and resource management based on re-purposing unused fields in DCI format 0_1/0_2 without data and without CSI.

Support for Dual "Usage" of a Single SRS Resource

The space and resources for SRS transmission are scarce, particularly for TDD deployments where a downlink heavy TDD pattern is used, e.g., the commonly used DDDDDDD-SUU pattern. At the same time, TDD allows for reciprocity-based MIMO, which means that the SRS measurements are used for both DL CSI acquisition and for link adaptation for UL MIMO. Unfortunately, NR specifications tailors a certain SRS to one usage only. This implies that multiple SRS resource sets (the usage is configured per SRS resource set) needs to be transmitted, for all active UEs, in the few available UL slots.

A desired feature would be to be able to use one SRS measurement for both usages simultaneously. That would imply that a UE would not need to transmit one SRS for UL MIMO (i.e., 'codebook' usage, CB), and another SRS for DL CSI (i.e., 'antennaSwitching' usage, AS). This leads to SRS overhead savings and UE power savings since it could halve the amount of SRS transmissions. The desired functionality is thus summarized as follows.

Observation 1 A desired Rel. 17 functionality when operating with simultaneous UL MIMO and DL MIMO operation for a UE is for the gNB to use a single SRS measurement for both CB and AS purposes, with no compromise in performance for none of them, compared to using separate SRS resources for CB and AS or same SRS resource in separate slots for CB and AS.

Now, it is possible already in Rel. 15 to configure an SRS resource that belongs to two sets simultaneously. This dual usage, was discussed in RAN1 #95, and the conclusion was (from chairman notes):

Conclusion (RAN1 #95)

If the UE is configured with an SRS resource associated with multiple sets with different SRS-setUse, then it is up to the UE for which SRS-setUse this SRS resource is transmitted for.

Conclusion (RAN1 #95): If the UE is configured with an SRS resource associated with multiple sets with different SRS-setUse, then it is up to the UE for which SRS-setUse this SRS resource is transmitted for.

The reason for concluding this undefined behavior was

UE may use port mapping virtualization of SRS port to physical antenna(s), e.g., to meet a certain power class or to enhance UL MIMO performance. Such virtualization is not specified.

It is not clear whether UE follows power control for the first or second set, as these loops are defined per SRS resource set. Hence, UE transmit power is undefined.

Now, it is argued by some companies that gNB can already today configure such dual usage and it is also claimed that "it works". It may well be so that "it works" currently, but still the UE behavior is undefined, so performance is unpredictable and unreliable. New UE devices are released every month and it is good that optimization for antenna virtualization can be left to UE implementation, to handle the PAPR issues, meeting power class, or to optimize the performance.

It is also argued by some companies, that the UE will never do anything "strange", i.e., if dual usage is configured, it will transmit SRS so it can be used for both CB and AS simultaneously.

An obvious example is a 2 Tx and 2 Rx UE, configured with a 2-port SRS resource. This UE may just as well transmit one SRS port per Tx antenna, which is the same as the Rx antenna. For such UE, one SRS transmission can be used by the gNB for both AS and CB.

It would be great if such UE can report to the gNB that dual usage is possible for such 2-port SRS configuration. This requires standardization, and at the same time, the undefined power control can be defined when dual usage is adopted. To discuss the standardization of this, these two cases for a UE that has T TX antennas and R RX antennas are seemingly straightforward and can be the starting point:

1. T=R and a T-port SRS resource is transmitted with dual CB and AS usage

For example, a UE supporting t1r1-t2r2-t4r4, configured with 4T=4R.

2. T<R and multiple T-port SRS resources are transmitted (to implement antenna switching) with dual CB and AS usage.

For example, a UE supporting t2r4, configured with 2T4R.

Note that configuring t2r2 in Case 1 would require virtualization and is handled separately, discussed later in this section. As mentioned, it seems these two cases are straightforward, and perhaps already frequently supported by existing UEs in the field. If capability is introduced, the UE could inform the gNB that dual usage is possible. The technical benefit may be that if the UE anyway support dual usage, the network should now since it will reduce the SRS overhead as discussed earlier.

A proposal to capture an agreement for Case 1 may be as follows:

Proposal 6 At least for a UE supporting maxNumber-MIMO-LayersCB-PUSCH=x, maxNumberMIMO-LayersPDSCH=x, and supportedSRS-TxPortSwitch='t2r2', 't4r4', 't1 r1-t2r2', or 't1r1-t2r2-t4r4', when a UE is configured only one x-port SRS resource in a set with usage "antennaSwitching" with xT=xR for DL CSI acquisition, the gNB can assume that the UE transmits this SRS resource in the same way (e.g., same virtualization) as if the set would have been configured with usage 'codebook', and such x-port SRS resource can be used for an x-port UL MIMO precoder selection (i.e., TPMI selection) by the gNB.

Furthermore, the following clarifications can be added:

RRC signaling from gNB to UE is introduced to enable the feature in this proposal, which is subject to an associated UE capability Whether to specify this as e.g., a new CB-AS dual usage type or as a "flag" is up to specification editors.

This proposal applies a least for single-TRP operation and when uplink full power mode 1 or mode 2 is not enabled and FFS for other cases.

A proposal to capture an agreement for Case 2 may be as follows:

Proposal 7 At least for a UE supporting maxNumber-MIMO-LayersCB-PUSCH=x, and, maxNumber-MIMO-LayersPDSCH=y, and, supportedSRS-Tx-PortSwitch contains 'txry', when a UE is configured multiple x-port SRS resources in a set with usage "antennaSwitching" and the total number of SRS ports in the set across all the resources is y, then the gNB can assume that the UE transmits each of these x-port SRS resources in the same way (e.g., same virtualization) as if that x-port SRS resource would have belonged to a set configured with usage "codebook". Thereby, any of these x-port SRS resources can be used for an x-port UL MIMO precoder selection (i.e., TPMI selection) by the gNB.

Furthermore, the following clarifications can be added:

RRC signaling from gNB to UE is introduced to enable the feature in this proposal, which is subject to an associated UE capability Whether to specify this as e.g., a new CB-AS dual usage type or as a "flag" is up to specification editors.

This proposal applies a least for single-TRP operation and when uplink full power mode 1 or mode 2 is not enabled and FFS for other cases.

FFS: UE behavior for PUSCH transmission when SRS from the SRS resource set with usage='antennaSwitching' is indicated, e.g., how to indicate which x-port SRS resource to use for association with PUSCH For additional cases, more discussion is needed to understand how to formulate the proposals (if supported at all). A UE that has T TX antennas and R RX antennas but a Z port SRS is configured These cases are defined as follows:

3. Z<T=R and a Z-port SRS resource is transmitted with dual CB and AS usage where ZT=ZR antenna switching is used (square case).

a. For example, a UE supporting t1 r1-t2r2-t4r4, configured with 2T=2R (Z=2, T=R=4).

4. Z<T<R and multiple Z-port SRS resources are transmitted (to implement antenna switching) with dual CB and AS usage, where Z<T b. For example, a UE supporting t1r4-t2r4, configured with 1T4R (Z=1, T=2, R=4).

SRS Antenna-Switching Enhancements

The following agreement was made in previous 3GPP meeting:

Agreement (RAN1 #104-e)

For aperiodic antenna switching SRS, support to configure N; $N_{max}$ resource sets, where totally K resources are distributed in the N resource sets flexibly based on RRC configuration.

For 1T6R, K=6, $N_{max}$=[4], and each resource has 1 port.
For 1T8R, K=8, $N_{max}$=[4], and each resource has 1 port.
For 2T6R, K=3, $N_{max}$=[3], and each resource has 2 ports.
For 2T8R, K=4, $N_{max}$=[4], and each resource has 2 ports.
Working Assumption: For 4T8R, K=2, $N_{max}$=[2], and each resource has 4 ports.

FFS the number of supported candidate values of N for each xTyR.

FFS extension to increase $N_{max}$ for 1T2R, 1T4R, 2T4R and T=R cases for aperiodic, periodic and semi-persistent SRS resources.

FFS the number of resources and resource sets for semi-persistent and periodic antenna switching SRS.

Note: SRS could be transmitted over the last 6 OFDM symbols, or over any OFDM symbols within the slot subject to UE capability.

The following agreement was made in previous 3GPP-meeting:

SRS Antenna Switching Enhancements Up to 4R

Antenna switching (AS) is emerging as a critical UE functionality in real TDD deployments to harvest the gain of massive MIMO and reciprocity-based DL operation. We continuously receive reports from various deployments of massive MIMO in the field and there are observations of inefficiencies and drawbacks with the current AS design in NR. Since AS requires a guard symbol between antenna switches in NR (but not in Rel.16 LTE), it is not possible to efficiently use SRS with short periodicity in special (S) slots with only 2 UL symbols (such special slot deployments with X:Y:2 configurations exist today both in Asia and EU). Hence SRS must instead be configured in the UL slots, which is a waste of spectral efficiency since at least 3 out of 14 symbols (including guard period) in the UL slot are then not available for PUSCH.

Observation 2 Special slot with 2 UL symbols is used in deployments in both Asia and EU and the 2 UL symbols, suitable for SRS transmissions, in the special slot cannot be used by any of current antenna switching schemes for which R>T, which leads to reduced spectral efficiency.

Some very useful and rather simple enhancements for antenna switching to resolve this case are:

Support for configurable presence of guard period (as in LTE Rel. 16) for antenna switching, at least for FR1.

1T4R aperiodic SRS is limited to two resource sets with {two 1-port SRS resources in slot A, two 1-port SRS resources in slot B} (or a 1+3 split) since the slot offset is tied to the resource set, this means the special slot with 2 UL symbols cannot be used for SRS (and likely not for PUSCH either). The operator is thus forced to use UL slots for SRS, which is a waste of resources that can be used for PUSCH and PUCCH.

It would be beneficial to support aperiodically triggered 1T4R with 4 resource sets with 1 port each in four different slots. This would allow aperiodic SRS to be transmitted in the 2 UL symbols in 4 different S slots to increase the efficiency.

To improve the flexibility and enable 1T4R aperiodic SRS to be transmitted in a single UL slot (note that more than 6 OFDM symbols per slot is supported for SRS transmission from Rel. 16), it would be beneficial to support aperiodically triggered 1T4R with 1 resource set with four single port SRS resources.

1T2R and 2T4R Aperiodic SRS is limited to one resource set with two SRS resources with 2 ports each, this means they cannot be used in 2 UL symbol special slot patterns.

It would be beneficial to support aperiodically triggered 1T2R and 2T4R as 2 resource sets with 1 or 2 port each in two different slots.

Hence there are some unnecessary limitations in aperiodic SRS triggering with antenna switching that can be relaxed for Rel. 17 to support common and actually used deployments in the field where the special slot only contains two UL symbols. It may thus be proposed:

Proposal 8 Support 1T4R aperiodic SRS with 4 resource sets with 1 port each in four different slots.

Proposal 9 Support 1T2R and 2T4R aperiodic SRS with 2 resource sets with 1 or 2 port each respectively, in two different slots.

Proposal 10 Support RRC configurable presence of guard period for antenna switching in FR1 as in LTE.

SRS Antenna Switching Up to 8 Rx

For a UE equipped with a single transmit chain and eight receive chains (1T8R), 15 OFDM symbols will be required at a minimum for an SRS resource to sound all the UE antennas (including a one-symbol gap period between each antenna switch), meaning that more than one slot (i.e., more than one SRS resource) will always be needed to sound all UE antennas, which reduces the flexibility. It should be noted that for TDD it is desirable to place the SRS in the U symbols of special slots.

In addition, since the UE cannot transmit anything else in the OFDM symbols used for SRS transmission including the gap periods, large overhead will be associated with some antenna-switching configurations (e.g., 1T6R and 1T8R). One possible solution to this could be to have a configurable gap period for some antenna switching configurations, such that less SRS overhead is required. This has been discussed previously and the proposal made there is also useful for these new AS configurations.

Observation 3 Enabling a configurable guard time period as in 0, reduce SRS overhead and improve SRS triggering flexibility also for the new Rel. 17 antenna switching configurations with 6 and 8 RX.

Another problem is that since the slot offset is defined per aperiodic SRS resource set, if a single set has to be used for each SRS configuration, it will limit the flexibility of the SRS transmission.

As exemplified from observations of existing deployments as discussed above, in special slots with only two UL OFDM symbols, only a single SRS resource can be transmitted per slot (assuming guard period is required between SRS resources), which means that multiple SRS resource sets are needed for these SRS configurations if only special slots are to be used for the SRS transmission.

Hence, it is preferred that different number of SRS resource sets could be configured for each SRS configuration, and where the SRS resources are divided between the one or multiple configured SRS resource sets. This generalizes the urgent proposals as follows:

Proposal 11 Allow a flexible number of aperiodic SRS resource sets to be configured per SRS configuration and distribute the SRS resources between the configured SRS resource sets.

FIG. 25 illustrates a table which shows the proposed supported number of SRS resource sets and how the number of SRS resources can be divided between the SRS resource sets for different SRS antenna switching configurations. For 1T8R we propose to support a single SRS resource set to be used for UEs that is subject to an associated UE capability of no guard period for SRS antenna switching.

Lastly, we discuss the 4T6R case. Antenna switching for 4T6R is different from the other cases above in the sense that the number of Rx is not an integer multiple of the number of Tx and, hence, would require a special configuration.

In current specification, the number of SRS ports in each SRS resource included in one or more SRS resource sets with usage 'antennaSwitching' is the same for all resources in the set(s). Furthermore, each SRS port of each resource in the set(s) is associated with a different UE antenna port. There is no way of performing antenna switching for 4T6R without violating at least one of these two rules.

Specifically, as we see it, antenna switching for 4T6R could be configured in one of two ways:

1. One or more SRS resource sets configured for 'antennaSwitching' for 4T6R containing two or more SRS resources for which SRS ports in two different resources in the set(s) are allowed to map to the same UE antenna port.

2. One or more SRS resource sets configured for 'antennaSwitching' for 4T6R containing two SRS resources with the first resource having two SRS ports and the second resource having four SRS ports, where each SRS port of each resource in the set(s) is associated with a different UE antenna port.

For the first option, a solution that sounds each UE antenna twice, which requires at least three SRS resources, achieves the same power per port as 2T6R and occupies the same number of OFDM symbols (three SRS resources with any additional guard periods). However, it would decrease multiplexing capacity compared to the 2T6R case as four cyclic shifts per comb (or, alternatively, two cyclic shifts over two combs) are needed compared to two cyclic shifts per comb for 2T6R. For the second option, to achieve the same power per SRS port, the number of SRS symbols in the four-port SRS resource should be doubled (e.g., using SRS repetition) compared to the two-port SRS resource, which decreases flexibility.

Furthermore, UE architectures with an equal maximum power on each Tx chain that is less than 20 dBm (for example with six 17 dBm PAs) will not be able to deliver 23 dBm on two SRS ports, and so using differently sized SRS resources for antenna switching may constrain the choice of UE PA powers. Hence, we do not see a need for a special UE capability for 4T6R, since we believe that the SRS configuration for 2T6R could be used without any loss in performance or flexibility.

Proposal 12 Do not provide explicit support for 4T6R in Rel. 17.

Triggering a Subset of an SRS Resource Set

In NR Rel. 16, additional UE-capability signaling was introduced indicating that the UE supports SRS antenna switching where only a subset of the UE antennas are sounded, which can be used to reduce UE energy consumption and SRS overhead at a cost of reduced DL performance. In Rel. 17, where the SRS antenna switching will be extended to up to 8 Rx, this feature is expected to become even more important.

In particular, the SRS resources in reciprocity-based operation with MU-MIMO with multiple and potentially large number of UEs consume significant uplink resources. Also, this is predominantly used in TDD systems which in some deployments have few UL slots or few uplink symbols in special slot. Hence, to be able to manage these resources more dynamically, is important as the load in NR network increases. Also, full channel sounding and partial channel sounding both gives possibility to perform MU-MIMO scheduling but as the acquired channel knowledge is different, performance will differ. Hence, it is possible to trade-off overhead with performance by adapting the SRS transmission scheme.

Observation 4 Dynamically/semi-statically adapting the SRS configurations is important to manage SRS load and to enable fast tradeoff between SRS overhead and performance/need.

For example, configure a 2T4R UE with one SRS resource set triggered with a first SRS trigger state used to sound all four UE antennas (to maximize DL performance), and a second SRS resource set with a second SRS trigger state used to sound only two of the four UE antennas (to save SRS overhead).

However, due to limitations in the number of aperiodic trigger states (three trigger states are currently supported in NR) and since different aperiodic trigger states might be used for triggering SRS resource sets with different usages and/or with different slot offsets, the possibilities to adapt the number of sounded UE antennas in this way is limited.

Therefore, an enhancement is needed to more efficiently adapting the number of UE antennas that are sounded with antenna switching. For a UE that support multiple xTyR values, it is beneficial if switching between them can be done faster than using RRC.

Proposal 13 Introduce MAC-CE signaling for adapting the UE antennas that are sounded for antenna switching, i.e., enable faster than RRC switching between different supported xTmR antenna switching configurations.

SRS Capacity and/or Coverage Enhancements

The following agreement was made in previous 3GPP meeting:

Agreement (RAN1 #104-e)

For Rel-17 SRS capacity and coverage enhancement, support the following

Increase the maximum number of repetition symbols in one slot and one SRS resource to S Support at least one S value from {8, 10, 12, 14}. FFS other candidate values.

Support to transmit SRS only in $m_{SRS,b_{SRS}}/P_f$ contiguous RBs in one OFDM symbol, where $m_{SRS,b_{SRS}}$ indicates the number of RBs configured by $b_{SRS}$ and $C_{SRS}$.

Support at least one $P_f$ value from {2, [3], 4, 8}.

FFS other candidate values, e.g., non-integer values for $P_f$

Note: SRS sequence shorter than the minimum length supported in the current specification is not pursued. No new sequence including length is introduced.

FFS it is applicable to frequency hopping and non-frequency hopping.

FFS detailed signalling mechanism to determine $P_f$ and the location of the $m_{SRS, b_{SRS}}/P_f$ RBs.

Support Comb 8

Note: SRS sequence shorter than the minimum length supported in the current specification is not pursued.

FFS whether and if needed, how to use harmonized approach to define the three supported schemes Note: other schemes for SRS capacity and coverage enhancements are not supported in Rel-17.

Increased Number of SRS Symbols in a Slot

The determine the number repetition symbols for an SRS resource, the gNB needs to configure the number of symbols in a slot as well as the repetition factor for said SRS resource. In what follows, let N denote the number of symbols per slot for an SRS resource and let R denote the repetition factor. If frequency hopping is configured for an SRS resource, the number of frequency hops in a slot is given by F=N/R, otherwise F=1.

Below, we provide system-level simulation results demonstrating that frequency-hopping achieves superior performance compared to repetition for interference-limited scenarios. Hence, when extending the number of repetition symbols in a slot (and, hence, the number of symbols per slot), frequency hopping schemes should be extended as well. This will, however, put restrictions on which combinations of N and R that can be configured for an SRS resource (in current NR, the only restriction is that N≥R). In particular, it is sensible to restrict N and R such that the number of frequency hops, F=N/R, is an integer. Of the candidate values for S in the above agreement, N=8 and N=12 results in F=N/R being an integer for all values of R that can be configured in current NR (i.e., 1, 2, and 4). It may thus be proposed to:

Proposal 14 Support increasing the number of repetition symbols in a slot and one SRS resource to 8 and 12.

Even with the above proposal, configuring N=12 and R=8 for an SRS resource would be problematic as this leads to F=12/8=1.5. It may therefore be proposed to:

Proposal 15 Introduce a rule stating that the number of symbols in a slot and one SRS resource should be integer divisible by the repetition factor.

For the configurable values of N and R according to 0, 0 reduces to the gNB not being allowed to configure N=12 and R=8 for the same SRS resource.

Partial Sounding

In NR Rel. 16, it is possible to configure SRS such that the resulting SRS sequence length is 12, 18, 24, 30, 36, . . . , 1632. In addition, for SRS for positioning, sequence length 6 is supported. It is not clear from the above RAN1 #104-e agreement regarding capacity-and-coverage enhancements whether SRS sequence length 6 (for which there exist suitable low-PAPR sequences in current specification) can be used for SRS with usage other than positioning in NR Rel. 17 or not. To maximize SRS capacity, it is desirable to use as short SRS sequence as possible and, hence, this issue is clarified as follows.

Proposal 16 Supported SRS sequence lengths in NR Rel. 17 are 6, 12, 18, 24, 30, 36, . . . , 1632.

In what follows, when partial sounding is configured, we refer to $m_{SRS,b_{SRS}}/P_f$ as the sounded bandwidth for which the resulting SRS sequence length is $M_f=12\ m_{SRS,b_{SRS}}/(P_f k_{TC})$, where $m_{SRS,b_{SRS}}$ is the configured SRS bandwidth, $k_{TC}$ is the comb, and $P_f$ is the partial-sounding factor. The resulting SRS sequence length must adhere to the constraint in 0. When partial sounding is not configured, the sounded bandwidth is equal to the configured SRS bandwidth.

There may be limited motivation for supporting partial-sounding factors other than $P_f=2$ and $P_f=4$, as such values of $P_f$ offers limited novelty compared to what can be achieved with existing SRS frequency-hopping configurations due to the restriction that no new SRS sequence lengths are to be introduced in NR Rel. 17. Specifically, to use existing SRS sequence lengths (including length 6), for comb 2, the sounded bandwidth must be an integer multiple of 1 PRB, for comb 4, the sounded bandwidth must be an integer multiple of 2 PRBs, and for comb 8, the sounded bandwidth must be an integer multiple of 4 PRBs. Adhering to such restrictions involves, e.g., making allowed partial-sounding factors depend on the configured SRS bandwidth and on the configured comb, or to update the way in which SRS is mapped to physical resources.

To emphasize this point, consider, for example, the case $P_f=3$, which results in valid SRS sequence lengths only for SRS bandwidths for which it holds that $m_{SRS,b_{SRS}}/P_f$ is an integer multiple of 4 PRBs. One such case is $m_{SRS,b_{SRS}}=12$ PRBs, for which the sounded bandwidth is $m_{SRS,b_{SRS}}/P_f=4$ PRBs for $P_f=3$. However, this sounded bandwidth can be achieved without partial sounding by directly configuring $m_{SRS,b_{SRS}}=4$.

Hence, the following may be proposed.

Proposal 17 Support partial-sounding factors $P_f=2$ and $P_f=4$.

In order to achieve capacity gains through partial sounding it is not sufficient to sound only a fraction ($1/P_f$) of the configured SRS bandwidth. Specifically, additional signaling is required to indicate which part of the configured SRS bandwidth that should be sounded by an SRS resource. One way, which is similar to how SRS resources are multiplexed in existing frequency-hopping schemes, is to configure through RRC signaling a partial-sounding position, Pp, per SRS resource.

Proposal 18 An SRS resource can be configured with a partial-sounding position indicating which part of the configured SRS bandwidth that should be sounded.

Proposal 19 Further discuss whether which portion of the configured SRS bandwidth that is sounded should be time varying (e.g., according to a predefined hopping pattern) or not.

Comb 8

According to the above RAN1 #104-e agreement regarding capacity-and-coverage enhancements, comb 8 will be supported in NR Rel. 17. As in Section 2.5.2, we are assuming that the supported SRS sequence lengths in NR Rel. 17 are 6, 12, 18, 24, 30 36, and so on. With this choice, comb 8 can be configured for all possible SRS bandwidths including the smallest possible SRS bandwidth of 4 PRBs, for which the resulting sequence length is $M=12 \cdot m_{SRS,b_{SRS}}/k_{TC}=6$ samples.

Note, however, that if an SRS resource is configured both with comb 8 and with partial sounding, the resulting number of SRS subcarriers (i.e., the number of subcarriers within the sounded bandwidth divided by the comb) may not be equal to any valid SRS sequence length. For example, if the configured SRS bandwidth is $m_{SRS,b_{SRS}}=4$ PRBs, the comb is $k_{TC}=8$, and the partial-sounding factor is $P_f=2$, the resulting number of SRS subcarriers is 3. Hence, for a harmonized approach, the following may be proposed:

Proposal 20 When both comb 8 and partial sounding are configured for the same SRS resource, SRS bandwidth configurations that lead to invalid SRS sequence lengths are not supported.

An open issue is to specify the maximum number of cyclic shifts, $$n_{SRS}^{cs,max},$$

that can be configured for comb 8. In NR Rel. 16, for SRS for positioning, the number of cyclic shifts that can be configured for comb 8 is $$n_{SRS}^{cs,max} = 6.$$

In our view, this number is not suitable for SRS for two reasons:

1. The number of SRS ports that can be multiplexed onto a configured SRS bandwidth per OFDM symbol is given by $$k_{TC} n_{SRS}^{cs,max}.$$

For comb 4, the maximum number of cyclic shifts is $$n_{SRS}^{cs,max} = 12,$$

which results in up to $$k_{TC} n_{SRS}^{cs,max} = 4 \cdot 12 = 48$$

ports. For comb 8 and $$n_{SRS}^{cs,max} = 6,$$

it would be possible to multiplex up to $$k_{TC} n_{SRS}^{cs,max} = 8 \cdot 6 = 48$$

ports (same as for comb 4). Hence, no capacity gains can be achieved by using comb 8 unless $$n_{SRS}^{cs,max} > 6.$$

2. For multi-port SRS resources, which uses different cyclic shifts for different SRS ports, the maximum number of cyclic shifts should be an integer multiple of the number of SRS ports per SRS resource, which can be 1, 2, or 4. Note that this is not a concern for SRS for positioning for which the number of ports is always 1.

Figure 26:
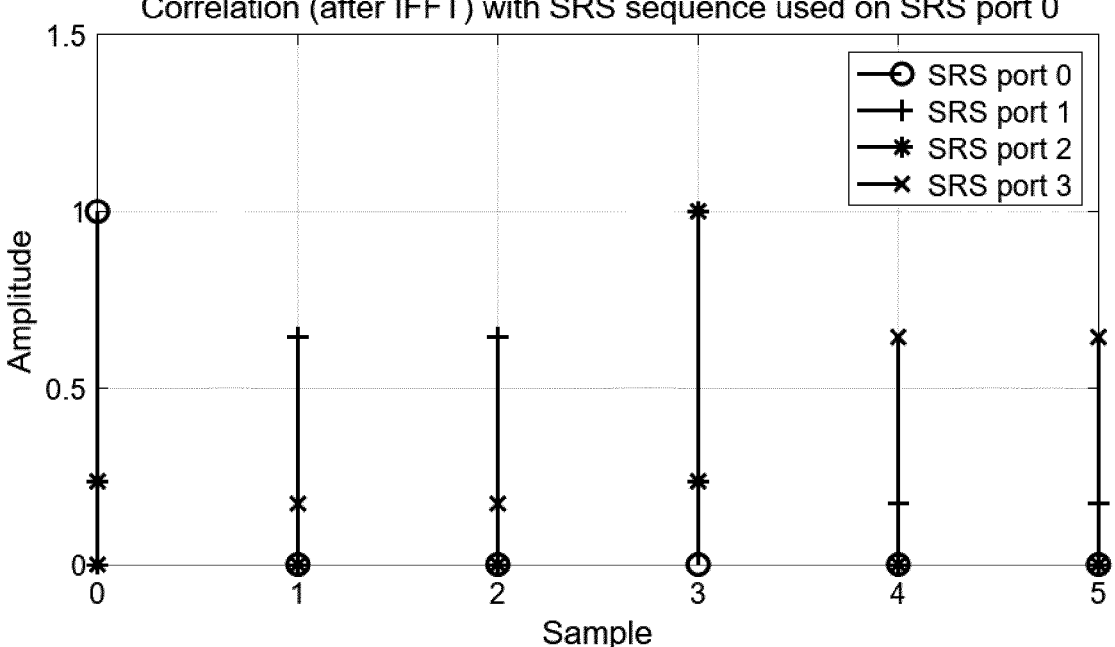
FIG. 26 illustrates a correlation between SRS sequences used for different SRS ports for the case when the sequence length is 6.

To illustrate the second point, FIG. 26 shows the correlation, in the time-domain (i.e., after computing an IFFT), between the SRS sequence used on the different ports for a 4-port SRS resource with the SRS sequence used on SRS port 0. Here, the SRS sequence length is 6 and the port-specific cyclic shifts are computed according to formulas in NR Rel. 16 specification. We note that the resulting SRS sequences cannot be separated by means of simple time-domain windowing, which is desired. To remedy this issue, and to achieve SRS capacity gains compared to NR Rel. 16, it may thus be proposed:

Proposal 21 For transmission comb 8, the maximum supported number of cyclic shifts should be at least 12 and an integer multiple of 4.

According to 0, the maximum number of cyclic shifts may exceed the SRS sequence length, which, in turn, could result in nonorthogonal SRS sequences. In fact, with the introduction of SRS partial sounding, cases for which the maximum number of cyclic shifts is larger than the SRS sequence length could occur also for existing combs (i.e., comb 2 and 4). For example, for $k_{TC}$=4, if the configured SRS bandwidth is $m_{SRS,b_{SRS}}$=4 PRBs and the partial-sounding factor is $P_f$=2, the resulting sequence length is $M_f$=12·$m_{SRS,b_{SRS}}$/($P_f$ $k_{TC}$)=6 samples, which is smaller than the maximum number of cyclic shifts for comb 4 (i.e., 12 cyclic shifts). It may thus be proposed:

Proposal 22 For SRS bandwidth and/or partial-sounding configurations for which the resulting SRS sequence length is smaller than the maximum number of cyclic shifts for a configured transmission comb, introduce a rule that restricts which cyclic shifts that are to be applied for said SRS resource.

Such a rule may include prohibiting the configuration of some cyclic shifts in the range $$[0, n_{SRS}^{cs,max} - 1].$$

Furthermore, for multi-port SRS resources, such a rule could involve a mapping between port-specific cyclic shifts to the set of valid cyclic shifts.

System-Level Simulation Results

In this section, we provide system-level simulation results for SRS enhancements by evaluating the impact, in terms of DL throughput, of increasing the SRS repetition factor and the number of frequency hops per slot.

Simulation Setup

In FIG. 27, we list the system-level simulation parameters used, unless explicitly stated otherwise, throughout this section.

Increased SRS repetition versus increased SRS frequency hopping

Figure 28:
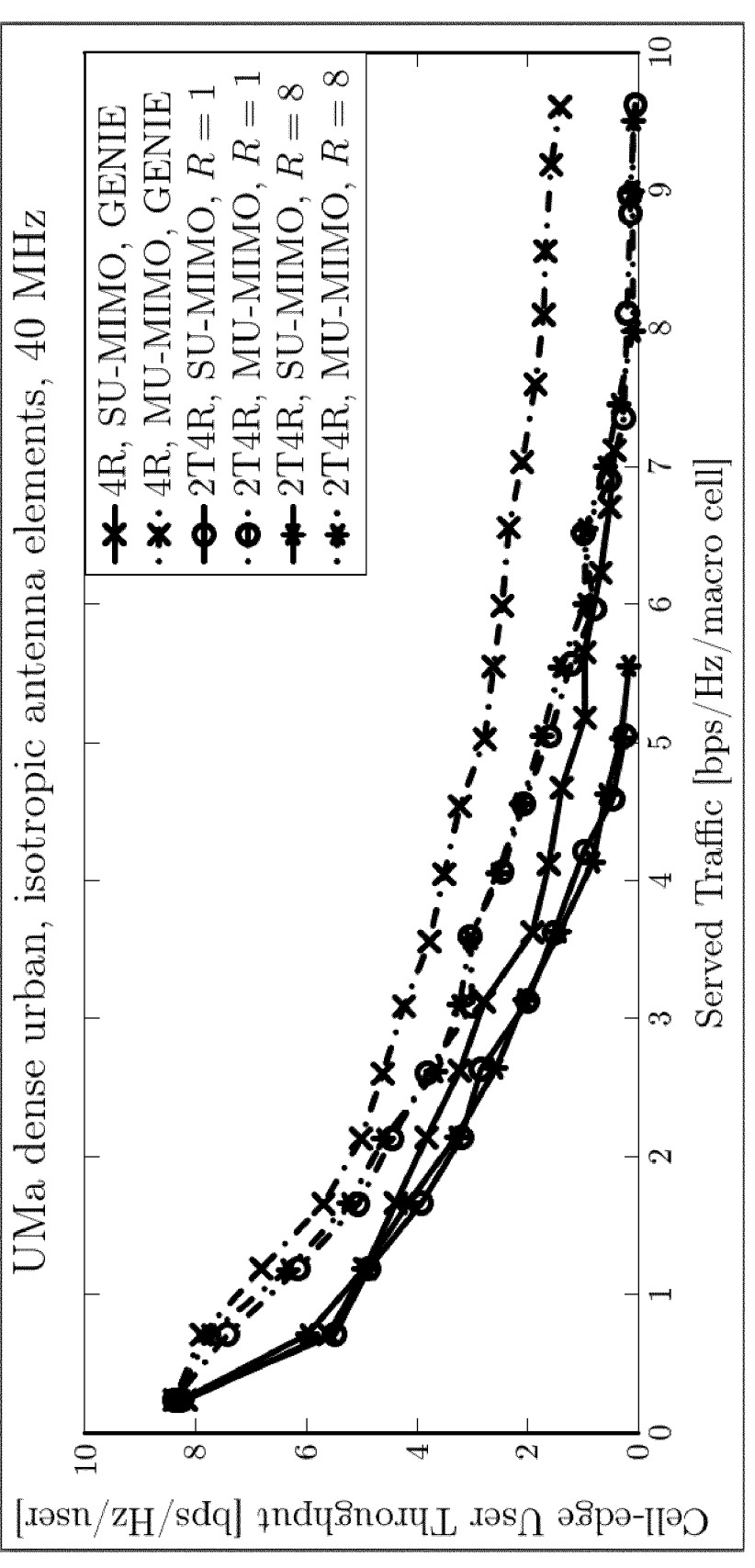
FIG. 28 illustrates cell-edge DL throughput as a function of the number of repetitions per slot $R \in \{1,8\}$, wherein the number of SRS symbols per slot is also R.

In this section, we evaluate, using system-level simulations, the DL throughput gains associated with increasing the repetition factor for the case when inter-sector interference is taken into account. FIG. 28 illustrates increased SRS repetition which shows only marginal gains in system-level simulations where SRS interference is taken into account. Specifically, in FIG. 28, we show, for the UMa dense urban scenario (i.e., UMa with 200 m ISD), the cell-edge user throughput in the DL as a function of the SRS repetition factor, which is increased from 1 (i.e., no repetition) to 8. Here, all active UEs are equipped with two transmit ports and four receive ports, which are sounded using 2T4R antenna switching. Furthermore, the transmission rank per UE is limited to two for both SU-MIMO and MU-MIMO. We observe that increasing the repetition factor yields no significant throughput gains. This is because the system is interference limited rather than noise limited for the considered system-level simulation parameters. Hence, since it is here assumed that all UEs use the same SRS configuration (including the same repetition factor), the level of interference will not decrease by increasing the SRS repetition factor. These results demonstrate the importance of performing system-level simulations for evaluating SRS capacity enhancements, as link-level simulations only tell a part of the full story. In practice, increased SRS repetition yields substantial throughout gains only in noise-limited scenarios.

Observation 5 Increased SRS repetition shows only marginal gains in system-level simulations where SRS interference is taken into account.

FIG. 1 Cell-edge DL throughput as a function of the number of frequency hops per slot H E {1, 8}. Here, the number of SRS symbols per slot is also H.

There exist already several mechanisms for mitigating SRS interference. For example, the SIR can be improved by scheduling fewer SRS resources per transmission comb (i.e., decreasing the number of used cyclic shifts). This approach, however, suffers from the drawback that more time-frequency resources are being used for SRS without improving the SRS SNR. Alternative approaches to mitigating interference that do not require additional time-frequency resources being used for SRS include increasing the transmission comb and increasing the processing gain by performing more aggressive time-domain windowing. For these approaches to work, we, however, need to make sure that the channel delay spread is sufficiently short such that intra-sector interference and channel impulse-response truncation errors do not become the limiting sources of SRS impairments.

Figure 29:
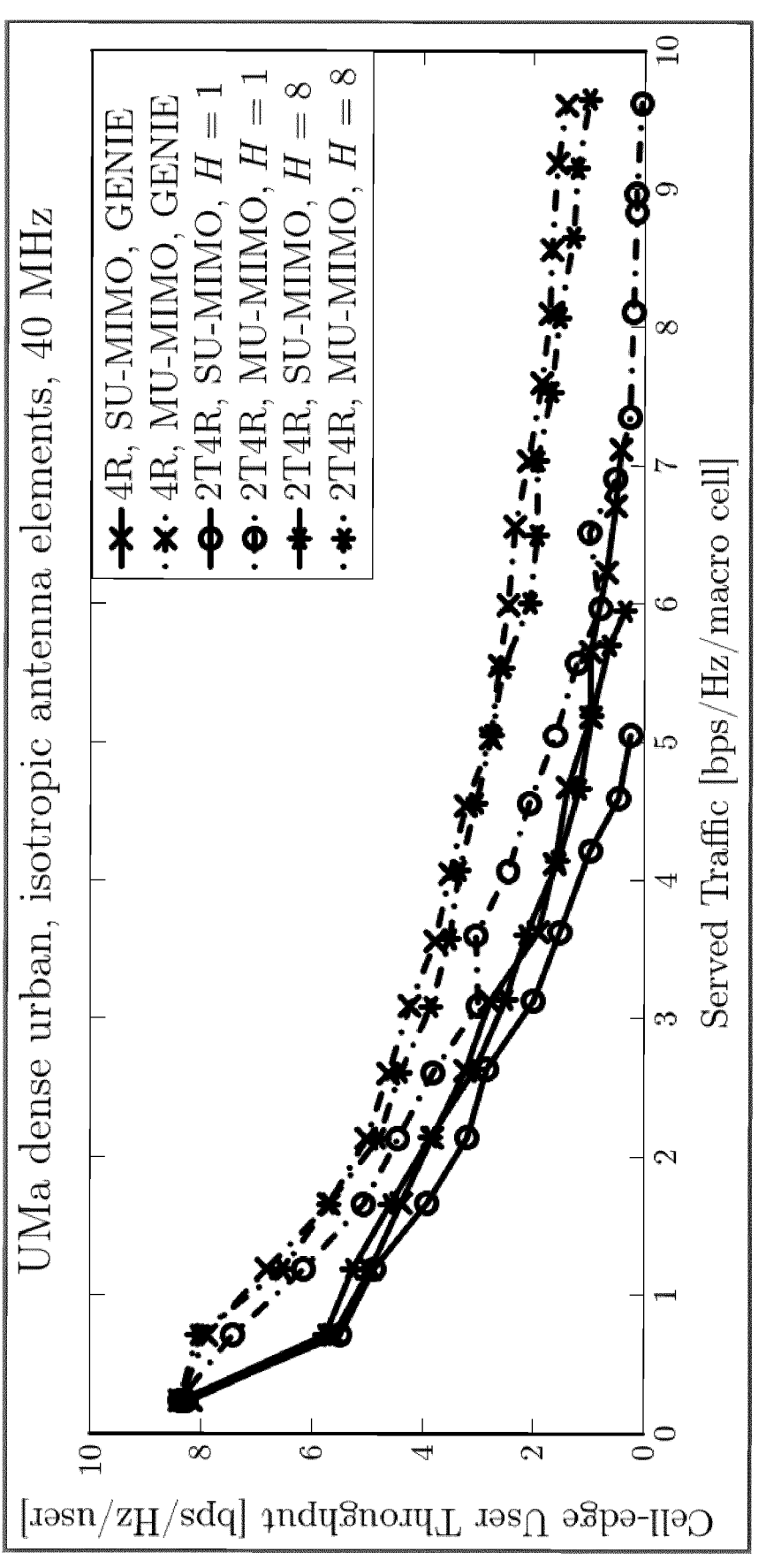
FIG. 29 illustrates cell-edge DL throughput as a function of the number of frequency hops per slot $H \in \{1,8\}$, wherein the number of SRS symbols per slot is also H.

An approach that increases that improves the SINR (i.e., that improves both SNR and SIR) and that requires the same number of time-frequency resources as increasing the repetition factor, is to increase the number of frequency hops per slot for an SRS resource. FIG. 29 illustrates cell-edge DL throughput as a function of the number of frequency hops per slot H∈{1,8}. Here, the number of SRS symbols per slot is also H. In FIG. 29, we show the DL throughput as a function of the number of frequency hops per slot which is increased from 1 (i.e., no hopping) to 8. By increasing the number of frequency hops per slot, we are able to approach the genie-aided (i.e., perfect) CSI throughput, which we were not able to do by increasing the repetition factor.

Observation 6 Increasing the number of frequency hops per slot is a more effective way of increasing DL throughput than increasing the repetition factor, especially in interference-limited scenarios.

Conclusion

In the previous sections, approaches have been explored to increase aperiodic SRS triggering flexibility and reduce PDCCH overhead in more detail. Methods to avoid duplicate SRS configurations with SRS antenna switching are elaborated further, related mechanisms to support UL antenna selection were introduced, and details of SRS switching configurations were considered, including guard times, the need for a 4T6R configuration, and dynamic adaptation to SRS switching configurations. Issues in SRS coverage evaluation including suitable baselines and simulation parameters were also provided. Enhancement alternatives and baselines for SRS coverage and capacity were analyzed. Furthermore, link level evaluations of potential downlink throughput benefits of increased SRS coverage were shown that provide insight into potential use cases. Finally, initial system level results were given on the efficiency of repetition and frequency hopping.

The following observations can be made:

Observation 1 A desired Rel. 17 functionality when operating with simultaneous UL MIMO and DL MIMO operation for a UE is for the gNB to use a single SRS measurement for both CB and AS purposes, with no compromise in performance for none of them, compared to using separate SRS resources for CB and AS or same SRS resource in separate slots for CB and AS.

Observation 2 Special slot with 2 UL symbols is used in deployments in both Asia and EU and the 2 UL symbols, suitable for SRS transmissions, in the special slot cannot be used by any of current antenna switching schemes for which R>T, which leads to reduced spectral efficiency.

Observation 3 Enabling a configurable guard time period as in Proposal 10, reduce SRS overhead and improve SRS triggering flexibility also for the new Rel. 17 antenna switching configurations with 6 and 8 RX.

Observation 4 Dynamically/semi-statically adapting the SRS configurations is important to manage SRS load and to enable fast tradeoff between SRS overhead and performance/need.

Observation 5 Increased SRS repetition shows only marginal gains in system-level simulations where SRS interference is taken into account.

Observation 6 Increasing the number of frequency hops per slot is a more effective way of increasing DL throughput than increasing the repetition factor, especially in interference-limited scenarios.

Based on the discussion in the previous sections and these observations, the following may be proposed:

Proposal 1 Support option 2, the reference slot is the slot indicated by the legacy triggering offset.

Proposal 2 Support Alt 2-2, t is indicated without adding DCI payload. A UE can be configured, using RRC, a delay value t to each of the SRS trigger states respectively. Possible delay is in the value range {0, 1, 2, 3}. Default value is t=0.

Proposal 3 In DCI format 0_1/0_2 without data and without CSI request we support Alt 1-2: Re-purpose unused DCI field to indicate t.

Proposal 4 In case multiple triggered SRS resource sets collide, i.e., map to a potential transmission in overlapping OFDM symbols, set dropping applies based on priority where lower priority set is dropped. Priority is based on set usage, where antenna switching has highest priority and beam management has lowest. Codebook has second highest priority.

Proposal 5 Support A-2 and B-2 for aperiodic SRS triggering and resource management based on re-purposing unused fields in DCI format 0_1/0_2 without data and without CSI.

Proposal 6 At least for a UE supporting maxNumberMIMO-LayersCB-PUSCH=x, maxNumberMIMO-LayersPDSCH=x, and supportedSRS-TxPortSwitch='t2r2', 't4r4', 't1 r1-t2r2', or 't1r1-t2r2-t4r4', when a UE is configured only one x-port SRS resource in a set with usage "antennaSwitching" with xT=xR for DL CSI acquisition, the gNB can assume that the UE transmits this SRS resource in the same way (e.g., same virtualization) as if the set would have been configured with usage 'codebook', and such x-port SRS resource can be used for an x-port UL MIMO precoder selection (i.e., TPMI selection) by the gNB.

Proposal 7 At least for a UE supporting maxNumberMIMO-LayersCB-PUSCH=x, and, maxNumberMIMO-LayersPDSCH=y, and, supportedSRS-TxPortSwitch contains 'txry', when a UE is configured multiple x-port SRS resources in a set with usage "antennaSwitching" and the total number of SRS ports in the set across all the resources is y, then the gNB can assume that the UE transmits each of these x-port SRS resources in the same way (e.g., same virtualization) as if that x-port SRS resource would have belonged to a set configured with usage "codebook". Thereby, any of these x-port SRS resources can be used for an x-port UL MIMO precoder selection (i.e., TPMI selection) by the gNB.

Proposal 8 Support 1T4R aperiodic SRS with 4 resource sets with 1 port each in four different slots.

Proposal 9 Support 1T2R and 2T4R aperiodic SRS with 2 resource sets with 1 or 2 port each respectively, in two different slots.

Proposal 10 Support RRC configurable presence of guard period for antenna switching in FR1 as in LTE.

Proposal 11 Allow a flexible number of aperiodic SRS resource sets to be configured per SRS configuration and distribute the SRS resources between the configured SRS resource sets.

Proposal 12 Do not provide explicit support for 4T6R in Rel. 17.

Proposal 13 Introduce MAC-CE signaling for adapting the UE antennas that are sounded for antenna switching, i.e., enable faster than RRC switching between different supported xTmR antenna switching configurations.

Proposal 14 Support increasing the number of repetition symbols in a slot and one SRS resource to 8 and 12.

Proposal 15 Introduce a rule stating that the number of symbols in a slot and one SRS resource should be integer divisible by the repetition factor.

Proposal 16 Supported SRS sequence lengths in NR Rel. 17 are 6, 12, 18, 24, 30, 36, . . . , 1632.

Proposal 17 Support partial-sounding factors $P_f$=2 and $P_f$=4.

Proposal 18 An SRS resource can be configured with a partial-sounding position indicating which part of the configured SRS bandwidth that should be sounded.

Proposal 19 Further discuss whether which portion of the configured SRS bandwidth that is sounded should be time varying (e.g., according to a predefined hopping pattern) or not.

Proposal 20 When both comb 8 and partial sounding are configured for the same SRS resource, SRS bandwidth configurations that lead to invalid SRS sequence lengths are not supported.

Proposal 21 For transmission comb 8, the maximum supported number of cyclic shifts should be at least 12 and an integer multiple of 4.

Proposal 22 For SRS bandwidth and/or partial-sounding configurations for which the resulting SRS sequence length is smaller than the maximum number of cyclic shifts for a configured transmission comb, introduce a rule that restricts which cyclic shifts that are to be applied for said SRS resource.

The invention claimed is:

1. A method performed by a communication device in a telecommunications network, the method comprising:

receiving a sounding reference signal (SRS) configuration from a network node having an SRS sequence length that is non-supported by the communication device, the SRS configuration involving at least one of a bandwidth configuration, a transmission comb configuration, and a partial sounding factor configuration; and adjusting the SRS configuration, wherein the adjusting comprises:

adjusting the frequency allocation and a corresponding SRS sequence for an SRS resource that violates rules of supported SRS sequence lengths; and wherein, when the configured partial sounding factor $P_f$ results in a non-supported SRS sequence length, updating the partial sounding factor $P_f$ to another value that fulfills the requirement of supported SRS sequence lengths.

2. The method according to claim 1, wherein a bandwidth is an SRS frequency bandwidth.

3. The method according to claim 1, wherein when the configured partial sounding factor $P_f$ results in a non-supported SRS sequence length, the adjusting comprises updating the partial sounding factor $P_f$ to the highest number within a set of supported partial-sounding factors that fulfills the requirement of supported SRS sequence lengths.

4. The method according to claim 1, wherein the adjusting comprises adjusting the frequency allocation of an SRS resource that violates the rules of supported sequence lengths.

5. The method according to claim 4, wherein when the communication device is configured with a partial sounding factor, a transmission comb, and a per-hop frequency bandwidth that result in a non-supported SRS sequence length, the adjusting comprises adding one or more subcarriers to or removing one or more sub-carriers from the SRS frequency allocation until an SRS sequence length that is supported is attained.

6. The method according to claim 4, wherein when the SRS configuration result in a non-supported SRS sequence length, the adjusting comprises omitting sub-carriers in a lower end and/or upper end of a per-hop frequency band until the SRS sequence length becomes supported.

7. The method according to claim 4, wherein a most central subcarrier in the configured bandwidth is to be sounded, particularly most central subcarriers in the configured bandwidth are to be sounded.

8. The method according to claim 1 further comprising transmitting, to the network node, a SRS according to the adjusted SRS configuration.

9. A communication device comprising:

processing circuitry; and memory communicatively connected to the processing circuitry, wherein the memory comprises instructions that, when executed by the processing circuitry, causes the communication device to:

receive a sounding reference signal (SRS) configuration from a network node having an SRS sequence length that is non-supported by the communication device, the SRS configuration involving at least one of a bandwidth configuration, a transmission comb configuration, and a partial sounding factor configuration; and adjust the SRS configuration, wherein to adjust the SRS configuration, the instructions, when executed by the processing circuitry, further cause the communication device to:

adjust the frequency allocation and a corresponding SRS sequence for an SRS resource that violates rules of supported SRS sequence lengths; and when the configured partial sounding factor $P_f$ results in a non-supported SRS sequence length, update the partial sounding factor $P_f$ to another value that fulfills the requirement of supported SRS sequence lengths.

10. A method performed by a network node in a telecommunications network, the method comprising:

signalling, to a communication device, a sounding reference signal (SRS) configuration having an SRS sequence length that is non-supported by the communication device, the SRS configuration involving at least one of a bandwidth configuration, a transmission comb configuration, and a partial sounding factor configuration; and responsive to the signalling receiving from the communication device a SRS according to an adjusted SRS configuration which is supported by the communication device, wherein:

the adjusted SRS configuration comprises an adjusted frequency allocation and an adjusted corresponding SRS sequence for an SRS resource that violates rules of supported SRS sequence lengths; and when the configured partial sounding factor $P_f$ results in a non-supported SRS sequence length, the method further comprises updating the partial sounding factor $P_f$ to another value that fulfills the requirement of supported SRS sequence lengths.

11. A network node comprising:

processing circuitry; and memory communicatively connected to the processing circuitry, wherein the memory comprises instructions that, when executed by the processing circuitry, causes the network node to:

signal, to a communication device, a sounding reference signal (SRS) configuration having an SRS sequence length that is non-supported by the communication device, the SRS configuration involving at least one of a bandwidth configuration, a transmission comb configuration, and a partial sounding factor configuration; and responsive to signalling the SRS configuration, receive from the communication device a SRS according to an adjusted SRS configuration supported by the communication, wherein:

the adjusted SRS configuration comprises an adjusted frequency allocation and an adjusted corresponding SRS sequence for an SRS resource that violates rules of supported SRS sequence lengths; and when the configured partial sounding factor $P_f$ results in a non-supported SRS sequence length, the partial sounding factor $P_f$ is updated to another value that fulfills the requirement of supported SRS sequence lengths.

* * * * *